(12) United States Patent
Taniuchi

(10) Patent No.: US 7,044,624 B2
(45) Date of Patent: May 16, 2006

(54) VEHICLE LIGHT WITH MOVABLE REFLECTOR PORTION AND SHUTTER PORTION FOR SELECTIVELY SWITCHING AN ILLUMINATED AREA OF LIGHT INCIDENT ON A PREDETERMINED PORTION OF THE VEHICLE LIGHT DURING DRIVING

(75) Inventor: Hitoshi Taniuchi, Tokyo (JP)

(73) Assignee: Stanley Electric Co., Ltd., Kanagawa-ken (JP)

(*) Notice: Subject to any disclaimer, the term of this patent is extended or adjusted under 35 U.S.C. 154(b) by 163 days.

(21) Appl. No.: 10/874,184

(22) Filed: Jun. 24, 2004

(65) Prior Publication Data
US 2004/0246738 A1     Dec. 9, 2004

Related U.S. Application Data

(62) Division of application No. 10/001,204, filed on Dec. 4, 2001, now Pat. No. 6,796,696.

(30) Foreign Application Priority Data

Dec. 5, 2000   (JP) .............................. 2000-370527
Dec. 11, 2000  (JP) .............................. 2000-375378

(51) Int. Cl.
    *F21V 7/09*    (2006.01)

(52) U.S. Cl. ........................ 362/539; 514/517; 514/283

(58) Field of Classification Search ................ 362/539, 362/514, 517, 283, 298, 302, 303, 277, 207, 362/209, 512, 518, 538, 297

See application file for complete search history.

(56) References Cited

U.S. PATENT DOCUMENTS

| | | | |
|---|---|---|---|
| 4,680,679 A * | 7/1987 | Dilouya | 362/518 |
| 5,343,371 A | 8/1994 | Kobayashi et al. | 362/61 |
| 5,562,336 A | 10/1996 | Gotou | 362/37 |
| 5,899,559 A | 5/1999 | Lachmayer et al. | |
| 2001/0000448 A1* | 4/2001 | Suzuki et al. | 362/512 |
| 2001/0038535 A1* | 11/2001 | Furuya et al. | 362/469 |

FOREIGN PATENT DOCUMENTS

| | | |
|---|---|---|
| DE | 650 612 | 9/1937 |
| DE | 195 26 023 A1 | 1/1997 |
| DE | 199 46 350 | 3/2001 |
| EP | 0 294 589 A2 | 12/1988 |
| EP | 0 990 558 | 4/2000 |
| EP | 1 126 210 | 8/2001 |
| JP | 07-78503 | 3/1995 |
| JP | 2000-233684 | 8/2000 |

* cited by examiner

*Primary Examiner*—Sandra O'Shea
*Assistant Examiner*—Anabel Ton
(74) *Attorney, Agent, or Firm*—Morgan, Lewis & Bockius LLP

(57) ABSTRACT

A vehicle light can include a light source, a major reflecting surface, a projection lens, and a shutter. A first reflecting surface of an ellipse group reflecting surface preferably has a first focus on the light source and a second focus, capable of being inserted in or removed from an optical path from the light source to a second fixed reflecting surface. A first fixed reflecting surface of a parabolic group reflecting surface can include a focus on the second focus of the first reflecting surface, and at least two second reflecting surface elements. The second fixed reflecting surface can include a first focus on the light source and at least two third reflecting surface elements for reflecting light rays that have traveled an optical path from the light source thereto without being reflected by the first reflecting surface.

31 Claims, 40 Drawing Sheets

(A)

(B)

(C)

(A)

L1  L2  L4

(B)

L2 + L4

(C)

(D)

(A)

(B)

(C)

(D)

(A)

(B)

(C)

(D)

(E)

(A)

(B)

(A)

(B)

(A)

(B)

(A)

(B)

(A)

(B)

(C)

(D)

(A)

(B)

A)

(B)

(A)

(B)

VEHICLE LIGHT WITH MOVABLE REFLECTOR PORTION AND SHUTTER PORTION FOR SELECTIVELY SWITCHING AN ILLUMINATED AREA OF LIGHT INCIDENT ON A PREDETERMINED PORTION OF THE VEHICLE LIGHT DURING DRIVING

This is a divisional application of application Ser. No. 10/001,204, filed on Dec. 4, 2001 now U.S. Pat. No. 6,796,696, which is incorporated by reference herein in its entirety.

This invention claims the benefit of Japanese patent applications No. 2000-370527, filed on Dec. 5, 2000, and No. 2000-375378, filed on Dec. 11, 2000, which are hereby incorporated by reference.

BACKGROUND OF THE INVENTION

1. Field of the Invention

The present invention relates to a vehicle light for use as an automobile headlight or a supplementary headlight such as a fog light etc., and more particularly relates to a vehicle light which is designed for providing a low-beam mode light distribution pattern, capable of selectively providing a portion of light rays into a travelling direction of the vehicle such that a light amount in the travelling direction can be increased for providing a driver of the vehicle with improved visibility into the travelling direction of the vehicle. For example, when the vehicle drives on a curve to the left, a light amount to the left front of the vehicle can be increased. When the vehicle drives on a straight road at a relatively high speed, a light amount to a far front central area of the vehicle can be increased.

2. Description of the Related Art

Generally, a projection-type vehicle light comprises a light source, a major reflecting surface such as an ellipse group reflecting surface for reflecting light rays emitted from the light source in a direction generally forward, a projection lens of a convex lens whose convex surface is aspherical, etc., and a shade located in the vicinity of a focus of the projection lens. Light rays reflected by the major reflecting surface and directly come from the light source converge in the vicinity of the focus of the projection lens to provide a focused image of light. The projection lens projects the focused image of light upside down with its left side to be the right side into a forward direction while enlarging the focused image, thereby the projection-type vehicle light illuminates a predetermined area on a road. The shutter cuts off an unnecessary portion of light for formation of light distribution pattern(s) of the vehicle light. The unnecessary portion of light is typically a portion which generally illuminates in an upper right forward direction of the vehicle after being projected by the projection lens, which can be glare light to a driver of a car driving on an on-coming lane. Since light rays illuminating in the upper right forward direction of the vehicle are prohibited, an illuminated area of the vehicle light has a relatively short distance to the front of the vehicle at the side of the on-coming lane.

FIG. 25(A) illustrates a prohibited portion A of a low beam mode light distribution pattern on a screen defined by regulations and an actual light distribution pattern B on the screen for a vehicle driving on a left lane. The prohibited portion A is an area shown by slanting lines which light rays are not allowed to enter into in the low beam mode of the light distribution pattern. A horizontal line of the prohibited portion A located on the right side of the vertical axis is consistent with a horizontal axis on the screen. An inclined line of the prohibited portion A located on the left side of the vertical axis extends from a crossed point of a vertical axis and the horizontal axis on the screen to the left upward at 15 degrees relative to the horizontal axis. The actual light distribution pattern B is located not to enter into the prohibited portion A at any time of operation of the vehicle light.

When the vehicle drives on a curve, it is preferable for the vehicle light to provide an increased amount of light into a traveling direction, i.e., forward of the curve, of the vehicle in comparison with when driving on a straight road for obtaining superior long distance visibility on the curve. More specifically, when the vehicle drives on a curve to the left, it is preferable to increase an amount of light rays which illuminate a left side in front of the vehicle. On the other hand, when the vehicle drives on a curve to the right, it is preferable to increase an amount of light rays which illuminate a right side in front of the vehicle.

However, when the vehicle travels on a curve to the right, or turn around a corner to the right, even though the driver would like to see more clearly the forward of the curve or corner, there is a potential that sufficient bright field of vision is not obtained. The forward of the curve or corner is on the side of the on-coming lane. Since a cut-off line of the low beam mode light distribution pattern is fixed, the illuminated distance to the front right side from the vehicle cannot be increased.

Further, when the vehicle travels at a relatively high speed, a distance between the vehicle and another car traveling ahead increases. In this case, since light distribution characteristics of the vehicle light are fixed, an illuminated distance to the front of the vehicle results in being relatively decreased. It may happen that sufficient long distance visibility can not be obtained when the vehicle travels at a relatively high speed.

In order to achieve superior long distance visibility on the curve, in a conventional vehicle light, a reflecting surface laterally moves depending on steering angle while a location of a light source is fixed. The conventional projection-type vehicle light has the following problems.

In order to achieve sufficient change of a light distribution pattern between before and after the reflector is moved in accordance with the change of steering angle, a large space is required in a housing for moving an optical axis of the reflector at a large angle. Therefore, an entire size of the conventional vehicle light must be enlarged, and designing of the vehicle light tends to be difficult. Further, there exists gaps between a periphery of the reflector and aperture edge of the housing for allowing movement of the entire reflector, which deteriorates aesthetic appearance of the conventional vehicle light. Furthermore, a transparent front lens cannot be used, because it is difficult to obtain sufficient change of light distribution from when driving on a straight road to when driving on a curve solely by movement of the reflector. Prismatic cuts on an inner surface of the front lens are required to obtain the sufficient change of light distribution with superior visibility when a direction of an optical axis of the reflector is changed.

In another conventional vehicle light for the cases both when the vehicle drives on a curve or travels at a relatively high speed, an optical axis of the vehicle light is changed from a horizontal direction to an upward direction by moving an entire set of the vehicle light. In a still another conventional vehicle light, a shutter is moved to the downward. However, these two methods bring about increase of light amount illuminated to a still another vehicle running ahead of the vehicle. This problem is significant for a still another vehicle ahead of the vehicle running on a travelling lane when the vehicle travels on an over-passing lane. In general, a height of location of an automobile headlight disposed in an automobile body is lower than a position of a side mirror disposed in the automobile body. Therefore, if an illuminated light amount to the upward from the vehicle is increased, the upwardly illuminated light is reflected by the side mirror of another vehicle running ahead of the vehicle, which may cause to glare the driver in the vehicle running ahead of the vehicle on the traveling lane.

As a preventive means from the glare light, it is possible to detect a car running ahead of the vehicle, and to prevent from increasing light amount to the upward depending on detection results, e.g., a car running ahead of the vehicle is detected. However, a device for performing the detection and the illumination direction change must be large and expensive. Further, it is rarely that there is no car running ahead of the vehicle. Accordingly, this method is not very effective.

Then, the invention is, in part, intended to provide a vehicle light that includes a front lens substantially free from prismatic cuts, capable of easily changing an optical axis of a reflector, i.e., a general direction of a predetermined amount of light rays incident on the reflector, at a large angle by a simple structure while providing superior light distributions for both driving on a curve and driving on a straight road at a high speed. Specifically, when the vehicle drives on a curve or turn around a corner, the vehicle light is capable of increasing an illuminated distance to the front of the vehicle at the side of an on-coming lane without providing glare light to a driver of a car running on an on-coming lane.

SUMMARY OF THE INVENTION

In order to resolve the aforementioned problems in the related art, the present invention provides vehicle lights designed to alleviate these problems and to provide improved efficiency, decreased cost of manufacture, and improved aesthetic characteristics. Examples of preferred embodiments of the invention are described as follows. In a first aspect of the invention, a vehicle light includes a light source, a major reflecting surface reflecting light rays from the light source into a forward direction, a projection lens through which light rays from the light source and from the major reflecting surface pass in a converging manner to be directed to a predetermined direction, a shutter located in a light passageway from the light source to the projection lens for cutting-off an unnecessary portion of image of light in the vicinity of a focus of the projection lens on formation of a light distribution pattern, wherein the vehicle light comprises following five reflecting surfaces in addition to the major reflecting surface. A first reflecting surface located at a predetermined side of the major reflecting surface, e.g., when the vehicle light is designed to be disposed on a left front corner of the vehicle body, the predetermined side of the major reflecting surface means a right side of the major reflecting surface. The first reflecting surface reflects light emitted from the light source into a forward direction of the vehicle light. A second reflecting surface of an ellipse group reflecting surface such as a rotated elliptic surface having a first focus located substantially on the light source and having a second focus at a predetermined position. A longitudinal axis of the second reflecting surface is across an optical axis X of the vehicle light which passes through the light source. The second reflecting surface can be rotated around its longitudinal axis, thereby the second reflecting surface can be inserted in or removed from an optical path of light traveling from the light source to the first reflecting surface. When the second reflecting surface is removed from the optical path, the second reflecting surface is located in a shadow region of a third reflecting surface. The third reflecting surface is an ellipse group reflecting surface such as a rotated elliptic surface having a first focus in the vicinity of the light source and a longitudinal axis which is across the optical axis X of the vehicle light. A fourth reflecting surface has a focus substantially on the second focus of the second reflecting surface, and directs light rays from the second focus into a front outer side direction of the vehicle, which is inclined to a predetermined side of the vehicle light, e.g., when the vehicle light is designed to be disposed on the left front corner of the vehicle body, the predetermined side of the vehicle light means a left side of the vehicle light. A fifth reflecting surface has a focus in the vicinity of the second focus of the third reflecting surface, and directs light rays from third reflecting surface into a forward direction, which is also a rather downward direction, of the vehicle light. The direction of such light reflected by the fifth reflecting surface is laterally wide in a horizontal cross-sectional view of the vehicle light.

The first reflecting surface can be preferably a parabolic group reflecting surface such as a parabolic free-curved surface having a focus in the vicinity of the light source.

In a second aspect of the invention, a vehicle light can include a light source, a major reflecting surface reflecting light from the light source into a forward direction, a projection lens through which light rays from the light source and from the major reflecting surface pass in a converging manner to be directed to a predetermined direction, and a shutter located in an optical path of light from the light source to the projection lens for cutting-off an unnecessary portion of image of light in the vicinity of a focus of a projection lens on formation of a light distribution pattern, further comprising following six reflecting surfaces in addition to the major reflecting surface. A first reflecting surface located at a predetermined side of the major reflecting surface, e.g., when the vehicle light is designed to be disposed on a left front corner of the vehicle body, the predetermined side of the major reflecting surface means a right side of the major reflecting surface. The first reflecting surface is an ellipse group reflecting surface such as a rotated elliptic surface having a first focus in the vicinity of the light source and a second focus at a predetermined position. The first reflecting surface reflects light emitted from the light source in a converging manner to its second focus. A second reflecting surface is an ellipse group reflecting surface such as a rotated elliptic surface having a longitudinal axis which is across the optical axis X of the vehicle light. A first focus of the second reflecting surface is located in the vicinity of the light source. The second reflecting surface can be rotated around its longitudinal axis allowing to be inserted in or removed from an optical path of light from the light source to the first reflecting surface. When the second reflecting surface is removed from the optical path, the second reflecting surface is located in a shadow region of a third reflecting surface. The third reflecting surface is an ellipse group reflecting surface such as a rotated elliptic surface having its longitudinal axis which is across the optical axis X of the vehicle light. A first focus of the third reflecting surface is located in the vicinity of the light source. A fourth reflecting surface has a focus in the vicinity of the second focus of the second reflecting surface, and directs light rays from the second focus into a front outer side direction of the vehicle, which is inclined to a predetermined side of the vehicle light, e.g., when the vehicle light is designed to be disposed on the left front corner of the vehicle body, the predetermined side of the vehicle light means a left side of the vehicle light. A fifth reflecting surface has a focus in the vicinity of the second focus of the third reflecting surface, and directs light rays from third reflecting surface into a forward direction, which is also rather downward direction, of the vehicle light in a vertical cross sectional view, and a laterally wide direction relative to the optical axis X of the vehicle light in a horizontal cross sectional view. A sixth reflecting surface has a focus in the vicinity of the second focus of the first reflecting surface, and reflects light from the first reflecting surface to a forward direction of the vehicle light.

In a third aspect of the invention, a vehicle light can include a light source, a major reflecting surface for directing light emitted from the light source to a forward direction, a projection lens through which light rays from the light source and from the major reflecting surface pass in a converging manner to be directed to a predetermined direction, and a shutter located in an optical path from the light source to the projection lens for cutting off an unnecessary portion of image of light rays in the vicinity of the focus of the projection lens on formation of a light distribution pattern, and following five reflecting surfaces. A first reflecting surface is an ellipse group reflecting surface having a first focus in the vicinity of the light source. The first reflecting surface is located at a predetermined side of the major reflecting surface, e.g., when the vehicle light is designed to be disposed on a left front corner of the vehicle body, the predetermined side of the major reflecting surface means a right side of the major reflecting surface. The first reflecting surface reflects light emitted from the light source to the forward, preferably in the vicinity of the focus of the projection lens. A second reflecting surface is an ellipse group reflecting surface such as a rotated elliptic surface having a first focus in the vicinity of the light source. A longitudinal axis of the second reflecting surface is across the optical axis X of the vehicle light. The second reflecting surface can be rotated around its longitudinal axis such that the second reflecting surface can be inserted in and removed from an optical path from the light source to the first reflecting surface. When the second reflecting surface is removed from the optical path, the second reflecting surface is located in a shadow region of a third reflecting surface. The third reflecting surface is a rotated elliptic surface having a first focus in the vicinity of the light source and a second focus at a predetermined position, and reflects light rays from the light source to a fifth reflecting surface. A fourth reflecting surface has a focus in the vicinity of the second focus of the second reflecting surface, and directs light from the second reflecting surface to a front outer side direction of the vehicle, which is inclined to a predetermined side of the vehicle light, e.g., when the vehicle light is designed to be disposed on the left front corner of the vehicle body, the predetermined side of the vehicle light means a left side of the vehicle light. A fifth reflector has a focus in the vicinity of the second focus of the third reflecting surface, and reflects light from the third reflecting surface to a forward direction of the vehicle light, which is also rather downward direction, in a vertical cross-sectional view. The fifth reflector reflects light rays into a laterally wide direction relative to the optical axis X of the vehicle light in a horizontal cross-sectional view. Light rays reflected by the first reflecting surface are incident to the projection lens. When light rays pass through the projection lens, the light rays are refracted in a converging manner by a predetermined degree to the forward of the vehicle light.

In the vehicle lights according to the first to third aspects of the present invention, light rays which are reflected by the first reflecting surface are incident to the projection lens, such light rays travel to a forward direction while being converged by a predetermined degree by the projection lens when passing through the projection lens. Light rays emitted from the light source to the third reflecting surface are reflected by the third reflecting surface and further by the fifth reflecting surface. The fifth reflecting surface reflects such light rays into a laterally wide direction in a horizontal cross sectional view, and into a front direction which is also a rather downward direction in a vertical cross-sectional view of the vehicle light.

In the above described structures, when the second reflecting surface is located in the optical path from the light source to the first reflecting surface, light rays traveling from the light source to the first reflecting surface are not incident to the first reflecting surface, and are reflected by the second reflecting surface, and further by the fourth reflecting surface, and then travel into a forward direction of the vehicle light, which is inclined to the predetermined side of the vehicle light, and illuminates a road side such as a curb. Accordingly, when traveling on a curve to the left or right, or turning around a corner, the vehicle lights of the present invention can brightly illuminate a traveling direction of the vehicle along the curve or the corner.

On the other hand, when the second reflecting surface is located away from the optical path from the light source to the first reflecting surface, light rays traveling from the light source to the first reflecting surface are incident on the first reflecting surface, and reflected by the first reflecting surface to a forward direction of the vehicle, thereby the vehicle light can illuminate an area in the vicinity of a center line on the road when the vehicle is travelling on a straight road.

By movement of the second reflecting surface, an illumination direction of light incident on a predetermined portion of the reflector can be selectively switched between a first light distribution to the center forward direction of the vehicle light by the first reflecting surface and a second light distribution to the front side direction which is inclined to the predetermined side of either left or right by the fourth reflecting surface. In the vehicle lights according to the first to third aspects of the present invention, it is sufficient to move only the second reflecting surface in order to change an illuminated area on the road, i.e., light distribution characteristics of the vehicle light. Accordingly, a relatively small space for the movement of the second reflecting surface is required for change of the light distribution characteristics of the vehicle light. When the second reflecting surface is removed from the optical path from the light source to the first reflecting surface, the second reflecting surface does not prohibit light rays from traveling from the light source to the first reflecting surface, because the second reflecting surface is located in a shadow region of the third reflecting surface, i.e., at a backside of the third reflecting surface when viewed from the light source position.

By the movement of the second reflecting surface, an illuminated area on the road, in other words, a general traveling direction of a portion of luminous flux incident to a predetermined portion of the reflector can be switched by a relatively large angle relative to the light source position in a horizontal view. Further, light distribution characteristics, such as light intensity or entire shape, of the variable light distribution element can be flexibly designed by adjusting designing parameters of the second and fourth reflecting surfaces. Therefore, even in case that a transparent front lens which is substantially free from prismatic cuts is adopted in the vehicle light, the vehicle light can provide sufficient visibility to a front side area in a travelling direction of the vehicle when the vehicle travels on a curve, e.g. when the vehicle travels on a curve to the left, the visibility in the front left area of the vehicle is improved.

In the first through third aspects of the present invention, a movable part for switching the illuminated area on the road is only the second reflecting surface having a relatively small entire size. Accordingly, a mechanism for driving the second reflecting surface can be small with a simple structure. Therefore, it is easy to design the mechanism. Further, there exists a small gap around the second reflecting surface for movement of the second reflecting surface. However, the gap never be significantly large to an extent that the gap is noticeable and deteriorates aesthetic appearance of the vehicle light.

If the first reflecting surface is a parabolic group reflecting surface having a focus in the vicinity of the light source, light rays reflected by the first reflecting surface can be substantially parallel light, and travel forward of the vehicle to illuminate a predetermined area in the vicinity of a center line on the road when the vehicle travels straight ahead.

In the vehicle light described above, light rays, which directly come from the light source or are reflected by the major reflecting surface, are preferably incident to the projection lens. The projection lens refracts such light rays in a converging manner by a predetermined degree to the forward of the vehicle light. Light rays reflected by the third reflecting surface can be further reflected by the fifth reflecting surface. The fifth reflecting surface reflects such light rays to the forward of the vehicle with a large width in a horizontal cross-sectional view, and to a rather downward direction in a vertical cross-sectional view.

When the second reflecting surface is inserted in the light passageway from the light source to the first reflecting surface, light rays emitted from the light source to the first reflecting surface do not become incident on the first reflecting surface, but are reflected by the second reflecting surface, then by the fourth reflecting surface. The fourth reflecting surface reflects light rays into a forward direction of the vehicle light, which can be inclined to a predetermined side, either left or right, of the vehicle, and can illuminate a roadside such as a curb or a shoulder. If the fourth reflecting surface is located on the left side of the major reflecting surface while the first reflecting surface is located on the right side of the major reflecting surface, the light reflected by the fourth reflecting surface travel into the left front direction of the vehicle light. If the fourth reflecting surface is located on the right side of the major reflecting surface while the first reflecting surface is located on the left side of the major reflecting surface, the light reflected by the fourth reflecting surface travel into the right front direction of the vehicle light. Accordingly, when the vehicle drives on a curve or corner to the left, the vehicle light located on the left side of the vehicle body can illuminate forward of the curve, i.e., a left side front of the vehicle, with an increased illuminated area, while the vehicle light located on the right side of the vehicle body can illuminate the road intensively to the center front.

When the second reflecting surface is located away from the light passageway from the light source to the first reflecting surface, light rays emitted from the light source toward the first reflecting surface are incident on the first reflecting surface. The first reflecting surface can reflect such light rays to the sixth reflecting surface. The sixth reflecting surface reflects such light rays to a forward direction of the vehicle light, and an area in the vicinity of the center line on the road is thus illuminated.

As described in the above, a portion of a light distribution pattern of the vehicle light can be selectively switched by movement of the second reflecting surface between a first light distribution pattern for illuminating forward of the vehicle by the first and sixth reflecting surfaces and a second light distribution pattern for illuminating a front direction of the vehicle, which is inclined to a predetermined side, i.e., either left or right, of the vehicle light. If the fourth reflecting surface is located on the left side of the major reflecting surface while the first and sixth reflecting surfaces are located at the right side of the optical axis of the vehicle light, the light reflected by the fourth reflecting surface travels to the left front of the vehicle. If the fourth reflecting surface is located on the right side of the major reflecting surface while the first and sixth reflecting surfaces are located at the left side of the optical axis of the vehicle light, the light reflected by the fourth reflecting surface travels to the right front of the vehicle. In the structure described in the above, it is sufficient to move only the second reflecting surface in order to change an illuminated area, i.e., light distribution characteristics, of the vehicle light. In order to change the location of the second reflecting surface, a relatively small space is sufficient for the movement of the second reflecting surface. Further, when the second reflecting surface is removed from the light passageway from the light source to the first reflecting surface, the second reflecting surface can be located in a shadow region of the third reflecting surface, i.e., a back surface of the third reflecting surface in a viewpoint from the light source. Accordingly, at this location of the second reflecting surface, the second reflecting surface does not prohibit the light passageway from the light source to the first reflecting surface.

In another vehicle light made in accordance with the third aspect of the invention, light rays, which directly travel from the light source to the projection lens or are reflected by the major reflecting surface, are incident to the projection lens. Such light rays are refracted in a converging manner by a predetermined degree to the forward of the vehicle light by the projection lens when passing through the projection lens. Light rays reflected by the third reflecting surface are further reflected by the fifth reflecting surface into a front downward direction of the vehicle light such that a wide area in front of the vehicle is illuminated. Herein, when the second reflecting surface is inserted in a light passageway from the light source to the first reflecting surface, light rays emitted from the light source to the first reflecting surface are not incident on the first reflecting surface, but reflected by the second reflecting surface and then by the fourth reflecting surface. Light rays reflected by the fourth reflecting surface travel to a front direction of the vehicle light, which is inclined to a predetermined side, i.e., either left or right, of the vehicle, for illuminating a road side such as a curb on the road, or a shoulder. If the fourth reflecting surface is located at the left side of the major reflecting surface while the first reflecting surface is located at the right side of the major reflecting surface, the light reflected by the fourth reflecting surface travels to the left front of the vehicle. If the fourth reflecting surface is located on the right side of the major reflecting surface while the first reflecting surface is located at the left side of the major reflecting surface, the light reflected by the fourth reflecting surface travels to the right front of the vehicle. Accordingly, when the vehicle drives on a curve or a corner to the left, the still another vehicle light located on the left side of the vehicle body can illuminate a road along a curving travelling direction, i.e., left front direction, with an increased illuminated area, while the vehicle light located on the right side of the vehicle body can illuminate the road intensively to the center front of the vehicle.

When the second reflecting surface is removed from the light passageway from the light source to the first reflecting surface, light rays emitted from the light source to the first reflecting surface are incident on the first reflecting surface. The first reflecting surface reflects such light rays to the projection lens. Such light rays are refracted in a converging manner by a predetermined degree to the forward of the vehicle when passing through the projection lens, then illuminate an area in the vicinity of a center line on the road when the vehicle travels straight ahead.

As described in the above, a portion of light distribution pattern of the vehicle light according to the third aspect of the present invention can be selectively switched by movement of the second reflecting surface between a first light distribution for illuminating forward of the vehicle by the first reflecting surface and a second light distribution for illuminating a predetermined front direction of the vehicle, which is inclined to a predetermined side, either left or right, of the vehicle light. If the fourth reflecting surface is located on the left side of the major reflecting surface while the first reflecting surface is located on the right side of the major reflecting surface, the light reflected by the fourth reflecting surface is directed to the left front of the vehicle. If the fourth reflecting surface is located on the right side of the major reflecting surface while the first reflecting surface is located on the left side of the major reflecting surface, the light reflected by the fourth reflecting surface is inclined to the right front of the vehicle. In the structure described in the above, it is sufficient to move only the second reflecting surface in order to change an illuminated area, i.e., light distribution characteristics, of the vehicle light. In order to change the location of the second reflecting surface, a relatively small space is sufficient for the movement of the second reflecting surface. Further, when the second reflecting surface is removed from the light passageway from the light source to the first reflecting surface, the second reflecting surface can be located in a shadow region of the third reflecting surface, i.e., a back surface of the third reflecting surface in a viewpoint from the light source. Accordingly, at this location of the second reflecting surface, the second reflecting surface does not prohibit the light passageway from the light source to the first reflecting surface.

In a fourth aspect of the invention, a vehicle light can include a light source, a major reflecting surface for reflecting light rays from the light source to the forward, a projection lens for refracting light rays from the major reflecting surface and directly from the light source in a converging manner to the forward by a predetermined degree, a shutter located in a light passageway from the light source to the projection lens for prohibiting an unnecessary portion of image of light rays in the vicinity of the focus of the projection lens on formation of a light distribution pattern, with the following characteristics. The shutter preferably includes a fixed portion and a movable portion capable of laterally moving to be inserted in or removed from the light passageway. A portion of the movable portion overlaps with the fixed portion. By movement of the movable portion of the shutter, a shape of a cut-off portion of the light distribution pattern can be varied.

On formation of a low beam mode light distribution pattern of the vehicle light having a cut-off line comprising an inclined cut-off line element and at least two horizontal cut-off line elements connected to each end of the inclined line element, when the movable portion of the shutter is located at its fully inserted position, the fixed portion of the shutter forms an upper horizontal cut-off line element located at a predetermined side of a vertical axis on a screen, the movable portion of the shutter forms the inclined cut-off line element which inclines from an inner end of the upper horizontal cut-off line element, which end is closer to the center of the light distribution pattern than another end of the upper horizontal cut-off line element, into a downward direction toward the vertical axis. The movable portion of the shutter also forms a lower horizontal cut-off line element connected to the lower end of the inclined cut-off line element.

At least the movable portion of the shutter is preferably concave when viewed in a direction facing to the projection lens. The movable portion of the shutter is movable, preferably in a rotating manner, around a vertical axis located at the side of the projection lens.

It is preferable that the movable portion of the shutter can be moved between its fully inserted position and its removed position relative to the light passageway, depending on a steering angle.

A driving mechanism that moves the movable portion of the shutter preferably includes a return spring to pull the movable portion of the shutter to its fully inserted position, and a stopper retaining the movable portion of the shutter in the fully inserted position.

A vehicle light according to a fifth aspect of the invention can include a light source, a major reflecting surface for directing light rays emitted from the light source to the forward of the vehicle light which is substantially parallel to an optical axis of the vehicle light, a projection lens for converging light rays incident thereto by a predetermined degree, a shutter located in a light passageway from the light source to the projection lens for prohibiting a portion of light rays which is unnecessary for formation of a light distribution pattern, and following three reflecting surfaces, i.e., first, second, fourth reflecting surfaces. A first reflecting surface reflects a portion of light rays emitted from the light source to be incident into the projection lens. A second reflecting surface is disposed to be capable of being inserted in, or removed from, a light passageway from the light source to the first reflecting surface. When the second reflecting surface is located in its fully inserted position relative to the light passageway from the light source to the first reflecting surface, a portion of light rays emitted from the light source to the second reflecting surface are reflected to the fourth reflecting surface, and the fourth reflecting surface reflects the light rays to illuminate a rather wide downward area in front of the vehicle, while the other portion of light rays emitted from the light source are reflected by the third reflecting surface to a fifth reflecting surface or incident to the projection lens. The fifth reflecting surface reflects the light rays to the front of the vehicle light to illuminate a wide area in front of the vehicle. The light rays incident to the projection lens are refracted in a converging manner to the forward of the vehicle light by a predetermined degree to illuminate the vicinity of the center of the light distribution pattern including an elbow portion. When the second reflecting surface is removed at least partly from the light passageway from the light source to the first reflecting surface, at least a portion of light rays are incident to the first reflecting surface, and reflected thereby to the projection lens. Light rays incident from the first reflecting surface to the projection lens forms a variable element of the light distribution pattern.

The shutter preferably includes a fixed portion, a movable portion capable of lateral movement from its inserted portion in a corresponding light passageway, e.g. a light passageway from the light source to the first reflecting surface, and a driving mechanism for moving the movable portion. At least a portion of the movable portion overlaps with the fixed portion. The movable portion can be moved relative to the fixed portion of the shutter in accordance with operation of the driving mechanism. Corresponding to operation of the driving mechanism, the second reflecting surface is removed from the light passageway from the light source to the first reflecting surface by a predetermined degree such that shape of a cut-off portion of the light distribution pattern is varied.

According to the fourth aspect of the invention, light rays directly come from the light source, and those reflected by the major reflecting surface are incident to the projection lens. When those light rays pass through the projection lens, the light rays are refracted in a converging manner to the forward of the projection lens by a predetermined degree such that a predetermined area on the road is illuminated. Before incident to the projection lens, a portion of light rays which is unnecessary for formation of the light distribution pattern is prohibited (blocked) by the shutter. By a shutter configuration according to the fourth aspect of the invention, the light distribution pattern can have an illuminated area with a longer distance at the side of an on-coming lane in comparison with a conventional vehicle light without glaring a driver of a car running on the on-coming lane, when the vehicle drives on a curve or turns around a corner.

More specifically, the movable portion of the shutter is laterally moved relative to the fixed portion of the shutter such that shape of a cut-off portion of the light distribution pattern is varied in a vertical direction on a screen, thereby an illuminated distance of the light distribution pattern at the side of the on-coming lane is increased to provide sufficient visibility at the side of the on-coming lane.

According to the fourth and fifth aspects of the invention, by lateral movement of the movable portion of the shutter, shape of a cut-off portion of the light distribution pattern can be varied. Therefore, for example, when the vehicle drives on a curve or a corner to the right, an illuminated distance of the light distribution pattern at the side of the on-coming lane can be increased such that visibility to the forward of traveling direction of the corner or the curve, i.e., a right front direction of the vehicle, is improved. In addition, since the movable portion of the shutter moves laterally, vertical movement of a cut-off line is limited to a predetermined range. Therefore, it is able to precisely adjust and determine the cut-off line of the light distribution pattern.

In this shutter structure, when the movable portion of the shutter is fully inserted in the light passageway from the light source to the projection lens, the fixed portion forms an upper horizontal cut-off line element located at a predetermined side of the vertical axis on the screen, and that the movable portion forms an inclined cut-off line element which inclines from an inner end of the upper horizontal cut-off line element in a downward direction to the other side of the predetermined side of the vertical axis, and that the movable portion also forms a lower horizontal cut-off line element connected to the lower end of the inclined cut-off line element, light distribution pattern of light that has passed through the projection lens varies as follows. When the movable portion of the shutter is fully inserted in the light passageway, the movable portion of the shutter forms an inclined cut-off line element extending from the vicinity of the center of the light distribution pattern in an upward direction to the predetermined side, and a lower horizontal cut-off line element connected to a lower end of the inclined cut-off line element such that a cut-off portion of the light distribution pattern is located mainly at the side of the on-coming lane, thereby the light distribution pattern has a relatively short illuminated distance at the side of the on-coming lane.

On the other hand, when the movable portion of the shutter is laterally moved from its fully inserted position toward the other side of an on-coming lane side such that the movable portion of the shutter is located between the fully inserted position and the removed position relative to the light passageway, a portion of an inclined cut-off line element located in the vicinity of the center of the light distribution pattern when the second reflecting surface is located in its fully inserted position is laterally moved toward the side of an on-coming lane, while a portion of a lower horizontal cut-off line element corresponding to the removed distance of the movable portion of the shutter is moved to the upward such that a middle horizontal cut-off line element appears between the lower and upper horizontal cut-off line elements. The middle horizontal cut-off line element is formed by a portion of an upper edge element of the fixed portion of the shutter. An upper edge of the fixed portion of the shutter comprises an upper horizontal edge element, a lower horizontal edge element, and an inclined edge element connecting between the upper and lower edge elements. The upper edge of the fixed portion of the shutter forms a cut-off line when the shutter is removed from the light passageway from the light source to the projection lens.

Accordingly, at a predetermined side of the vertical axis on the screen, i.e., an area from the center to the side of the same lane, glare light directed at another vehicle traveling ahead of the vehicle is prevented by a corresponding cut-off portion of the light distribution pattern which is an upper area of a corresponding portion of the cut-off line constituted by an upper horizontal cut-off line element formed by the lower horizontal upper edge element of the fixed portion of the shutter, an inclined cut-off line element formed by the inclined upper edge element of the fixed portion of the shutter, and a middle horizontal cut-off line element formed by an upper horizontal upper edge element of the fixed portion of the shutter. On the other hand, at the other side of the predetermined side of the vertical axis on the screen, i.e., an area from the center to the side of the on-coming lane, a cut-off line element can be varied to increase an illuminated distance to the front of the vehicle in a range that glare light to at least another driver of the vehicle traveling ahead of the vehicle on the same lane can be prevented. Depending on the range of increase of the illuminated area, glare light to drivers of vehicles traveling both ahead of the vehicle and on the on-coming lane can be prevented. Therefore, when the vehicle drives on a curve or a corner whose curving direction is toward an on-coming lane, the vehicle light can provide a sufficiently bright field of vision by increasing an illuminated distance at the side of the on-coming lane, thereby visibility to the forward of the curve or the corner is improved without glare directed at a driver of another car running ahead of the vehicle.

In the structure in which at least the movable portion of the shutter is concave when viewed in a direction facing to the projection lens and is disposed to be movable, preferably in a rotating manner, around a vertical axis located at the side of the projection lens, since the movable portion of the shutter can be laterally moved from its fully inserted position to its removed position relative to the light passageway from the light source to the projection lens, the movement of the movable portion of the shutter can be adjusted with high precision. This structure decreases the cost associated with complicated or large sized driving mechanisms of the movable portion of the shutter.

In case that the movable portion of the shutter can be moved from its fully inserted position to its removed position depending on a steering angle, as the steering angle increases, the movable portion of the shutter laterally moves at a larger rotating angle. At this time, if a vehicle light is designed to drive normally in a left lane, in an area from the center to the left side of the vertical axis on the screen, the fixed portion of the shutter forms an upper horizontal cut-off line element and an inclined cut-off line element, and the movable portion of the shutter forms a middle horizontal cut-off line element in order to prevent from providing glare light to a driver of a car running ahead of the vehicle. In an area from the center to the right side of the vertical axis on the screen, i.e., on the side of an on-coming lane, the cut-off line varies at a wide horizontal angle range relative to a crossed point of the vertical and horizontal axes on the screen, i.e., a light source position on the screen, such that an illuminated distance to the front at the on-coming lane side of the vehicle is increased. It is preferable that, as radius of curvature of the curve is smaller, the horizontal angle range of the illuminated area by the vehicle light increases at the side of on-coming lane such that visibility to the forward of the curve or corner is improved.

In the fourth and fifth aspects of the present invention, the driving mechanism of the shutter can include a return spring for pulling the movable portion of the shutter to its fully inserted position relative to a corresponding light passageway, and a stopper for retaining the movable shutter in the fully inserted position. When the driving mechanism is not operated, the movable portion of the shutter is located in its fully inserted position. Accordingly, even when the driving mechanism malfunctions, the movable portion of the shutter is pulled to and retained in the fully inserted position. Therefore, the vehicle light comprising this driving mechanism of the shutter does not inadvertently provide an excessively long illuminated distance at the side of the on-coming lane.

According to the fifth aspect of the invention, light rays which directly emanate from the light source or are reflected by the major reflecting surface are incident to the projection lens. When the light rays pass through the projection lens, the light rays are refracted in a converging manner to the forward of the projection lens by a predetermined degree.

When the second reflecting surface is fully inserted in a light passageway from the light source to the first reflecting surface, light rays emitted from the light source to the second reflecting surface are reflected by the second reflecting surface and further by the fourth reflecting surface. The fourth reflecting surface reflects the light rays to the forward of the vehicle to illuminate a rather wide downward area in front of the vehicle light. Accordingly, when the vehicle drives on a straight way, the vehicle light can illuminate a traveling direction of the road, i.e., straight forward, with an increased amount of light.

When the second reflecting surface is located away from the light passageway from the light source to the first reflecting surface, light rays emitted from the light source to the first reflecting surface are reflected by the first reflecting surface to be incident to the projection lens. The light rays pass through the projection lens, and travel forward to intensively illuminate an increased illuminated area formed by removal of the movable portion of the shutter from its corresponding light passageway. The increased illuminated area is preferably an approximate band located slightly under the horizontal axis on the screen, which band variably extends from the center to the on-coming lane side of the vertical axis on the screen.

Corresponding to the movement of the second reflecting surface from its fully inserted position relative to the light passageway from the light source to the first reflecting surface, the movable portion of the shutter is laterally moved from its fully inserted position to its removed position relative to the light passageway from the light source to the projection lens, thereby a shape of a cut-off portion of the light distribution pattern is varied such that a portion of a cut-off line varies in a vertical direction while a sufficient amount of light is provided along a curving traveling direction of the vehicle, when the vehicle drives on a curve or turns around a corner.

By movement of the movable portion of the shutter, a cut-off portion of the light distribution pattern is varied such that an illuminated area at the side of the on-coming lane is increased. Further, by movement of the second reflecting surface corresponding to an operation of a driving mechanism for moving the second reflecting surface, an amount of light illuminated to the side of an on-coming lane is increased. Accordingly, by simultaneous movement of the movable portion of the shutter and the second reflecting surface, when the vehicle drives on a curve or turns around a corner whose curving direction is toward the on-coming lane, e.g., to the right in a case that the vehicle is required to drive normally on a left lane on a road, an illuminated distance at the side of the on-coming lane is increased, and sufficient visibility to the side of the on-coming lane, i.e., the forward of the curve, can be obtained.

In the fifth aspect of the invention, by movement of the second reflecting surface, a traveling direction of a portion of light rays emitted from the light rays are selectively and gradually switched between a rather wide downward area of the light distribution pattern via the second and fourth reflecting surfaces, and the variable portion which is a predetermined area of the light distribution pattern from the center to the side of on-coming lane. The movable portion of the shutter moves in line with the second reflecting surface such that an illuminated distance at the side of the on-coming lane is increased. In the fifth aspect of the invention, it is sufficient to move only the second reflecting surface and the movable portion of the shutter for switching the illuminated area on the road, i.e., light distribution characteristics. Accordingly, a required space for movement of the second reflecting surface and the movable portion of the shutter is relatively small.

In a sixth aspect of the invention, a vehicle light can include a light source, a major reflecting surface directing light emitted from the light source to the forward of the vehicle light, a projection lens for refracting light from the light source and the major reflecting surface in a converging manner by a predetermined degree, a shutter located in the light passageway from the light source to the projection lens for prohibiting an unnecessary portion of light on formation of a light distribution pattern, and following three reflecting surfaces. A first reflecting surface is an ellipse group reflecting surface having a focus in the vicinity of the light source. The first reflecting surface can move around the longitudinal axis of the ellipse group first reflecting surface in a rotating manner to be inserted in or removed from the light passageway from the light source to a third reflecting surface. A second reflecting surface comprises at least one parabolic group reflecting surface element having a focus in the vicinity of the second focus of the first reflecting surface. The second reflecting surface is concave when viewed in a direction facing to the front of the vehicle light. The third reflecting surface comprises at least one elliptic group reflecting surface element which reflects light rays from the light source to the forward of the vehicle light when the first reflecting surface is at least partly removed from the light passageway from the light source to the third reflecting surface. Light rays from the third reflecting surface are converged by a predetermined degree when passing through the projection lens, and illuminate the forward of the vehicle light.

When the vehicle drives on a curve, e.g., a curve to the left, the first reflecting surface is moved in a predetermined direction, i.e., to the right, to be located in a predetermined position such that at least a portion of light rays becomes incident on a predetermined portion of the third reflecting surface, while the other portion of light rays are reflected by the first reflecting surface to be incident on a predetermined portion of the second reflecting surface.

The first reflecting surface can be divided into at least two first reflecting surface elements, each element can be separately moved to be inserted in or removed from the light passageway from the light source to the third reflecting surface. When the vehicle travels on a curve, e.g., a curve to the left, one predetermined first reflecting surface element, e.g., a right one relative to the optical axis X of the vehicle light, can solely move in one predetermined direction, e.g., to the right, to pass through at least a portion of light rays from the light source to the third reflecting surface, while another predetermined first reflecting surface element is fixedly located to reflect light rays from the light source to the second reflecting surface.

It is preferable that the first reflecting surface or the first reflecting surface elements can be moved from their respective inserted positions to removed positions depending on steering angle detected or road condition information obtained through a car navigation system.

The vehicle light according to the sixth aspect further preferably includes a sixth reflecting surface located inside of the first reflecting surface. The sixth reflecting surface is preferably an ellipse group reflecting surface having a first focus in the vicinity of the light source, and can include a center aperture and at least one aperture located in the vicinity of an upper edge of the sixth reflecting surface. The aperture located in the vicinity of an upper edge of the sixth reflecting surface can be a window portion.

The vehicle light according to the sixth aspect further preferably includes a plurality of projection lenses, each projection lens corresponding to each passageway of light reflected by a corresponding portion of the third reflecting surface to the forward.

In the sixth aspect of the invention, the shutter has a similar structure to that of the fourth and fifth aspects, including a fixed portion and a movable portion located to at least partly cover the fixed portion. The movable portion can be laterally moved from its inserted position relative to a light passageway from the light source to the projection lens, while the fixed portion is fixedly located. A shape of a cut-off line of the light distribution pattern can be varied by movement of the movable portion of the shutter.

In the sixth aspect of the invention, the vehicle light preferably further includes a plurality of shutters corresponding to each passageway of light reflected by a corresponding portion of the third reflecting surface to the forward.

In the sixth aspect of the present invention, the vehicle light preferably further includes at least one fourth reflecting surface located at at least one predetermined outer side, i.e., either right outside or left outside, of the second reflecting surface, and at least one fifth reflecting surface located on at least one predetermined outer side of the third reflecting surface, when viewed laterally, which side is the other side of the predetermined side on which the fourth reflecting surface is located, i.e., either left or right. At this time, the aperture in the vicinity of the upper edge of the sixth reflecting surface, if any, and the first reflecting surface or the first reflecting surface element respectively have appropriate sizes to cover corresponding light passageways from the light source to corresponding portions of the third reflecting surface and the fifth third reflecting surface. The fourth reflecting surface can be a continuous smooth surface, or a separate surface, from the second reflecting surface. The fifth reflecting surface can be a continuous smooth surface, or a separate surface, from the third reflecting surface.

The fourth reflecting surface reflects light rays from a corresponding portion of the first reflecting surface to a forward direction which is inclined to a predetermined side, i.e., either left or right, of the vehicle light. The fifth reflecting surface reflects light rays from the light source to the central forward in a converging manner by a predetermined degree, when the first reflecting surface or the first reflecting surface element is removed at least partly from the light passageway from the light source to the fifth reflecting surface.

In the sixth aspect of the invention, when the vehicle drives at a high speed, the first reflecting surface or all of the first reflecting surface elements is preferably fully removed from the light passageway from the light source to all of the third and fifth reflecting surface elements.

In the sixth aspect of the invention, light rays emitted from the light source directly to the projection lens, and light rays reflected by the major reflecting surface are incident to the projection lens. Light rays incident to the projection lens are refracted by a predetermined degree to the front focus of the projection lens when passing through the projection lens, and further travel to the forward to illuminate a predetermined area on a road. A portion of light rays incident to the projection lens are prohibited or cut-off by the shutter such that the light distribution pattern has a relatively shorter illuminated distance at the side of the on-coming lane. Further, when the first reflecting surface is located in the light passageway from the light source to the third reflecting surface, light rays incident on the first reflecting surface are reflected thereby to the second reflecting surface. The second reflecting surface reflects light rays to a front downward direction in a converging manner by a predetermined degree to illuminate a predetermined area on the road. Herein, when the first reflecting surface or a predetermined first reflecting surface element starts to remove from its fully inserted position relative to the light passageway, a portion of light rays traveling from the light source to the vicinity of the fully inserted position of the first reflecting surface or the first reflecting surface element, pass through the removed area of the first reflecting surface or the first reflecting surface element, and reach a corresponding portion of the third reflecting surface. The third reflecting surface reflects such light rays to illuminate a predetermined front area under a horizontal axis on a screen with a sufficient light amount to the downward. A general traveling direction of light rays reflected by the third reflecting surface and which have passed through the projection lens is slightly inclined to a predetermined side, either right or left, relative to the optical axis of the vehicle light, which side is a traveling direction of the vehicle. Accordingly, when the vehicle drives on a curve, an illuminated distance into the traveling direction of the vehicle is increased, and visibility to the forward in the traveling direction of the vehicle is improved.

Further, when the first reflecting surface or all of the first reflecting surface elements are fully removed from the light passageway from the light source to the third reflecting surface depending on a traveling direction of the vehicle, e.g., the vehicle travels straight ahead at a high speed, all of the light rays directing from the light source to the inserted position(s) of the first reflecting surface or the first reflecting surface elements, pass through an aperture(s) formed by removal of the first reflecting surface or the first reflecting surface elements corresponding to the fully inserted position(s), and travel to the third reflecting surface. The third reflecting surface reflects such light rays to illuminate a predetermined front area under a horizontal axis on a screen with sufficient light amount to the downward direction. A general traveling direction of light rays reflected by the third reflecting surface that passes through the projection lens is slightly inclined to the traveling direction of the vehicle relative to the optical axis of the vehicle light, e.g., a straight forward direction substantially parallel to the optical axis of the vehicle light. Accordingly, illuminance to the traveling direction of the vehicle is improved, and visibility to the traveling direction of the vehicle is improved.

When the vehicle travels on a curve, e.g., a curve to the left, the first reflecting surface or a predetermined first reflecting surface element located at a predetermined side, e.g., the right, relative to the optical axis of the vehicle light solely moves in a direction opposite to the curving direction, e.g., to the right, in a rotating manner. Light rays that have passed through an aperture formed at one side, e.g., right, of the optical axis of the vehicle light by removal of the first reflecting surface or the corresponding first reflecting surface element become light rays traveling to the another side, e.g., left, after being reflected by a corresponding portion of the third reflecting surface and passing through the corresponding projection lens, if any. More specifically, after being reflected by the corresponding portion of the third reflecting surface, and passing through the projection lens, if any, the light rays illuminate a front downward area slightly under a horizontal axis on the screen. A general traveling direction of light rays reflected by the corresponding portion of the third reflecting surface, and passing through the projection lens, if any, is slightly inclined to the traveling direction of the vehicle relative to the optical axis of the vehicle light, e.g., left forward direction. Accordingly, when the vehicle travels on a curve, e.g., a curve to the left, an illuminated distance to the front of the vehicle light which is inclined to a predetermined side, e.g., left, is increased such that visibility to the front of the vehicle at the side of lateral traveling direction, e.g., a left front of the vehicle, is improved.

In case that the first reflecting surface is moved in a rotating manner from its fully inserted position to its removed position relative to the light passageway from the light source to the third reflecting surface based on a detected steering angle and/or information on road conditions obtained by a car navigation system, the first reflecting surface or the first reflecting surface element can be gradually moved in a lateral direction from its fully inserted position. Thereby, a horizontal angle range relative to the light source position of an illuminated area illuminated by the light rays which passed through an aperture formed by removal of the first reflecting surface or the corresponding first reflecting surface element and reflected by the third reflecting surface, is increased such that an illuminated distance toward a traveling direction of the vehicle, which is inclined to either left or right relative to a vertical axis on the screen, is increased. As radius of curvature of the curve is smaller, the horizontal angle range of the illuminated area and the illuminated distance into a predetermined side front of the vehicle are set to be larger. Accordingly, the vehicle light can provide superior visibility to the forward of the curve.

If the sixth reflecting surface is located inside the first reflecting surface, or inside both the first and fourth reflecting surfaces, the sixth reflecting surface is an ellipse group reflecting surface having a focus in the vicinity of the light source, and comprising a center aperture located in the vicinity of the light passageway from the light source directly to the projection lens, and at least one aperture located in the vicinity of the upper edge of the sixth reflecting surface. If only one aperture is included around the upper edge, a center line of a width of the aperture is located along the optical axis direction of the vehicle light, and substantially symmetrical relative to the center line. If an even number of apertures is included, a center line, which passes through a center of a width of a sixth reflecting surface portion located between the two central apertures, is located along the optical axis direction of the vehicle light, and substantially symmetrical relative to the center line.

Light rays emitted from the light source to the direct front, and light rays reflected by the major reflecting surface are incident to the projection lens. When passing through the projection lens, the light rays are refracted by a predetermined degree in a converging manner to a front focus of the projection lens, and illuminate a predetermined area on the road.

When the first reflecting surface or the first reflecting surface element(s) is(are) located in its fully inserted position(s), light rays incident to the aperture(s) of the sixth reflecting surface are reflected by the first reflecting surface or the corresponding first reflecting surface element(s), and further reflected by the second reflecting surface or the corresponding second reflecting surface element(s). When the light rays are reflected by the second reflecting surface or the corresponding second reflecting surface element(s), the light rays are converged by a predetermined degree and illuminate a predetermined area on the road, i.e., front downward.

When the first reflecting surface or the first reflecting surface element(s) start to move from its (their) fully inserted position(s) in a direction away from the light passageway, at least a portion of light rays directing from the light source to the third reflecting surface or third reflecting surface element(s) pass through the aperture or corresponding aperture(s) of the sixth reflecting surface without being reflected by the first reflecting surface or the corresponding reflecting surface element(s). The third reflecting surface or the corresponding third reflecting surface element(s) reflects light rays to the forward of the vehicle to illuminate a predetermined area slightly under the horizontal axis on the screen. A general direction of light rays reflected by the third reflecting surface or the third reflecting surface element(s) is slightly inclined to a predetermined side relative to the optical axis of the vehicle light, which side is in the traveling direction of the vehicle.

If a plurality of projection lenses are arranged for each light passageway from each third reflecting surface element, light rays from the third reflecting surface are converged in a unit of every light passageway to each projection lens respectively by an appropriate degree for illuminating a respective predetermined area on the road with predetermined light distribution characteristics.

If the shutter includes a fixed portion which is fixedly located, and a movable portion which overlaps at least partly with the fixed portion and is capable of lateral movement from its fully inserted position relative to the light passageway from either the light source or a corresponding portion of the third reflecting surface element to the corresponding projection lens, a shape of a cut-off line of the light distribution pattern can be varied by lateral movement of the movable portion relative to the fixed portion of the shutter such that location of a portion of the cut-off line is varied in a vertical direction. Thereby, when the vehicle drives on a curve or turns around a corner, an illuminated distance into a traveling direction of the vehicle can be increased to provide sufficiently improved visibility to the forward of the curve or the corner.

In the case when a plurality of shutters are arranged for each light passageway from the third reflecting surface element to the forward, all the shutters can be fixedly located and do not include any movable portion, or alternatively, all the shutters can respectively include a movable portion. If all the shutters can respectively include a movable portion, all the shutters have substantially the same structure among them except their sizes. If all the shutters do not have any movable portion, the shutter located in the light passageway along the optical axis of the vehicle light provides a fixed element of the light distribution pattern at any time of operation of the vehicle light. By movement of the first reflecting surface or the corresponding first reflecting surface element(s), light rays become incident to either the third reflecting surface or the corresponding third reflecting surface element(s), and the corresponding projection lens(s). As a result, if all the shutters respectively have a movable portion, a shape of a cut-off line of the light distribution pattern is varied in a vertical direction to increase an illuminated distance to the traveling direction when driving on the curve or turning around a corner such that visibility to the forward of a curve or corner is improved. The shutters located in the respective light passageways from the corresponding portion of the third reflecting surface are preferably designed such that light rays that have passed through the corresponding projection lens illuminate an increased illuminated area of the light distribution pattern in accordance with the movement of the first reflecting surface or the corresponding first reflecting surface element(s). If all the shutters have no movable portion, an entire shape of the light distribution pattern may not be varied, but light intensity illuminating forward of the curve or corner is increased such that visibility to the forward of the curve or corner is improved. Since no movable portion is included in the shutter, a structure of the vehicle light assembly can be simplified, which leads to cost reduction and easy maintenance.

In the case that the vehicle light according to the sixth aspect of the invention further includes at least one fourth reflecting surface located at at least one predetermined outer side, e.g., left side, of the second reflecting surface, and at least one fifth reflecting surface located at at least one predetermined outer side, e.g., right side, of the third reflecting surface, when the first reflecting surface or the first reflecting surface element(s) is partly inserted in the light passageway from the light source to the fifth reflecting surface, light rays reflected by the first reflecting surface and fourth reflecting surfaces illuminate a predetermined side front area, e.g. a front left side area, thereby sufficient field of vision to the predetermined side front is obtained. On the other hand, light rays that have passed through an aperture formed by removal of the first reflecting surface or the first reflecting surface element are reflected by the fifth reflecting surface, and illuminate a predetermined front area located slightly under the horizontal axis on the screen such that an illuminated distance to the front at the side of a traveling direction of the vehicle, when viewed laterally, e.g., a front area at the right side of the vertical axis on the screen, is increased to improve visibility to the traveling direction of the vehicle.

When the vehicle travels at a high speed, it is preferable that the first reflecting surface or all the first reflecting surface elements be completely removed from the light passageway(s) from the light source to the fifth reflecting surface. Illumination to the side front is not required when the vehicle travels at high speed. Therefore, it is preferable to switch light distribution from the side front to the direct front area under the horizontal axis on the screen to increase an illuminated distance to the direct front area such that visibility to the front of the vehicle is improved when the vehicle travels at a high speed.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 14(A) shows a light distribution pattern for the vehicle light of FIG. 12 when a second reflecting surface is located away from the light passageway from the light source to the first reflecting surface, and a light distribution pattern element L1 of light that has passed through an aperture on the third reflecting surface in the vicinity of the optical axis and a projection lens of a vehicle light of FIG. 12, according to the third preferred embodiment of the present invention;

FIG. 14(B) shows a light distribution pattern for the vehicle light of FIG. 12 when the second reflecting surface is inserted in the light passageway from the light source to the first reflecting surface, and a light distribution pattern element L2 of light from a fifth reflecting surface of the vehicle light of FIG. 12, according to the third preferred embodiment of the present invention;

FIG. 14(C) shows a light distribution pattern for the vehicle light of FIG. 12 when the second reflecting surface is located away from the light passageway from the light source to the first reflecting surface, and a light distribution pattern element L6 of light from a first reflecting surface, which is also passed through the projection lens, of a vehicle light of FIG. 12, according to the third preferred embodiment of the present invention;

FIG. 14(E) shows a light distribution pattern for the vehicle light in FIG. 12 when the second reflecting surface is inserted in the light passageway, and a light distribution pattern element L4 of light from the fourth reflecting surface of a vehicle light of FIG. 12, according to the third preferred embodiment of the present invention;

DETAILED DESCRIPTION OF THE PREFERRED EMBODIMENTS

Figure 1:
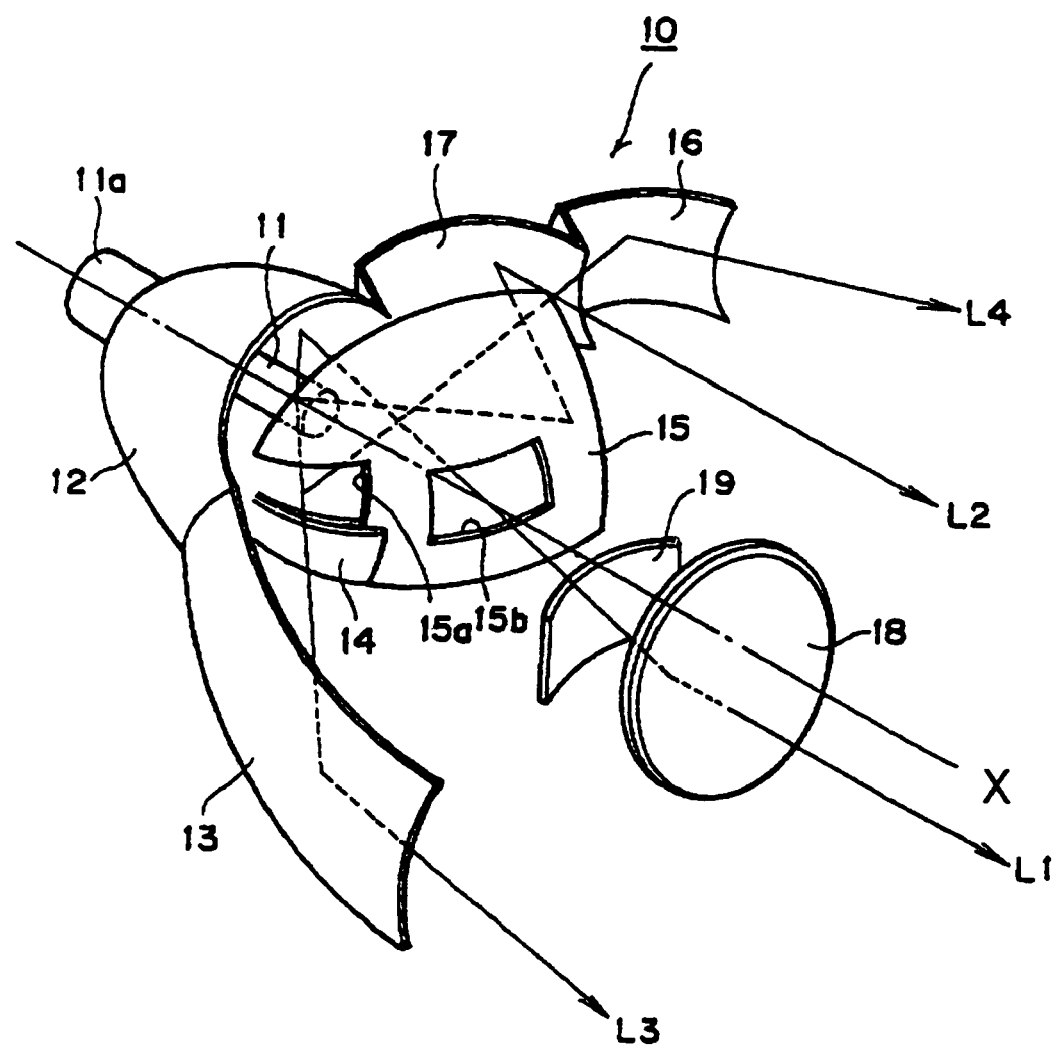
FIG. 1 is a schematic perspective view of a vehicle light according to a first preferred embodiment of the present invention.

Detailed description of the present invention will now be given based on embodiments shown in the drawings. Whenever possible, the same reference numbers are used throughout the drawings to refer to the same or like parts.

Figure 2:
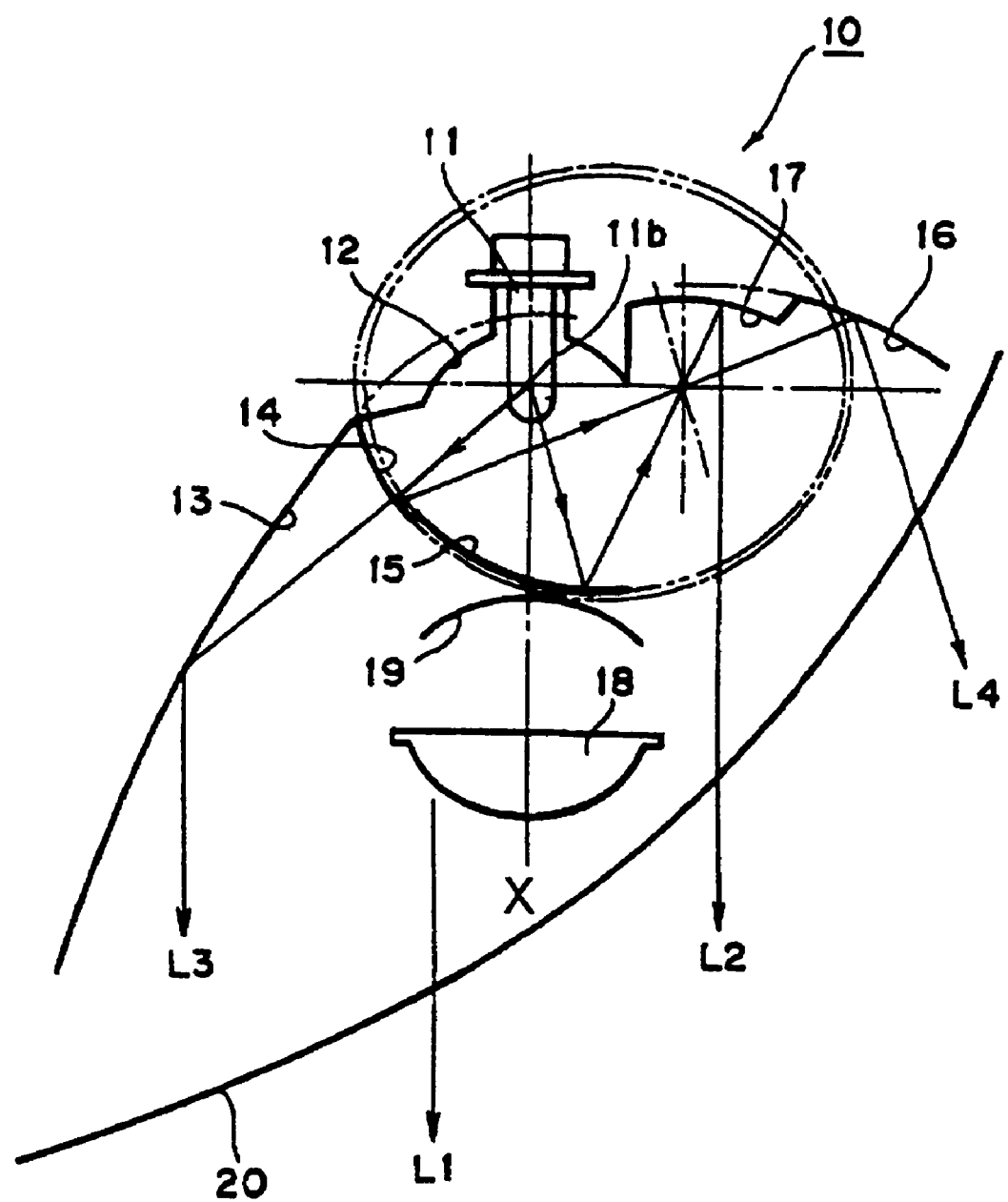
FIG. 2 is a horizontal cross sectional view along an optical axis X of the vehicle light of FIG. 1 according to the first preferred embodiment of the present invention.
Figure 3:
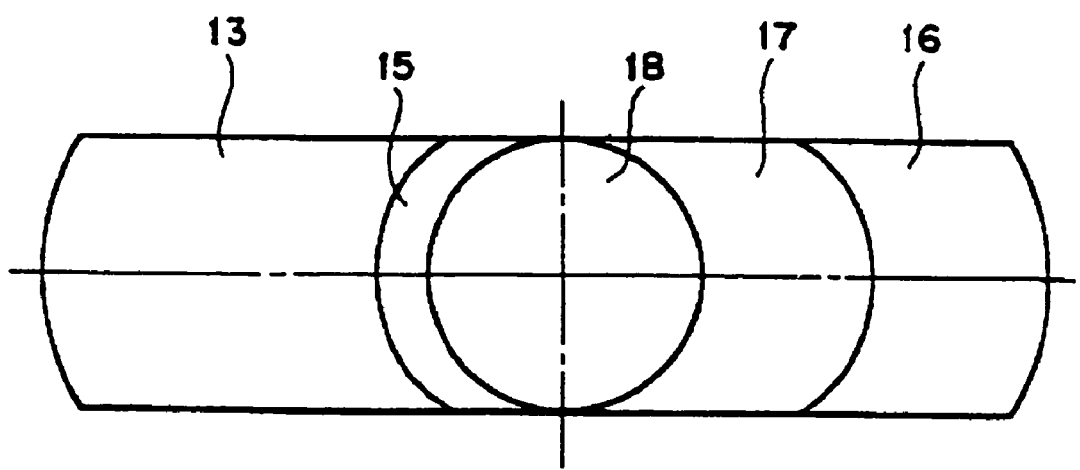
FIG. 3 is a front view of the vehicle light of FIG. 1 according to the first preferred embodiment of the present invention.

FIGS. 1–3 show a vehicle light 10 according to a first preferred embodiment of the present invention. The vehicle light 10 is configured as a vehicle light disposed at a left front side of a vehicle, and comprising a light bulb 11 having as a light source, a major reflecting surface 12 located to surround the light bulb 11, a first reflecting surface 13, a second reflecting surface 14, a third reflecting surface 15, a fourth reflecting surface 16, and a fifth reflecting surface 17, a projection lens 18, a shutter 19 and a front lens 20. The first through fifth reflecting surfaces are respectively located outside of the major reflecting surface 12. Among above-described elements, all elements except the second reflecting surface 14 are fixed in their respective positions. The second reflecting surface 14 is movable. In FIG. 1, there exists a step between the fourth reflecting surface 16 and the fifth reflecting surface 17. However, the fourth reflecting surface 16 and the fifth reflecting surface 17 can be formed as a continuous surface.

The light bulb 11 is the one which is generally used for an automobile headlight or a supplementary headlight. The light bulb 11 is fixed in a socket 11a through which electric power is supplied. In FIG. 1, the light bulb 11 is disposed such that a longitudinal direction of a filament 11b is located along an optical axis X of the vehicle light. However, the light bulb 11 can be disposed such that the longitudinal direction of the filament 11b can be located in a horizontal direction perpendicular to an optical axis X of the vehicle light 10. The filament 11b can be a discharge arc 11b when a discharge lamp is adopted as a light bulb 11.

The major reflecting surface 12 can be formed to be concave when viewed in a direction facing to the front of the vehicle light 10 such that the major reflecting surface 12 reflects light emitted from the light bulb 11 to the projection lens 18. The major reflecting surface 12 can be preferably an ellipse group reflecting surface such as a rotated elliptic surface or an elliptic free-curved surface having a first focus substantially on the filament 11b and a second focus in the vicinity of the focus of the projection lens 18.

The first reflecting surface 13 is preferably a parabolic group reflecting surface located at a predetermined side of the major reflecting surface 12, i.e., a right side of the major reflecting surface 12 in FIG. 1. The first reflecting surface 13 has its focus in the vicinity of the filament 11b, and is concave when viewed in a direction facing the front of the vehicle light 10. Throughout the present invention, the parabolic group reflecting surface can be defined as a curved surface having a parabola or similar shape as a whole, such as a rotated parabolic source, a complex parabolic surface, a paraboloidal surface, a parabolic free-curved surface, or combination thereof. Light rays emitted from a light source located on a focus of the parabolic group reflecting surface are reflected to be parallel to the axis of the parabolic group reflecting surface.

Figure 4:
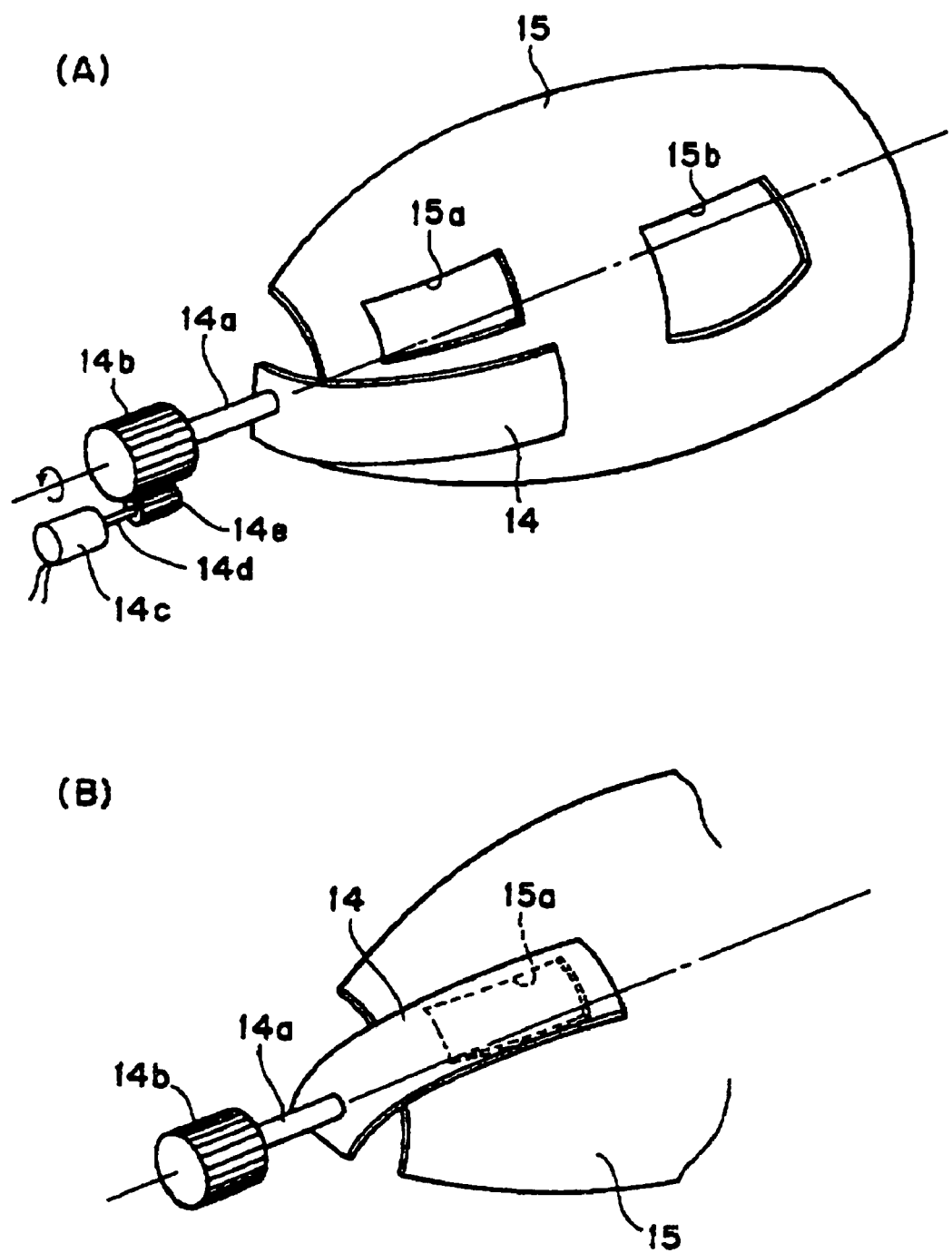
FIG. 4(A) is a schematic perspective view of a mechanism for moving a second reflecting surface of the vehicle light of FIG. 1 when the second reflecting surface is located away from a light passageway according to the first preferred embodiment of the present invention.
FIG. 4(B) is a schematic perspective view of a mechanism for moving the second reflecting surface of the vehicle light of FIG. 1 when the second reflecting surface is inserted in a light passageway according to the first preferred embodiment of the present invention.

The second reflecting surface 14 is preferably an ellipse group reflecting surface such as a rotated elliptic surface having a first focus in the vicinity of the filament 11b with its longitudinal axis across the optical axis X of the vehicle light 10. In FIG. 2, the longitudinal axis of the second reflecting surface 14 is substantially perpendicular to the optical axis X of the vehicle light 10. The second reflecting surface 14 is concave when viewed in a direction facing to the back of the vehicle light 10. The second reflecting surface 14 can be moved around the longitudinal axis such that the second reflecting surface 14 can be inserted in and removed from a light passageway from the light source 11 to the first reflecting surface 13. FIGS. 4(A)–(B) illustrate a mechanism for moving the second reflecting surface 14. FIG. 4(A) illustrates a state when the second reflecting surface 14 is located away from the light passageway from the filament 11b to the first reflecting surface 13. Light emitted from the filament 11b passes through a first aperture 15a to the first reflecting surface 13. FIG. 4(B) illustrates a state when the second reflecting surface 14 is inserted in the light passageway from the filament 11b to the first reflecting surface 13. The second reflecting surface 14 covers the first aperture 15a. The mechanism for moving the second reflecting surface 14 comprising a motor 14c, a motor driving axis 14d, a pinion 14e disposed on the motor driving axis 14d, a reduction gear 14b which is engageable with the pinion 14e, and a rotational axis 14a of the reduction gear 14b. The location of the rotational axis 14a is consistent with the longitudinal axis of the second reflecting surface 14, and the second reflecting surface 14 is fixed on the rotational axis 14a. In a state where the motor 14c is turned off, the second reflecting surface 14 is located in a position not to cover the first aperture 15a. When the motor 14c is turned on, electric power supplied to the motor 14c is converted into mechanical force such that the driving motor axis 14d is rotated together with the pinion 14e. By rotation of the pinion 14e, the reduction gear 14b starts to rotate, thereby the second reflecting surface 14 connected to the rotational axis 14a of the reduction gear 14b is rotationally moved around the longitudinal axis of the second reflecting surface 14. At this time, the second reflecting surface 14 covers partly or entirely the aperture 15a depending on an amount of rotational movement. The amount of rotational movement can be adjusted by varying an amount of electric power supplied to the motor 14c.

The third reflecting surface 15 is preferably an ellipse group reflecting surface having a first focus in the vicinity of the filament 11b and a longitudinal axis which is across the optical axis X of the vehicle light 10. In FIG. 2, the longitudinal axis of the third reflecting surface 15 is substantially perpendicular to the optical axis X of the vehicle light 10. The third reflecting surface 15 is concave when viewed in a direction facing to the back of the vehicle light 10. Throughout the present invention, the ellipse group reflecting surface can be defined as a curved surface having an ellipse or its similar shape as a whole, such as a rotated elliptic surface, a complex elliptic surface, an ellipsoidal surface, an elliptic cylindrical surface, an elliptical free-curved surface, or combination thereof. If a light source is located on a first focus of the ellipse group reflecting surface, light rays emitted from the light source converge to a second focus of the ellipse group reflecting surface. The third reflecting surface 15 includes the first aperture 15a located in an area corresponding to the vicinity of the light passageway from the filament 11b to the first reflecting surface 13, and a second aperture 15b located in an area corresponding to the vicinity of the light passageway from the filament 11b to the projection lens 18. In the vehicle light 10, as shown in FIG. 2, the second reflecting surface 14 and the third reflecting surface 15 have substantially common first and second foci. A substantial ellipse constituting the second reflecting surface 14 is large enough to surround substantially all periphery of an ellipse constituting the third reflecting surface 15. However, shapes and positional relationship of the two ellipse group reflecting surfaces 14 and 15 are not limited to the configuration in FIG. 2. An example of other configuration will be described later in detail referring to another preferred embodiment of the present invention.

The fourth reflecting surface 16 can be formed as a parabolic group reflecting surface having a focus in the vicinity of the second focus of the second reflecting surface 14 and an axis which is inclined to the outside relative to the optical axis X of the vehicle light 10. The fourth reflecting surface 16 is concave when viewed in a direction facing to the front of the vehicle light 10.

The fifth reflecting surface 17 can be formed as a parabolic group reflecting surface having a focus in the vicinity of the second focus of the third reflecting surface 15 and an axis which is substantially parallel to the optical axis X of the vehicle light 10. The fifth reflecting surface 17 is concave when viewed in a direction facing to the front of the vehicle light 10.

The projection lens 18 can be a convex lens located on the optical axis X of the vehicle light 10 which passes through the filament 11b. When light rays reflected by the major reflecting surface 12 or directly come from the filament 11b pass through the projection lens 18, the light rays are refracted by the projection lens 18 in a converging manner to the forward of the vehicle light 10 by a predetermined degree. Light rays that have passed through the projection lens 18 in such a manner further travel to the forward of the vehicle light 10.

The shutter 19 can be formed of a shading material. The shutter 19 is located in a light passageway from the light bulb 11 to the projection lens 18, preferably in the vicinity of a focus of the projection lens 18. The focus of the projection lens 18 is located between the second aperture 15b and the projection lens 18. Image of light in the vicinity of the focus of the projection lens 18 is projected upsidedown and left to be right at the forward of projection lens 18. The shutter 19 prohibits a portion of light rays converged in the vicinity of the focus of the projection lens 18 which is unnecessary for the formation of a light distribution pattern. The prohibited portion of light rays by the shutter 19 forms a cut-off portion of the light distribution pattern. By adjusting the shape of the shutter 19, location of a cut-off line of the light distribution pattern can be adjusted. The focused image of light in the vicinity of the focus of the projection lens 18 is constituted by light rays coming directly from the filament 11b and that have passed though the second aperture 15b, and light rays reflected by the major reflecting surface 12 and that have passed through the second aperture 15b.

The front lens 20 can be made of a transparent material, and an inside structure of the vehicle light 10 can be seen through the front lens 20. An entire periphery of the front lens 20 is disposed on a housing by welding or an adhesive such that inner atmosphere of the housing is sealed.

In the vehicle light 10 having a structure described in the above, light is produced by supplying electric power to the socket 11a. Light is emitted and radiated from the filament or a discharge arc 11b. Light incident on the third reflecting surface 15 is constituted by light rays directly come from the filament 11b and light rays reflected by the major reflecting surface 12.

Light rays L1 which are incident to the second aperture 15b pass through the second aperture 15b. A portion of the light rays L1 which is unnecessary for formation of the light distribution pattern is prohibited by the shutter 19 to be a cut-off portion of the light distribution pattern. Light rays L1 which are not prohibited by the shutter 19 then become incident to the projection lens 18. The light rays L1 are refracted by the projection lens 18 in a converging manner to the forward of the vehicle light by a predetermined degree when passing through the projection lens 18, then further travel forward. After passing through the projection lens 18, the light rays L1 pass through the front lens 20, and illuminate a front area of the vehicle light 10.

Figure 5:
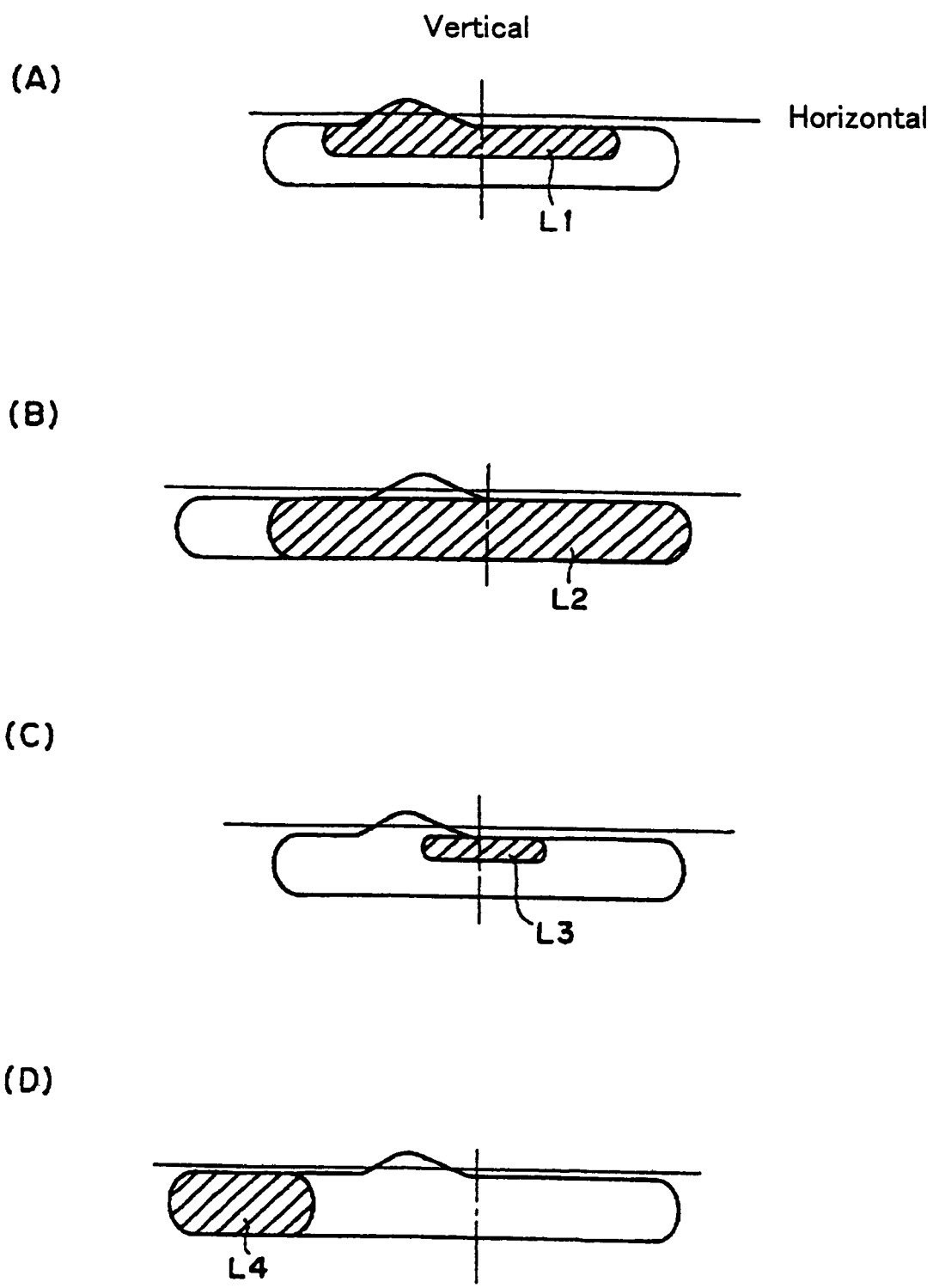
FIG. 5(A) shows a light distribution pattern of the vehicle light of FIG. 1 when the second reflecting surface is located away from the light passageway, and a light distribution pattern element L1 of light that has passed through a projection lens of a vehicle light of FIG. 1 according to the first preferred embodiment of the present invention.
FIG. 5(B) shows a light distribution pattern of the vehicle light of FIG. 1 when the second reflecting surface is fully inserted in the light passageway, and a light distribution pattern element L2 of light from a fifth reflecting surface of the vehicle light of FIG. 1 according to the first preferred embodiment of the present invention.
FIG. 5(C) shows a light distribution pattern of the vehicle light of FIG. 1 when the second reflecting surface is located away from the light passageway, and a light distribution pattern element L3 of light from a first reflecting surface of a vehicle light of FIG. 1 according to the first preferred embodiment of the present invention
FIG. 5(D) shows a light distribution pattern of the vehicle light of FIG. 1 when the second reflecting surface is fully inserted in the light passageway, and a light distribution pattern element L4 of light from the fourth reflecting surface of a vehicle light of FIG. 1 according to the first preferred embodiment of the present invention.

The illuminated area on a screen by the light rays L1 is shown in FIG. 5(A). A light distribution pattern formed by the light rays L1 (hereinafter referred as a light distribution pattern element L1) generally illuminates a wide area under a horizontal axis on the screen. A horizontal cut-off line element is located under the horizontal axis on the screen. The light distribution pattern element L1 also includes an elbow portion at the left side of the vertical axis on the screen for illuminating a road side such as a road sign, a shoulder, or a pedestrian. The elbow portion is an area formed by an extension of a horizontal cut-off line element to the left side of the vertical axis and an inclined cut-off line element which extends from a crossed point of the horizontal cut-off line and the vertical axis into a left upward direction by 15 degrees relative to the extension of the horizontal cut-off line to the left side. The elbow portion partly exceeds the horizontal axis on the screen such that light is illuminated into a relatively distant road side area from the vehicle light.

The light distribution pattern element L1 is stable regardless of movement of the second reflecting surface 14. Therefore, shapes of the major reflecting surface 12, the second aperture 15b, and the shutter 19 are respectively determined to provide the light distribution element L1 with light distribution characteristics which are necessary at any time of operation of the vehicle light 10.

Light rays L2 incident on the third reflecting surface 15 other than the first aperture 15a and the second aperture 15b are reflected by the third reflecting surface 15 to a second focus of the third reflecting surface 15. Since the second focus of the third reflecting surface 15 is also a focus of the fifth reflecting surface 17, light rays L2 focused on the second focus of the third reflecting surface 15 are further reflected by the fifth reflecting surface 17 to a forward direction of the vehicle light 10. Light rays L2 reflected by the fifth reflecting surface 17 pass through the front lens 20, and illuminate a predetermined area in front of the vehicle light 10.

The illuminated area on a screen by the light rays L2 is shown in FIG. 5(B). A light distribution pattern element formed by the light rays L2 (hereinafter referred as a light distribution pattern element L2) generally illuminates a wide area under a horizontal axis on the screen. Specifically, the light distribution pattern element L2 provides a sufficient amount of light directed downward. Accordingly, the light distribution pattern element L2 can illuminate a road from a near front area of the vehicle light 10 to a far front area of the vehicle light 10, while illuminating a wide area on the road in a horizontal direction.

The light distribution pattern element L2 is stable regardless of movement of the second reflecting surface 14.

Therefore, shapes of the third reflecting surface 15 and the fifth reflecting surface 17 are respectively determined to provide the light distribution element L2 with light distribution characteristics which are necessary at any time of operation of the vehicle light 10.

A passageway of light incident to the first aperture 15a of the third reflecting surface 15 differs depending on whether the second reflecting surface 14 is located in, or removed from, a light passageway from the light source 11b to the first reflecting surface 13.

When the second reflecting surface 14 is located away from the light passageway from the light source to the first reflecting surface 13, light rays L3 incident to the first aperture 15a pass through the first aperture 15a and reach the first reflecting surface 13. Since the first reflecting surface 13 is a parabolic group reflecting surface having a focus in the vicinity of the light source 11b, light rays L3 reflected by the first reflecting surface are directed to a generally forward direction. In general, a parabolic group reflecting surface is used to reflect light rays to be parallel to its optical axis when the light source is located at its focus. However, in the first reflecting surface 13, radius of curvature of each portion which collectively constitutes the first reflecting surface 13 can be adjusted such that light rays L3 which are reflected by the first reflecting surface 13 and that have passed through the front lens 20 travel to a center front of the vehicle in a concentrated manner.

The illuminated area on a screen by the light rays L3 is shown in FIG. 5(C). A light distribution pattern element formed by the light rays L3 (hereinafter referred as a light distribution pattern element L3) illuminates a central area of the light distribution pattern under the horizontal axis on the screen with high intensity of light. Accordingly, the light distribution pattern element L3 can illuminate a far front of the vehicle.

When the second reflecting surface 14 is located in the light passageway from the light source 11b to the first reflecting surface 13, light rays L4 incident to the first aperture 15a are reflected by the second reflecting surface 14, and travel to the second focus of the second reflecting surface 14. Since the second focus of the second reflecting surface 14 is also the focus of the fourth reflecting surface 16 whose optical axis is inclined to the outside relative to the optical axis X of the vehicle light 10, light rays reflected by the fourth reflecting surface 16 travel into a front side direction of the vehicle light 10, which is inclined to a predetermined side, i.e., either left or right, of the vehicle light in a horizontal cross-sectional view. The vehicle light 10 in FIGS. 1–3 is designed to be disposed on the left front corner of the vehicle body. In this case, a traveling direction of light reflected by the fourth reflecting surface 16 is inclined to the left side front. The light rays reflected by the fourth reflecting surface 16 pass through the front lens 20, and illuminate the road at a front left side area of the vehicle.

The illuminated area on a screen by the light rays L4 is shown in FIG. 5(D). A light distribution pattern element formed by the light rays L4 (hereinafter referred as a light distribution pattern element L4) generally illuminates a left side area under a horizontal axis on the screen. Specifically, the light distribution pattern element L4 provides a sufficient amount of light to a lower left side portion of the light distribution pattern. Accordingly, the light distribution pattern element L4 can illuminate a front side area of the vehicle on the road such as a shoulder.

When the vehicle light 10 is designed to be disposed at the right side of the vehicle body, such a vehicle light is configured to have a symmetrical structure with the vehicle light 10 relative to a line, which line is located between the two vehicle lights disposed at either side of the vehicle body and is parallel to the optical axis X of the vehicle light 10, other than the shutter 19. Shape and location of the shutter 19 is the same in the two vehicle lights being disposed on both left and right sides of the vehicle body. In the vehicle light designed to be disposed at the right side of the vehicle body, light rays L4 which are reflected by the second reflecting surface 14 and further by the fourth reflecting surface 16 illuminates the right side front of the vehicle. In this case, the light distribution pattern element L4 is located at the right side of the light distribution pattern element L2.

Figure 6:
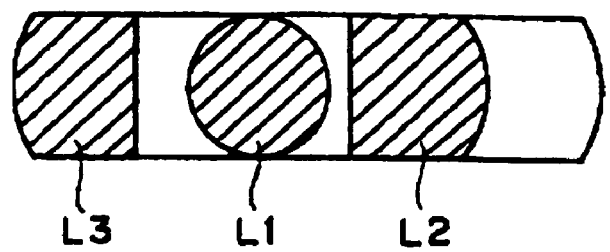
FIG. 6(A) shows a schematic front view of the vehicle light of FIG. 1 when the second reflecting surface is located away from the light passageway according the first preferred embodiment of the present invention, and illustrating which reflecting surfaces of the vehicle light illuminate.
FIG. 6(B) is a light distribution pattern and light distribution pattern elements on a screen for the vehicle light of FIG. 1 when the second reflecting surface is located away from the light passageway from the light source to the first reflecting surface, according to the first preferred embodiment of the present invention.
FIG. 6(C) is a light distribution pattern on a road for the vehicle light of FIG. 1 when the second reflecting surface is located away from the light passageway from the light source to the first reflecting surface, according to the first preferred embodiment of the present invention.
Figure 6:
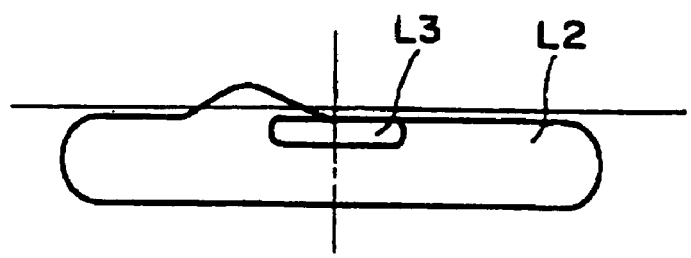
Figure 6:
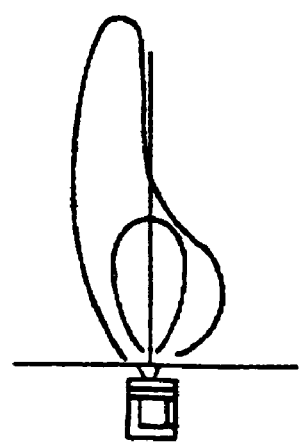

FIG. 6(A) illustrates the vehicle light 10 in FIGS. 1–3 when the second reflecting surface 14 is located away from the light passageway from the light source 11b to the first reflecting surface 13. At this time, light is illuminated to the front of the vehicle light from the projection lens 18 which forms the light distribution pattern element L1, the first reflecting surface 13 which forms the light distribution pattern element L3, and the fifth reflecting surface 17 which forms the light distribution pattern element L2. FIGS. 6(B)–6(C) show light distribution patterns of the vehicle light 10 on a screen and on the road, respectively, when the second reflecting surface 14 is located away from the light passageway from the light source 11b to the first reflecting surface 13. The light distribution pattern element L2 illuminates a relatively wide area in front of the vehicle light 10. The light distribution pattern element L3 illuminates a far distant area in the vicinity of the center of the light distribution pattern, e.g., approximately 60 meters forward of the vehicle light 10, with a relatively high light intensity.

Figure 7:
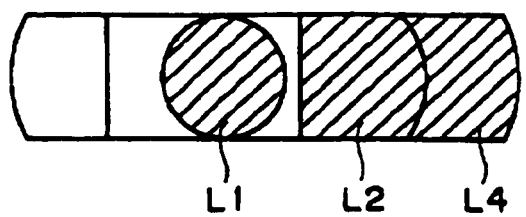
FIG. 7(A) shows a schematic front view of the vehicle light of FIG. 1 when the second reflecting surface is fully inserted in the light passageway from the light source to the first reflecting surface according to the first preferred embodiment of the present invention, illustrating from which reflecting surfaces light is provided.
FIG. 7(B) is a light distribution pattern and light distribution pattern elements on a screen for the vehicle light of FIG. 1 when the second reflecting surface is inserted in the light passageway from the light source to the first reflecting surface, according to the first preferred embodiment of the present invention.
FIG. 7(C) is a light distribution pattern on a road for the vehicle light of FIG. 1 when the second reflecting surface is inserted in the light passageway, according to the first preferred embodiment of the present invention.
FIG. 7(D) is a light distribution pattern on a road for vehicle lights located on either side of the vehicle body when each second reflecting surface of the vehicle light is inserted in the light passageway from the light source to the first reflecting surface, according to the first through third preferred embodiments of the present invention.
Figure 7:
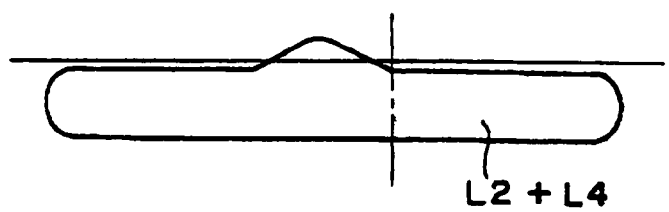
Figure 7:
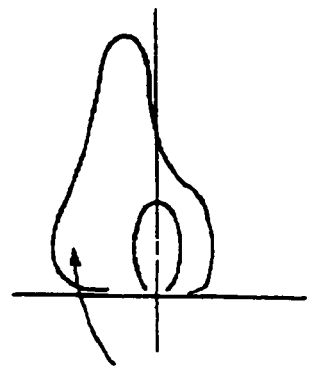
Figure 7:
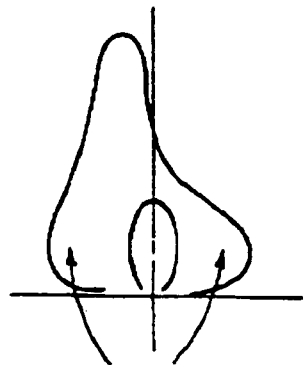

FIG. 7(A) shows the vehicle light 10 in FIGS. 1–3 when the second reflecting surface 14 is inserted in the light passageway from the light source 11b to the first reflecting surface 13. At this time, light is illuminated to the front of the vehicle light 10 from the projection lens 18 which forms the light distribution pattern element L1, the fifth reflecting surface 17 which forms the light distribution pattern element L2, and the fourth reflecting surface 16 which forms the light distribution pattern element L4. In FIG. 1, there exists a step between the fourth reflecting surface 16 and the fifth reflecting surface 17. However, the fourth reflecting surface 16 and the fifth reflecting surface 17 can be formed as a continuous surface. FIGS. 7(B)–7(C) show light distribution patterns of the vehicle light 10 on a screen and on the road, respectively, when the second reflecting surface 14 is inserted in the light passageway from the light source 11b to the first reflecting surface 13. The light distribution pattern element L2 illuminates a relatively wide area in front of the vehicle light 10. The light distribution pattern element L4 illuminates a front left side area of the vehicle light 10.

As shown by FIGS. 6(A)–7(C), depending on the location of the second reflecting surface 14, the vehicle light 10 can switch the illuminating direction of a portion of light rays emitted from the light source 11b between the center front and front left side of the vehicle. Therefore, when the vehicle travels at a relatively high speed and it is expected to have a superior long distance visibility in comparison with when driving at a middle or low speed, the superior long distance visibility can be achieved by removing the second reflecting surface 14 from the light passageway from the light source 11b to the first reflecting surface 13. When the second reflecting surface 14 is located away from the light passageway, the vehicle light 10 provides a sufficient amount of light to a center portion on the road at a far distance, thereby long distance visibility when driving at a relatively high speed can be obtained.

In a case when a longitudinal direction of the filament 11*b*, or a pair of electrodes of a discharge arc 11*b* between which the arc 11*b* is formed, is located in a horizontal direction perpendicular to the optical axis X of the vehicle light 10, the image of light rays emitted from the light source 11*b* tends to be narrow in an up-down direction and wide in a lateral direction on a screen. Accordingly, when the light source 11*b* is located in a horizontal direction perpendicular to the optical axis X of the vehicle light 10, the vehicle light 10 can illuminate the near front area of the vehicle with relatively low light intensity and a far front area with relatively high light intensity. Since the near front area of the vehicle is illuminated with a relatively low light intensity, driver's pupils significantly enlarge, which facilitates the driver to see a far distant area. On the other hand, in another case when the longitudinal direction of the filament 11*b* or a pair of electrodes of a discharge arc 11*b* between which the arc 11*b* is formed, is located along the optical axis direction X of the vehicle light 10, an entire amount of light emitted from the vehicle light 10 is larger than that in the case where the filament or a discharge arc 11*b* is located in a horizontal direction perpendicular to the optical axis X of the vehicle light 10, because a major portion of a reflector can be located in radiation angles of light emitted from the filament or a discharge arc 11*b*. However, since image of light rays emitted from the light source 11*b* or the discharge arc 11*b* located on a screen tends to be circular. It is preferable from a viewpoint of facilitation to form the shape of the light distribution pattern to locate a longitudinal direction of the filament or a discharge arc 11*b* in a horizontal direction perpendicular to the optical axis X of the vehicle light 10. It is preferable from a viewpoint of a larger entire light amount illuminated from the vehicle light to locate a longitudinal direction of the filament or a discharge arc 11*b* along the optical axis X of the vehicle light 10.

On the other hand, when the vehicle is stopped or drives at a relatively low speed, drives on a curve, or turn a corner on the road, it is preferable that the vehicle light 10 can illuminate a wide front area including either side front of the vehicle, rather than a far front area of the vehicle. In such a case, by inserting the second reflecting surface 14 in the light passageway from the light source 11*b* to the first reflecting surface 13, the vehicle light 10 located at the left side of the vehicle body can illuminate a predetermined area including the left front side of the vehicle as shown in FIG. 7(C), while the vehicle light 10 located at the right side of the vehicle body can illuminate including the right front side of the vehicle by the light distribution pattern element L4 located at the right side of the distribution pattern element L2. Since the light distribution pattern of FIG. 7(C) and the light distribution pattern including the light distribution pattern element L4 which is symmetrical with that of FIG. 7(C) are combined, the vehicle lights 10 can illuminate a wide front area on the road including either side front of the vehicle as shown by FIG. 7(D).

Alternatively, when the vehicle drives on a curve to the left, or turns around a corner to the left, in the vehicle light 10 disposed at the left front corner of the vehicle body, the second reflecting surface 14 can be inserted in the light passageway from the light source 11*b* to the first reflecting surface 13 to increase the width of the light distribution pattern to the left, while in the vehicle light 10 disposed on the right front corner of the vehicle body, the second reflecting surface 14 can be located away from the light passageway from the light source 11*b* to the first reflecting surface 13 to intensively illuminate a center front area of the vehicle at a far distance. The light distribution pattern at this time has an extended portion only to the left in comparison with the light distribution pattern when the vehicle travels on a straight road. In a case that the vehicle drives on a curve to the right, or turns around a corner to the right, the right and left can be vice versa in the previous two sentences.

Further, change of light distribution pattern elements between L3 and L4 can be performed gradually in accordance with gradual movement of the second reflecting surface 14 from its fully inserted position to its removed position relative to the light passageway from the light source to the first reflecting surface, such that change of the illuminated area by the vehicle light is not recognized by the driver of the vehicle.

Figure 8:
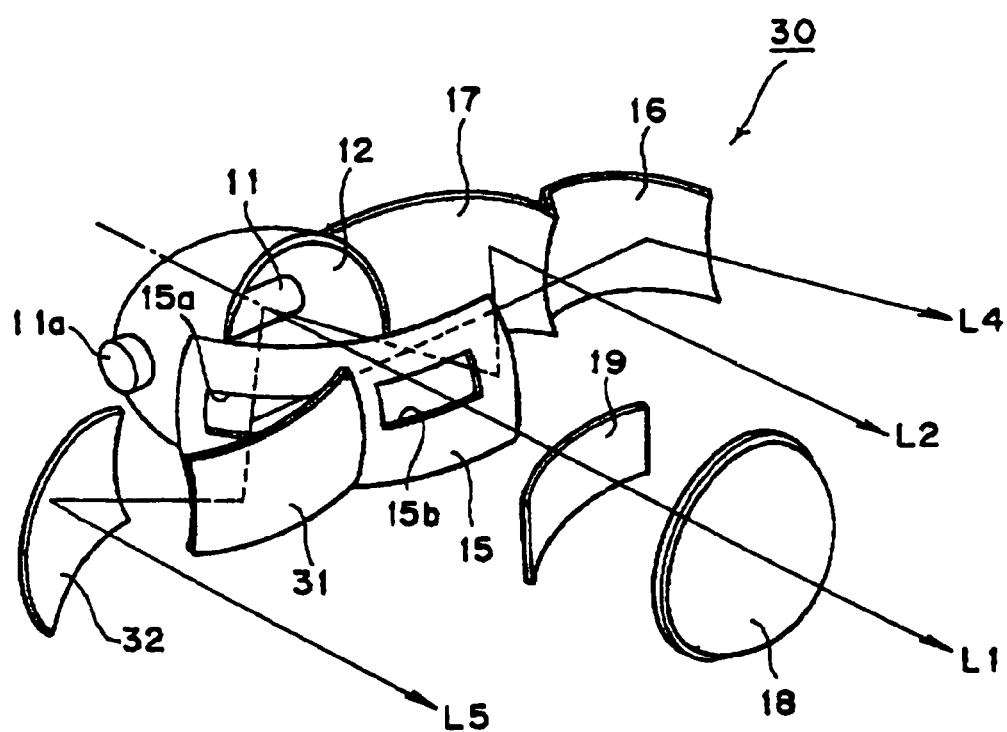
FIG. 8 is a schematic perspective view of another vehicle light, according to a second preferred embodiment of the present invention.
Figure 9:
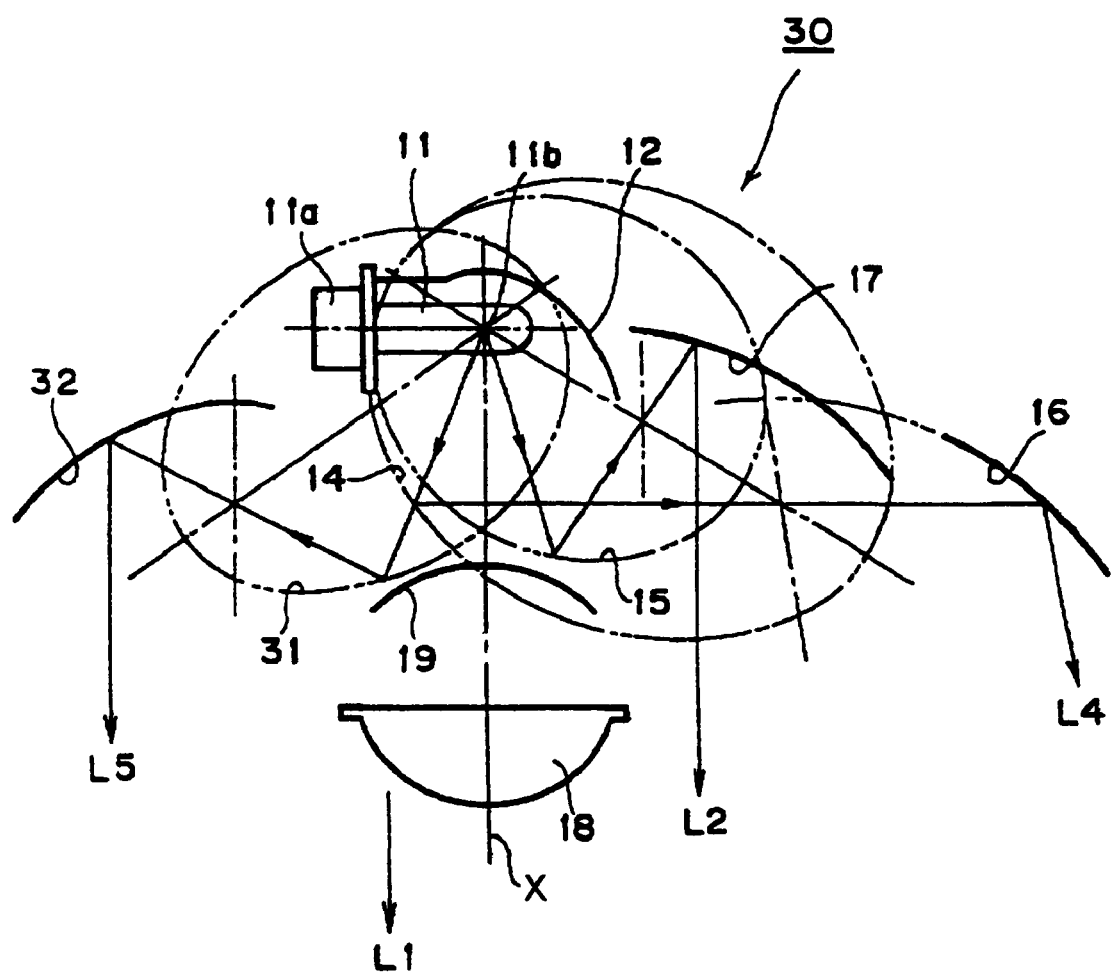
FIG. 9 is a horizontal cross sectional view along an optical axis X of the vehicle light of FIG. 8, according to the second preferred embodiment of the present invention.
Figure 10:
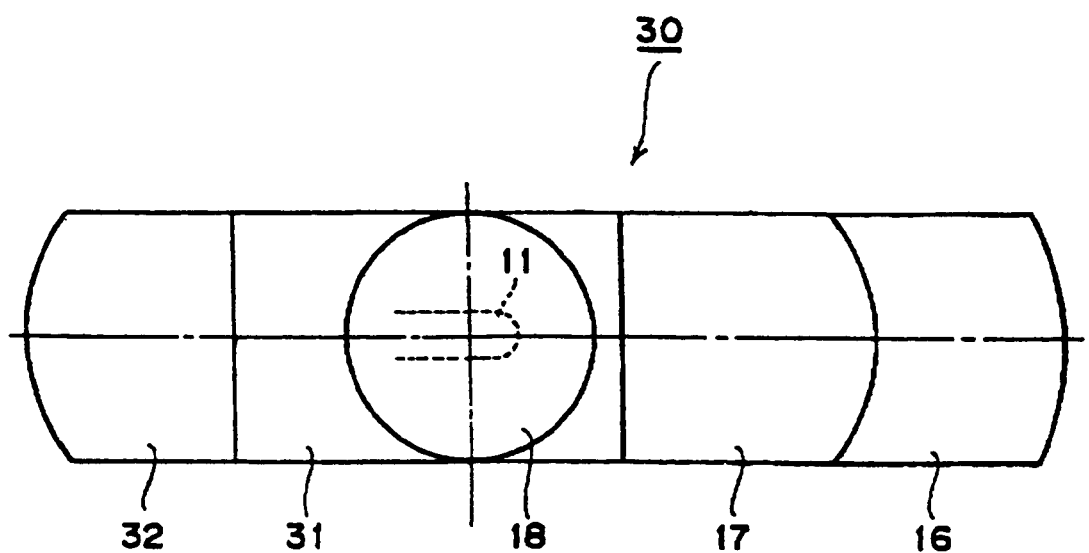
FIG. 10 is a front view of the vehicle light of FIG. 8 according to the second preferred embodiment of the present invention.

FIGS. 8–10 show a vehicle light 30 according to the second preferred embodiment of the present invention. The vehicle light 10 is rather appropriate for being disposed along an aerodynamic style automobile body line from its front corner to its side. On the other hand, the vehicle light 30 is rather appropriate for being disposed at either front end of the automobile body.

The vehicle light 30 has a similar structure to the vehicle light 10. The same numerals are used in FIGS. 8–10 for the same parts as in the vehicle light 10. Detailed descriptions regarding the same parts as in the vehicle light 10 are therefore omitted. In FIG. 9, a front lens 20 is not shown.

The vehicle light 30 is different from the vehicle light 10 by the optical axis direction of the light bulb 11 and that the first reflecting surface 13 in the vehicle light 10 can be replaced by a first reflecting surface 31 and a sixth reflecting surface 32 in the vehicle light 30. Further, second foci of the second reflecting surface 14 and of the third reflecting surface 15 are located at different positions to each other in the vehicle light 30, while they are located at substantially the same position in the vehicle light 10.

In FIG. 8, the light bulb 11 is located laterally in the vehicle light 30, and a longitudinal direction of a filament 11*b* or electrodes between which a discharge arc 11*b* is formed is located in a horizontal direction which is substantially perpendicular to the optical axis X of the vehicle light 30. However, the light bulb 11 can be disposed such that a longitudinal direction of the filament 11*b* or a discharge arc 11*b* is located along the optical axis X of the vehicle light 30.

In the vehicle light 30, the optical axis of the vehicle light 30 is perpendicular to the filament or discharge arc 11*b* in a horizontal direction, and passes through the filament or discharge arc 11*b*, preferably at its center point.

The first reflecting surface 31 is preferably an ellipse group reflecting surface having a first focus in the vicinity of the light source 11*b* of the light bulb 11, and a longitudinal axis which passes through the light source 11*b* and is across the optical axis X of the vehicle light 30. The first reflecting surface 31 is concave when viewed in a direction facing to the light source 11*b*.

The sixth reflecting surface 32 is preferably a parabolic group reflecting surface having a focus in the vicinity of the second focus of the first reflecting surface 31. The sixth reflecting surface 32 is concave when viewed in a direction facing the forward of the vehicle light 30.

The second reflecting surface 14 is preferably an ellipse group reflecting surface located to contain the third reflecting surface 15 inside. The first foci of the second reflecting surface 14 and the third reflecting surface 15 are located in the vicinity of the light bulb 11*b*, which is the same as in the vehicle light 10. The second focus of the second reflecting surface 14 is located farther from the light source 11*b* than the second focus of the third reflecting surface 15. Distances between the first and second foci of the second reflecting surface 14 and the third reflecting surface 15 can be adjusted considering locations of the foci of the fourth reflecting surface 16 and the fifth reflecting surface 17. There may be a gap between the second reflecting surface 14 and the third reflecting surface 15, provided it is ensured that light rays reflected by the second reflecting surface 14 is converged to the focus of the fourth reflecting surface 16, at any time of rotational movement of the second reflecting surface 14 around its longitudinal axis. It is preferable to set a position of the second focus of the second reflecting surface 14 substantially on a longitudinal axis of the third reflecting surface 15. However, it is acceptable that a longitudinal direction is different between the second reflecting surface 14 and the third reflecting surface 15.

Light rays emitted from the light source 11b to the major reflecting surface 12 are reflected thereby and incident on the third reflecting surface 15. Light rays emitted from the light bulb 11b directly to the third reflecting surface 15 are also incident on the third reflecting surface 15. Among such light rays, light rays L1 incident to the second aperture 15b pass through the second aperture 15b. A portion of the light rays L1 which is unnecessary for the formation of the light distribution pattern is cut off by the shutter 19, and incident to the projection lens 18. The projection lens 18 refracts to converge the light rays L1 to its front focus by a predetermined degree. The light rays L1 further pass through the front lens 20, and illuminate a predetermined area on the road.

Figure 11:
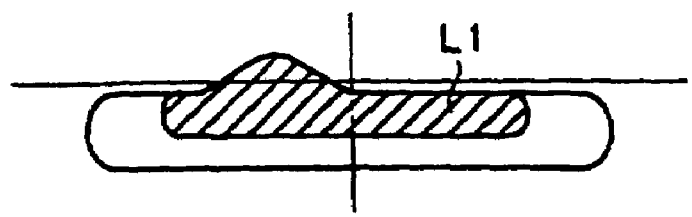
FIG. 11(A) shows a light distribution pattern of the vehicle light of FIG. 8 when a second reflecting surface is located away from a light passageway from a light source to a first reflecting surface, and a light distribution pattern element L1 of light that has passed through a projection lens of a vehicle light of FIG. 8, according to the second preferred embodiment of the present invention.
FIG. 11(B) shows a light distribution pattern of the vehicle light of FIG. 8 when the second reflecting surface is inserted in the light passageway from the light source to the first reflecting surface, and a light distribution pattern element L2 of light from a fifth reflecting surface of the vehicle light of FIG. 8, according to the second preferred embodiment of the present invention.
FIG. 11(C) shows a light distribution pattern of the vehicle light of FIG. 8 when the second reflecting surface is located away from the light passageway from the light source to the first reflecting surface, and a light distribution pattern element L5 of light from a sixth reflecting surface of a vehicle light of FIG. 8, according to the second preferred embodiment of the present invention.
FIG. 11(D) shows a light distribution pattern of the vehicle light of FIG. 8 when the second reflecting surface is inserted in the light passageway from the light source to the first reflecting surface, and a light distribution pattern element L4 of light from the fourth reflecting surface of a vehicle light of FIG. 8, according to the second preferred embodiment of the present invention.
Figure 11:
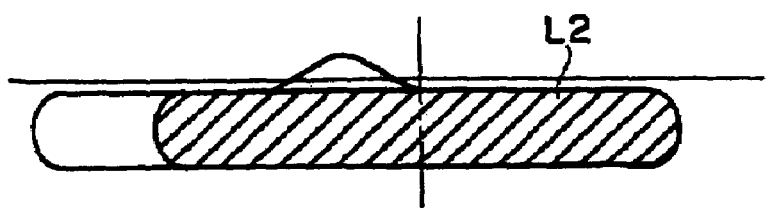
Figure 11:
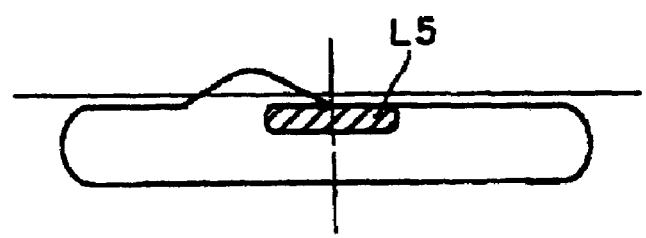
Figure 11:
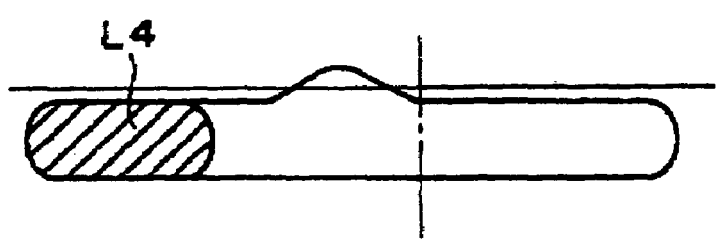

The illuminated area on a screen by the light rays L1 is shown in FIG. 11(A). A light distribution pattern formed by the light rays L1 (hereinafter referred as a light distribution pattern element L1) generally illuminates a wide area under a horizontal axis on the screen. A horizontal cut-off line element is located under the horizontal axis on the screen. The light distribution pattern element L1 also includes the elbow portion extending at the upper left side of the vertical axis on the screen for illuminating a road side such as a road sign, a shoulder, or a pedestrian. The elbow portion partly exceeds the horizontal axis on the screen such that light is illuminated to a long distance from the vehicle light 30.

Light rays L2 incident on the third reflecting surface 15 other than the first aperture 15a and the second aperture 15b are reflected by the third reflecting surface 15 to a second focus of the third reflecting surface 15. Since the second focus of the third reflecting surface 15 is also a focus of the fifth reflecting surface 17, light rays L2 focused on the second focus of the third reflecting surface 15 are further reflected by the fifth reflecting surface 17 to a forward direction of the vehicle light 30. Light rays L2 reflected by the fifth reflecting surface 17 pass through the front lens 20, and illuminate a predetermined area in front of the vehicle light 30.

The illuminated area on a screen by the light rays L2 is shown in FIG. 11(B). A light distribution pattern element formed by the light rays L2 (hereinafter referred as a light distribution pattern element L2) generally illuminates a wide area under a horizontal axis on the screen. Specifically, the light distribution pattern element L2 provides a sufficient amount of light to the downward. Accordingly, the light distribution pattern element L2 can illuminate a road from a near front area of the vehicle light 30 to a far front area of the vehicle light 30, while illuminating a wide area on the road in a horizontal direction.

A passageway of light incident to the first aperture 15a of the third reflecting surface 15 differs depending on whether the second reflecting surface 14 is located in, or removed from, the light passageway from the light source 11b to the first reflecting surface 31.

When the second reflecting surface 14 is located away from the light passageway from the light source to the first reflecting surface 31, light rays L5 incident to the first aperture 15a pass through the first aperture 15a and reach the second focus of the first reflecting surface 31. Since the second focus of the ellipse group first reflecting surface 31 is also a focus of the parabolic group sixth reflecting surface 32 having its optical axis substantially parallel to the optical axis X of the vehicle light 30, light rays L5 reflected by the sixth reflecting surface 32 are directed to a forward direction. Radius of curvature of each portion which collectively constitutes the sixth reflecting surface 32 can be adjusted such that light rays L5 which are reflected by and have passed through the front lens 20 travel to a center front of the vehicle in a concentrated manner.

The illuminated area on a screen by the light rays L5 is shown in FIG. 11(C). A light distribution pattern element formed by the light rays L5 (hereinafter referred as a light distribution pattern element L5) illuminate a central area of the light distribution pattern under the horizontal axis on the screen with high intensity of light. Accordingly, the light distribution pattern element L5 can illuminate a far front area of the vehicle.

When the second reflecting surface 14 is located in the light passageway from the light source 11b to the first reflecting surface 31, light rays L4 incident to the first aperture 15a are reflected by the second reflecting surface 14, and travel to the second focus of the second reflecting surface 14. Since the second focus of the second reflecting surface 14 is also the focus of the fourth reflecting surface 16 whose optical axis direction is inclined to the outside relative to the optical axis X of the vehicle light 30, light rays reflected by the fourth reflecting surface 16 travel to a front side direction of the vehicle light 30, which is inclined to a predetermined side, i.e., either left or right, of the vehicle light 30 in a horizontal cross-sectional view. The vehicle light 30 in FIGS. 8–10 is designed to be disposed at the left front end of the vehicle body. In this case, a traveling direction of light reflected by the fourth reflecting surface 16 is inclined to the left. The light rays reflected by the fourth reflecting surface 16 pass through the front lens 20, and illuminate a front left side area on the road.

The illuminated area on a screen by the light rays L4 is shown in FIG. 11(D). A light distribution pattern element formed by the light rays L4 (hereinafter referred as a light distribution pattern element L4) generally illuminates a left side area under a horizontal axis on the screen. Specifically, the light distribution pattern element L4 provides a sufficient amount of light to a lower part of the left side area of the light distribution pattern. Accordingly, the light distribution pattern element L4 can illuminate a front side area of the road such as a shoulder.

When the vehicle light 30 is designed to be disposed at the right side of the vehicle body, such a vehicle light is configured to have a symmetrical structure with the vehicle light 30 in FIG. 8 relative to a line which is located between the two vehicle lights disposed on either side of the vehicle and is parallel to the optical axis X of the vehicle light 30, other than the shutter 19. Shape and location of the shutters 19 are the same in the two vehicle lights being disposed at both left and right sides of the vehicle body. In the vehicle light designed to be disposed at the right side of the vehicle body, light rays L4 which are reflected by the second reflecting surface 14 and further by the fourth reflecting surface 16 illuminate the front right side of the vehicle. In this case, the light distribution pattern element L4 is located at the right side of the light distribution pattern element L2.

As shown by FIGS. 11(A)–(D), similar to the vehicle light 10, depending on location of the second reflecting surface 14, the vehicle light 30 can switch the illuminating direction of a portion of light rays emitted from the light source 11b between the center front of the vehicle and the front left side of the vehicle. When the second reflecting surface 14 is located away from the light passageway from the light source 11b to the first reflecting surface 31, the vehicle light 30 can illuminate a wide front area of the vehicle by light distribution pattern elements L1 and L2, while the sixth reflecting surface 32 provides light rays to a far distant area around the center of the road in a concentrated manner to form the light distribution pattern element L5. When the second reflecting surface 14 is inserted in the light passageway, the vehicle light 30 illuminates a wide front area of the vehicle by light distribution pattern elements L1 and L2, while the second reflecting surface 14 provides light rays by way of the fourth reflecting surface 16 to a predetermined side of the vehicle, i.e., left in the case of the vehicle light 30 in FIGS. 8–10, by the light distribution pattern element L4, such that a width of the entire light distribution pattern is increased in comparison with when the second reflecting surface 14 is located away from the light passageway.

Figure 12:
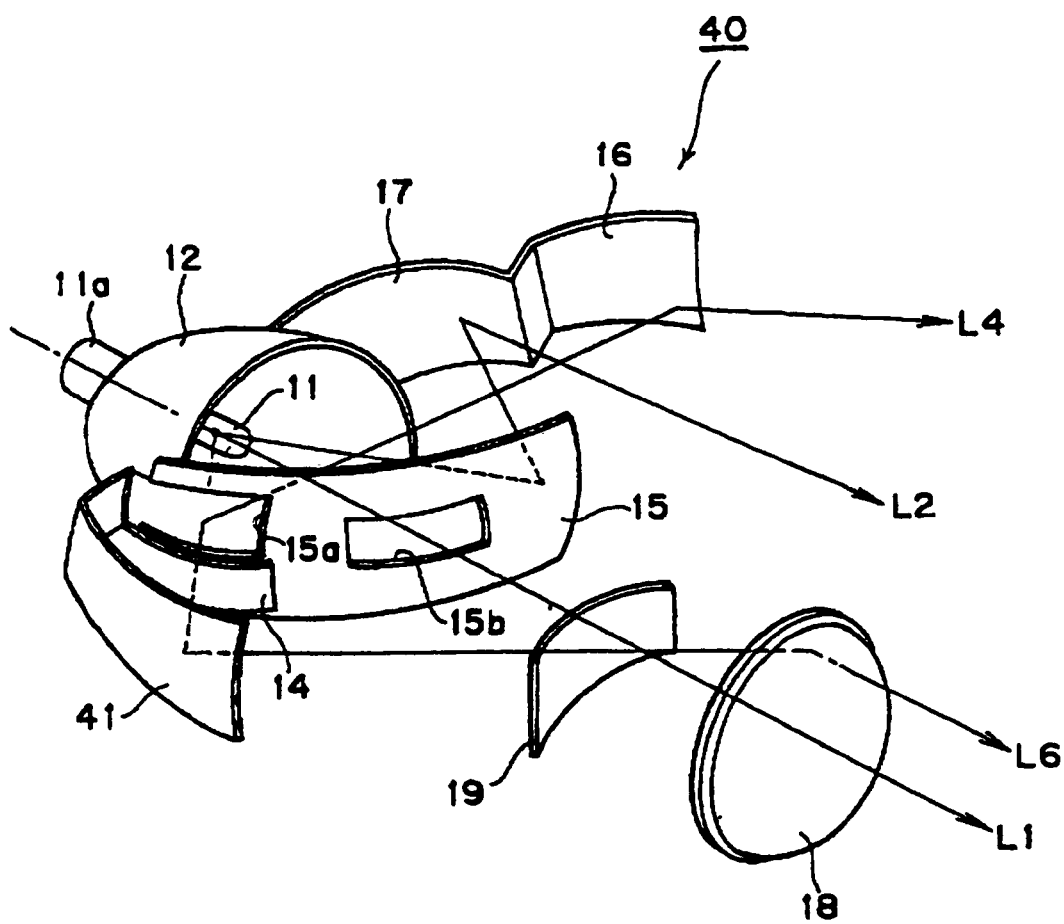
FIG. 12 shows a schematic perspective view of still another vehicle light according to a third preferred embodiment of the present invention.
Figure 13:
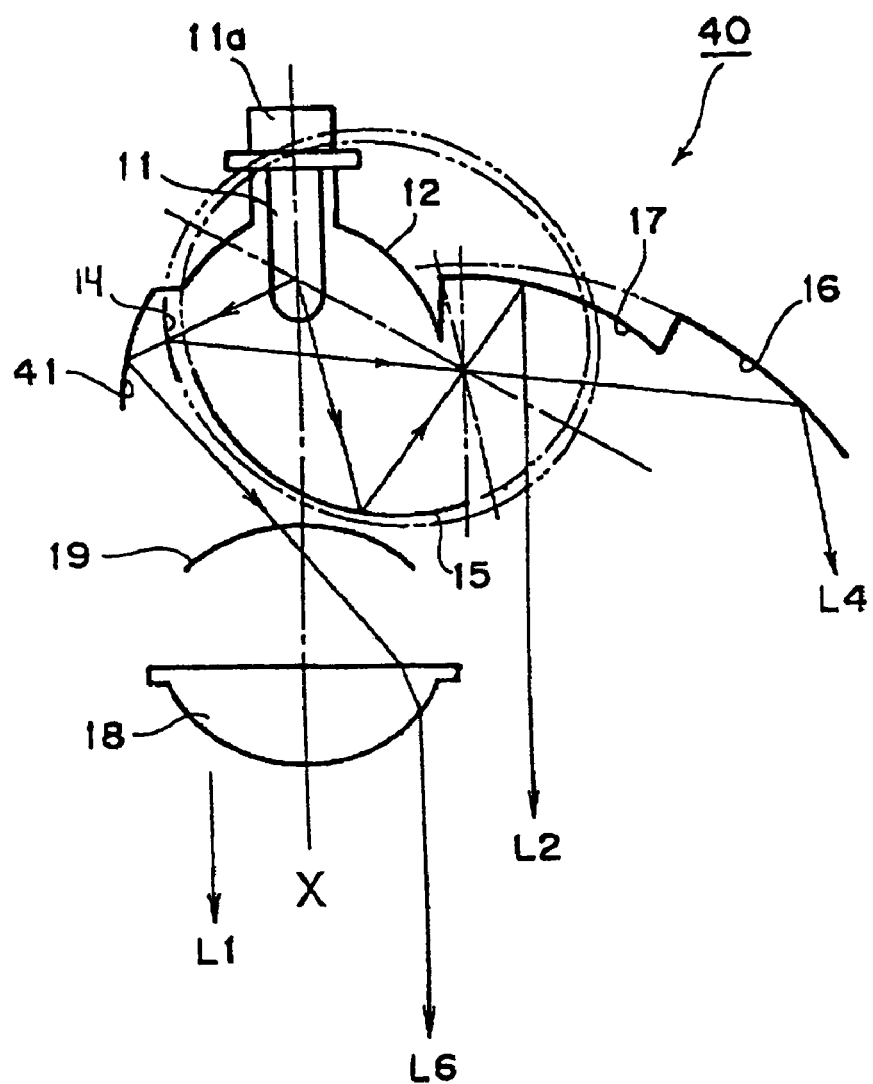
FIG. 13 shows a horizontal cross-sectional view along an optical axis X of the vehicle light of FIG. 12 according to the third preferred embodiment of the present invention.

FIGS. 12–13 illustrate a vehicle light 40 according to a third preferred embodiment of the present invention. The vehicle light 40 has a similar structure to that of the vehicle light 10. The same numerals are used in FIGS. 12–13 for the same parts as in the vehicle light 10. Detailed descriptions regarding the same parts as in the vehicle light 10 are therefore omitted. In FIG. 13, a front lens 20 is not shown.

The vehicle light 40 can have a smaller entire width than the vehicle light 10. The vehicle light 40 is different from the vehicle light 10 in the shape of the first reflecting surface. The first reflecting surface 41 of the vehicle light 40 is an ellipse group reflecting surface, whereas the first reflecting surface 13 in the vehicle light 10 is the parabolic group reflecting surface. Further, a substantially common longitudinal axis of the second reflecting surface 14 and the third reflecting surface 15 are across the optical axis X of the vehicle light 40 at a predetermined angle, whereas in the vehicle light 10 the substantially common longitudinal axes of the second reflecting surface 14 and the third reflecting surface 15 are perpendicular to the optical axis X of the vehicle light 10. The crossing angle of the substantially common longitudinal axes of the second reflecting surface 14 and the third reflecting surface 15 relative to the optical axis X of the vehicle light 40 can be adjusted considering locations of the foci of the fourth reflecting surface 16 and the fifth reflecting surface 17, respectively. Further, direction of the longitudinal axis, and location of the second focus, of the second reflecting surface 14 may be different from those of the third reflecting surface 15 depending on design requirements, provided that light rays reflected by the second reflecting surface 14 are sure to be incident to the fourth reflecting surface 16 at any time of rotational movement of the second reflecting surface 14 around its longitudinal axis.

The first reflecting surface 41 is preferably the ellipse group reflecting surface having a first focus on the light source 11b and a second focus in the vicinity of the focus of the projection lens 18. The first reflecting surface 41 is concave when viewed in a direction facing to the optical axis X of the vehicle light 40.

In FIG. 12, there exists a step between the fourth reflecting surface 16 and the fifth reflecting surface 17. However, the fourth reflecting surface 16 and the fifth reflecting surface 17 can be formed as a continuous surface.

Light rays emitted from the light source 11b to the major reflecting surface 12 are reflected thereby and incident on the third reflecting surface 15. Light rays emitted from the light bulb 11b directly to the third reflecting surface 15 are also incident on the third reflecting surface 15. Among such light rays, light rays L1 incident to the second aperture 15b pass through the second aperture 15b. A portion of the light rays L1 which is unnecessary for the formation of the light distribution pattern of the vehicle light 40 is cut off by the shutter 19, and incident to the projection lens 18. The projection lens 18 refracts such light rays L1 in a converging manner to the front focus of the projection lens 18 by a predetermined degree. The light rays L1 further pass through the front lens 20, and illuminate a predetermined area on the road.

Figure 14:
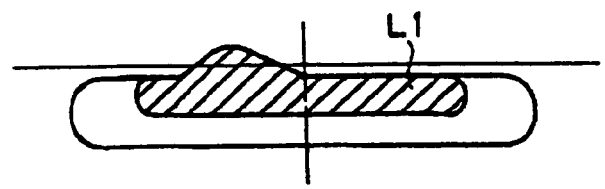
FIG. 14 (D) shows an enlarged view of an elbow portion of the light distribution pattern and light distribution pattern element L6 of FIG. 14(C) around a crossed-point of vertical and horizontal axes on the screen.
Figure 14:
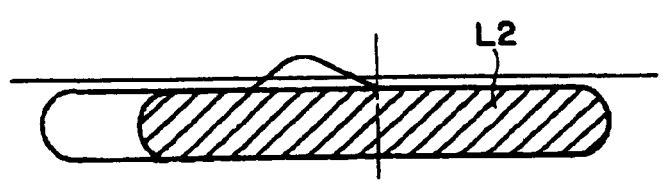
Figure 14:
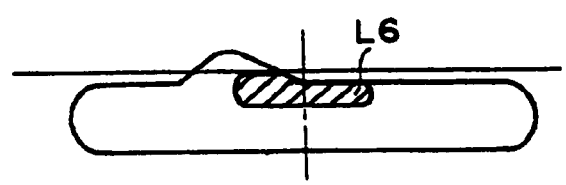
Figure 14:
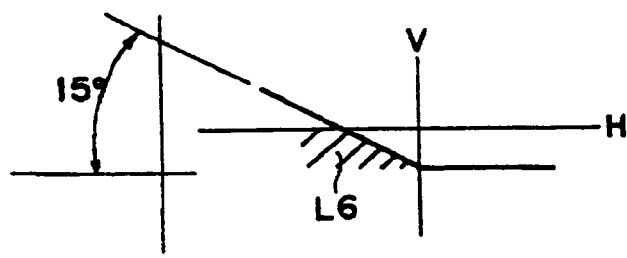
Figure 14:
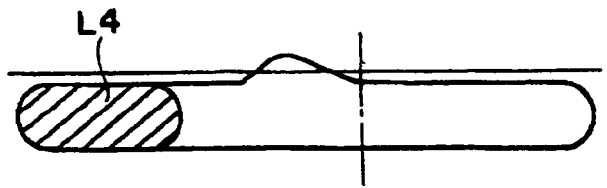

The illuminated area on a screen by the light rays L1 is shown in FIG. 14(A). A light distribution pattern formed by the light rays L1 (hereinafter referred as a light distribution pattern element L1) generally illuminates a wide area under a horizontal axis on the screen. A horizontal cut-off line element is located under the horizontal axis on the screen. The light distribution pattern element L1 also includes the elbow portion extending toward the upper left side of the vertical and horizontal axes on the screen for illuminating a road side such as a road sign, a shoulder, or a pedestrian. The elbow portion partly exceeds the horizontal axis on the screen such that light is illuminated a long distance from the vehicle light 40.

Light rays L2 incident on the third reflecting surface 15 other than the first aperture 15a and the second aperture 15b are reflected by the third reflecting surface 15 to a second focus of the third reflecting surface 15. Since the second focus of the third reflecting surface 15 is also a focus of the fifth reflecting surface 17, light rays L2 focused on the second focus of the third reflecting surface 15 are further reflected by the fifth reflecting surface 17 to a forward direction of the vehicle light 40.

Light rays L2 reflected by the fifth reflecting surface 17 pass through the front lens 20, and illuminate a predetermined area in front of the vehicle light 40.

The illuminated area on a screen by the light rays L2 is shown in FIG. 14(B). A light distribution pattern element formed by the light rays L2 (hereinafter referred as a light distribution pattern element L2) generally illuminates a wide area under a horizontal axis on the screen. Specifically, the light distribution pattern element L2 provides a sufficient amount of light to the downward. Accordingly, the light distribution element L2 can illuminate a road from a near front area of the vehicle light 40 to a far front area of the vehicle light 40, while illuminating a wide area on the road in a horizontal direction.

A passageway of light incident to the first aperture 15a of the third reflecting surface 15 differs depending on whether the second reflecting surface 14 is located in, or removed from, the light passageway from the light source 11b to the first reflecting surface 41.

When the second reflecting surface 14 is located away from the light passageway from the light source to the first reflecting surface 41, light rays L6 incident to the first aperture 15a pass through the first aperture 15a and reach the first reflecting surface 41. Since the ellipse group first reflecting surface 41 has its first focus in the vicinity of the light source 11b, light rays L6 reflected by the first reflecting surface 41 are directed to the second focus of the first reflecting surface 41. Since the second focus of the first reflecting surface 41 is located in the vicinity of the focus of the projection lens 18, which focus is the one located at the side of the light bulb 11, the light rays L6 further travel to be incident to the projection lens 18. Light rays L6 pass through the projection lens 18 being refracted in a concentrated manner to a front focus of the projection lens 18 by a predetermined degree. The light rays L6 further travel forward and pass through the front lens 20. After passing through the projection lens 18, the light rays L6 become parallel light rays relative to the optical axis X of the vehicle light 40, then illuminate a predetermined area in front of the vehicle.

The illuminated area on a screen by the light rays L6 is shown in FIG. 14(C). A light distribution pattern element formed by the light rays L6 (hereinafter referred as a light distribution pattern element L6) illuminate a central area of the light distribution pattern under the horizontal axis on the screen with high intensity of light. Accordingly, the light distribution pattern element L6 can illuminate a far front area of the vehicle. A portion of the light rays L6, which is reflected by the first reflecting surface 41 and unnecessary for the formation of light distribution pattern, is prohibited by the shutter 19, similarly to the light rays L1 which are reflected by the major reflecting surface 12 or directly come from the light source 11b, and pass through the projection lens 18. FIG. 14(D) illustrates an enlarged view around the center of vertical and horizontal axes of the screen. A portion of light distribution pattern element L6 exceeds an extension of a horizontal cut-off line to the left side of the vertical axis on the screen, thereby a far distant central front area of the vehicle is illuminated. An upper edge of the light distribution pattern element L6 preferably does not exceed the horizontal axis on the screen. However, the upper edge may exceed the horizontal axis on the screen to an extent that such an exceeded portion of light does not become glare light to a pedestrian walking on the road side.

When the second reflecting surface 14 is located in the light passageway from the light source 11b to the first reflecting surface 41, light rays L4 incident to the first aperture 15a are reflected by the second reflecting surface 14, and travel to the second focus of the second reflecting surface 14. Since the second focus of the second reflecting surface 14 is also the focus of the fourth reflecting surface 16 whose optical axis is inclined to the outside relative to the optical axis X of the vehicle light 40, light rays reflected by the fourth reflecting surface 16 travel to a front side direction of the vehicle light 40, which is inclined to a predetermined side, i.e., either left or right, of the vehicle light in a horizontal cross-sectional view. The vehicle light 40 in FIGS. 12–13 is designed to be disposed at the left front end of the vehicle body. In this case, a traveling direction of light reflected by the fourth reflecting surface 16 is inclined to the left. The light rays reflected by the fourth reflecting surface 16 pass through the front lens 20, and illuminate a front left side area on the road.

FIG. 14(E) illustrates an illuminated area on a screen by the light rays L4. A light distribution pattern element formed by the light rays L4 (hereinafter referred as a light distribution pattern element L4) generally illuminates a left side area under a horizontal axis on the screen. Specifically, the light distribution pattern element L4 provides a sufficient amount of light to a lower part of the left side area of the light distribution pattern. Accordingly, the light distribution pattern element L4 can sufficiently illuminate a front side area of the road such as a shoulder.

When the vehicle light 40 is designed to be disposed at the right side of the vehicle body, such a vehicle light is configured to have a symmetrical structure with the vehicle light 40 in FIG. 12 relative to a line which is located between the two vehicle lights located at either side of the vehicle and is parallel to the optical axis X of the vehicle light 40, other than the shutter 19. Shape and location of the shutter 19 is the same in the vehicle lights being disposed at both left and right sides of the vehicle body. In the vehicle light designed to be disposed on the right side of the vehicle body, light rays L4 which are reflected by the second reflecting surface 14 and further by the fourth reflecting surface 16 illuminate the right side front of the vehicle. In this case, the light distribution pattern element L4 is located at the right side of the light distribution pattern element L2.

Figure 15:
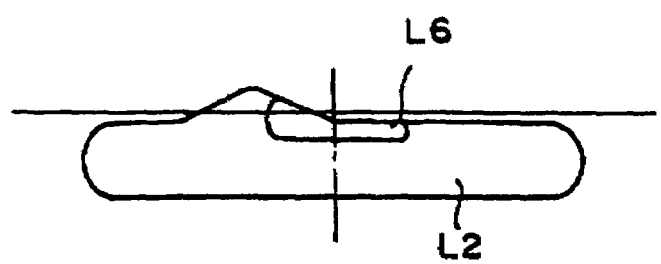
FIG. 15(A) is a light distribution pattern and light distribution pattern elements on a screen for the vehicle light of FIG. 12 when the second reflecting surface is located away from the light passageway, according to the third preferred embodiment of the present invention.
FIG. 15(B) is a light distribution pattern on a road for the vehicle light of FIG. 12 when the second reflecting surface is located away from the light passageway, according to the third preferred embodiment of the present invention.
Figure 15:
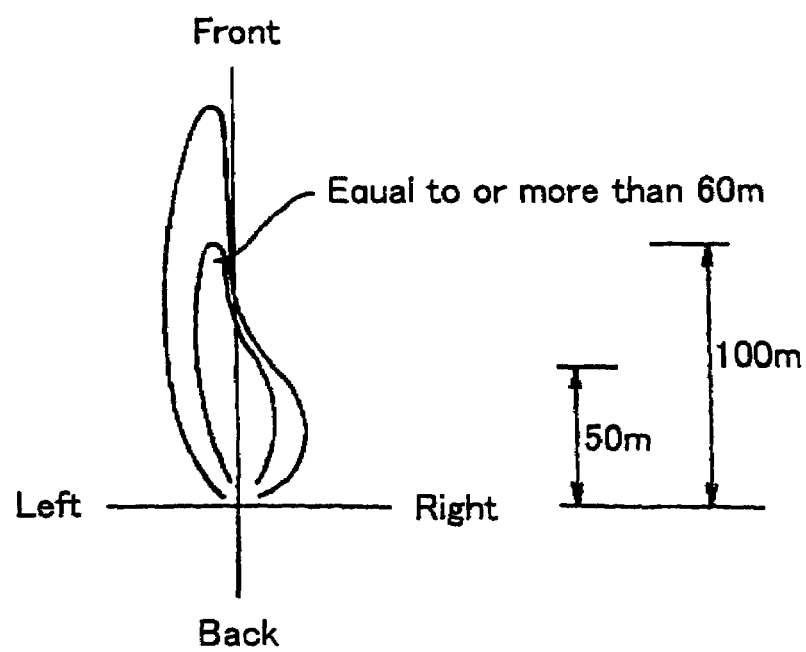
Figure 16:
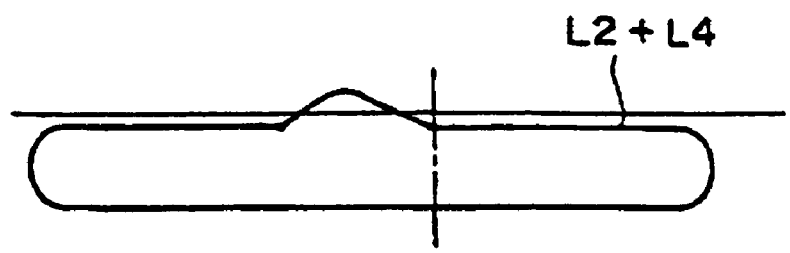
FIG. 16(A) shows a light distribution pattern and light distribution pattern elements on a screen for the vehicle light of FIG. 12 when the second reflecting surface is inserted in the light passageway from the light source to the first reflecting surface, according to the third preferred embodiment of the present invention.
FIG. 16(B) is a light distribution pattern on a road for the vehicle light of FIG. 12 when the second reflecting surface is inserted in the light passageway from the light source to the first reflecting surface, according to the third preferred embodiment of the present invention.
Figure 16:
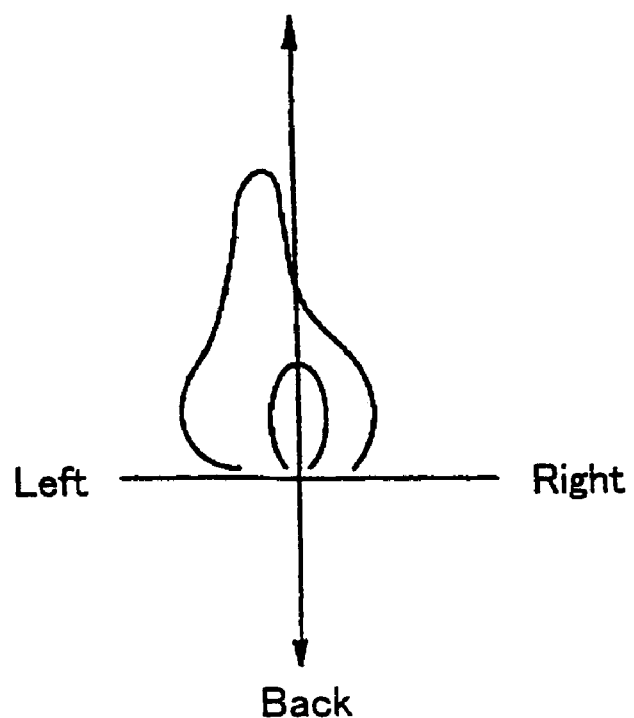

As shown by FIGS. 14(A)–(E), similar to the vehicle light 10 in FIGS. 1–3, depending on location of the second reflecting surface 14, the vehicle light 40 can switch the illuminating direction of a portion of light rays emitted from the light source 11b between the center front of the vehicle and front left side of the vehicle. When the second reflecting surface 14 is located away from the light passageway from the light source 11b to the first reflecting surface 41, the vehicle light 40 can illuminate a wide front area of the vehicle as shown by FIG. 15(A), while light rays reflected by the first reflecting surface 41 pass through the projection lens 18 to illuminate a far distant area around the center of the road in a concentrated manner to form the light distribution pattern element L6. In general, it is substantially impossible to form a clear cut-off line only by the reflector configuration while the light distribution pattern has a center portion with high intensity of light for illuminating a far front distant area, because it is technically very difficult to adjust each destination of all light rays to their respective predetermined position only by adjusting each reflector element, especially regarding light rays which converge in the vicinity of the cut-off line. In the related art, it is not avoidable that a portion of light rays invades into the cut-off portion of the light distribution pattern. If the invaded portion of light rays has high intensity of light, the cut-off line becomes blurred. Then, in the present invention, not only by the reflector configuration but also by the reflector configuration in combination with the projection lens and a shutter, both the clear cut-off line and a central portion with high intensity of light can be achieved.

FIG. 15(B) schematically illustrates measurement result of illumination on the road by the vehicle light 40. On the measurement, the vehicle light 40 may be located at 60 cm height from the ground. As shown by FIG. 15(B), the vehicle light 40 can illuminate a center area located at more than 100 meters front of the vehicle.

When the second reflecting surface 14 is inserted in the light passageway, the vehicle light 40 illuminates a wide front area of the vehicle by the light distribution pattern element L2, while the second reflecting surface 14 provides light rays to a predetermined side of the vehicle, i.e., left in the case of the vehicle light 40 in FIGS. 12–13, such that a width of the entire light distribution pattern is increased in comparison with when the second reflecting surface 14 is located away from the light passageway.

In the vehicle lights 10, 30, and 40 according to some of the preferred embodiments of the present invention, the above descriptions are directed to the cases when the second reflecting surface 14 is located in, and removed from, the light passageway from the light source 11b to the first reflecting surface 13, 31 and 41. However, the second reflecting surface 14 can be located to be partly inserted in the light passageway from the light source 11b to the first reflecting surface 13, 31 and 41. Accordingly, the second reflecting surface 14 can be moved to take a variable predetermined position in the light passageway from the light source 11b to the first reflecting surface 13, 31 and 41 depending on a steering angle or velocity of the vehicle. For example, as velocity of the vehicle increases, light distribution to either side front of the vehicle can be decreased, and instead, light distribution to the far distant center front of the vehicle can be increased, by simultaneously moving each second reflecting surface 14 in a direction to be away from the first aperture 15a in the two vehicle lights 10, 30, and 40 located on either side front of the vehicle body. In another example, as a steering angle to the left increases, light distribution to the far distant center front area of the vehicle from the vehicle light located on the front end at the left side of the vehicle body decreases, and instead, light distribution to the left front area of the vehicle is increased, while light distribution from the vehicle light located at the right side front of the vehicle body remains unchanged. Alternately, as a steering angle to the right increases, light distribution to the far distant center front area of the vehicle light located on the front end at the right side of the vehicle body decreases, and instead, light distribution to the right front area of the vehicle is increased, while light distribution from the vehicle light located at the left side front of the vehicle body remains unchanged.

Figure 18:
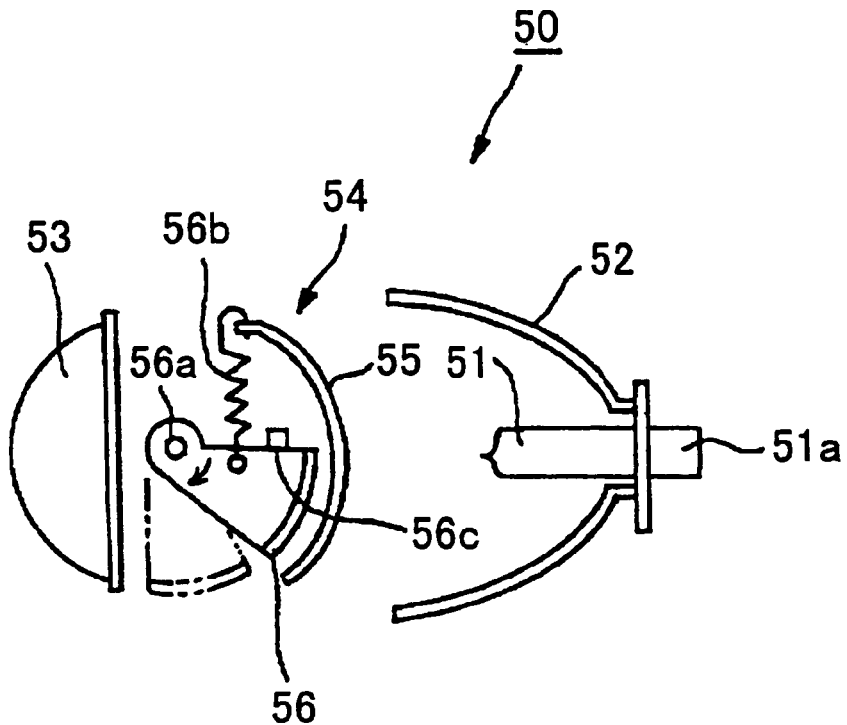
FIG. 18 illustrates a horizontal cross-sectional top view along an optical axis of the vehicle light according to the fourth preferred embodiment of the present invention.

In the vehicle lights 10, 30 and 40, the elbow portion of the light distribution pattern may be an area formed by an extension of a horizontal cut-off line element at the left side of the vertical axis and an inclined cut-off line element which extends from a crossed point of the horizontal cut-off line element and the vertical axis into the left upward direction by 15 degrees relative to the extension of the horizontal cut-off line to the left side. The elbow portion partly exceeds the horizontal axis on the screen such that light is illuminated to a long distance from the vehicle light. However, when a discharge arc 11b of a high intensity discharge lamp is used as a light source, the elbow portion can be another shape defined by regulations as shown by FIG. 18, i.e., an area formed by an extension of a horizontal cut-off line element on a predetermined side, e.g. right, of the vertical axis, an inclined cut-off line element which extends from a crossed point of the horizontal cut-off line element and the vertical axis to the other side of the predetermined side, e.g. left, in an upward direction by 45 degrees relative to the extension of the horizontal cut-off line element to the other side of the predetermined side, e.g. left, and another horizontal cut-off line element at the other side of the predetermined side, e.g. left, of the vertical axis which starts from a predetermined point on the inclined cut-off line element to the other side of the predetermined side, e.g. left. In cases that either type of elbow portion is adopted, radii of curvature of the major reflecting surface 12 and a convex surface of the projection lens 18, and a shape of the shutter 19 are respectively adjusted to provide a light distribution pattern element L1 including the corresponding elbow portion.

The operational advantages of the vehicle lights according to the first to third preferred embodiments of the present invention will now be described. First, the vehicle lights 10, 30, 40 can selectively switch a general direction of a portion of light rays emitted from the light source 11b at a relatively large angle between a direction to illuminate a side front area and a direction to illuminate a far distant center front area L3, L5, L6 of the vehicle by movement of the second reflecting surface 14. When the portion of light rays are directed to the side front of the vehicle by the second reflecting surface 14 and the fourth reflecting surface 16, the vehicle light 10, 30, 40 can provide a predetermined light distribution pattern which has a larger width than when the portion of light rays are directed to the far distant central front area of the vehicle 10, 30, 40 such that visibility to the side front area of the vehicle is increased.

Second, the movable part for switching a general traveling direction of a portion of light rays between a direction to illuminate a side front area and a direction to illuminate a far distant center front area of the vehicle is only the second reflecting surface 14 which has a relatively small entire size. Therefore, a driving mechanism to move the second reflecting surface 14 also can be small with a simple structure. Further, there exists no significant gap around the second reflecting surface 14 to an extent that the gap deteriorates aesthetic appearance of the vehicle light.

Accordingly, the vehicle light 10, 30, 40 of the present invention can easily switch a general direction of a portion of light rays emitted from the light source 11b at a relatively large angle by a simple structure, while providing superior light distribution characteristics without any prismatic cuts on the front lens 20.

Figure 17:
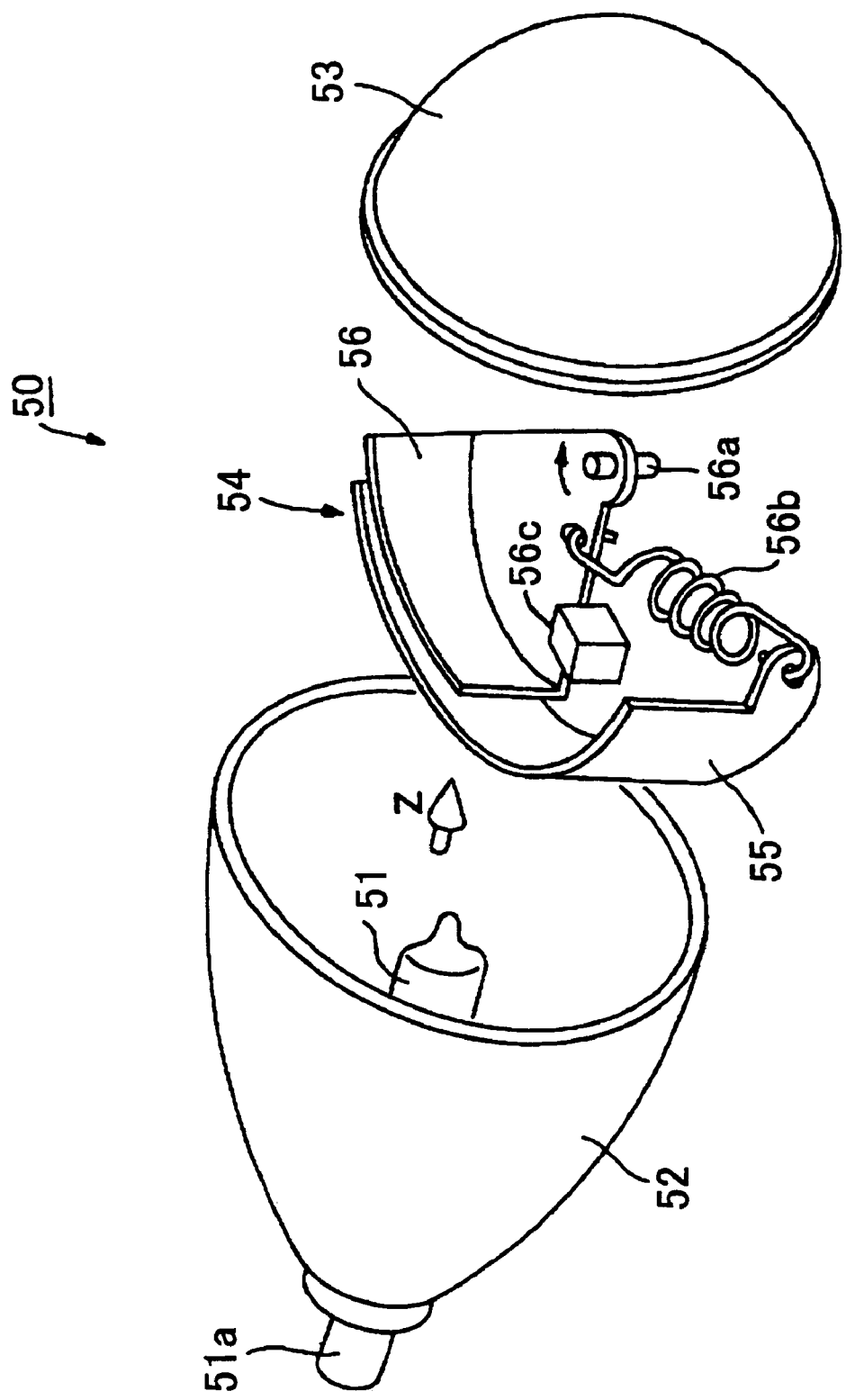
FIG. 17 illustrates a schematic perspective view of a vehicle light according to a fourth preferred embodiment of the present invention.
Figure 19:
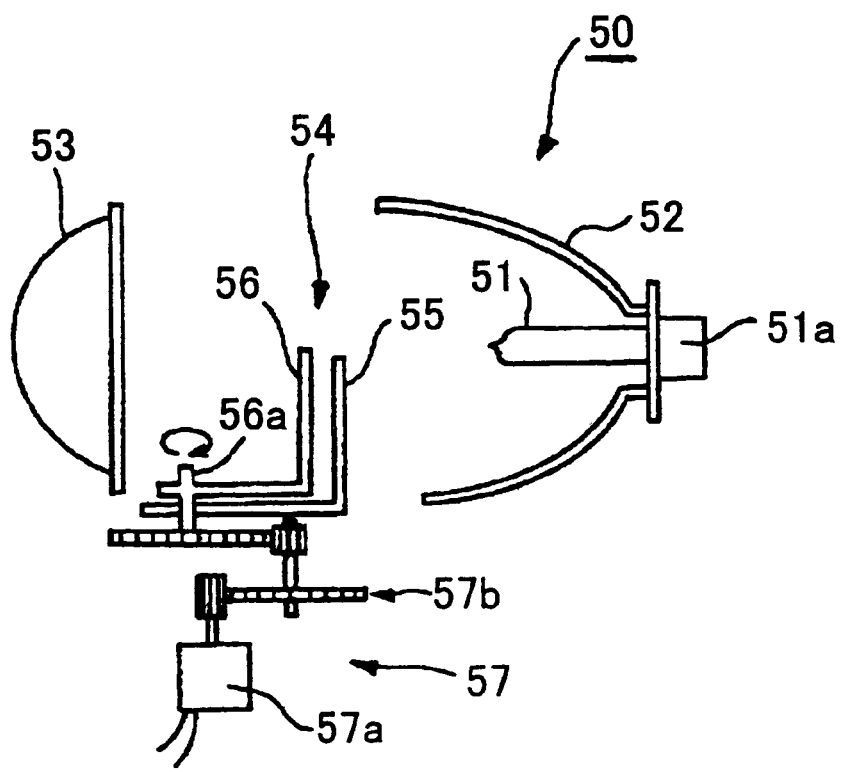
FIG. 19 illustrates a vertical cross-sectional side view along an optical axis of the vehicle light according to the fourth preferred embodiment of the present invention.

FIGS. 17–19 illustrate a fourth preferred embodiment of the present invention. In the first to third preferred embodiments of the present invention, location of a variable element of the light distribution pattern on a screen is switched between an extended side portion from a predetermined side end of the fixed portion of the light distribution pattern and a center portion of the light distribution pattern. On the other hand, in the fourth and fifth preferred embodiments of the present invention, a variable element of the light distribution pattern is located in a band-like wide area in the vicinity of the center of the light distribution pattern under a horizontal axis of the screen, and shape of the variable element can be varied along the horizontal axis on the screen.

A vehicle light 50 in FIGS. 17–19 is an automobile headlight comprising a light bulb 51 as a light source, a major reflecting surface 52 located to surround the light bulb 51, a projection lens 53, and a shutter 54.

The light bulb 51 can be one which is generally available for use as a light source of an automobile headlight, or a supplementary headlight such as a fog light. The light bulb 51 is disposed in a socket 51a, and electric power is supplied to the light bulb 51 through the socket 51a.

The major reflecting surface 52 can be concave when viewed in a direction facing to the front of the vehicle light 50 for reflecting light rays from the light bulb 51 to the projection lens 53. The major reflecting surface 52 is preferably an ellipse group reflecting surface such as a rotated elliptic surface or an elliptic free-curved surface having a first focus on a filament or a discharge arc of the light bulb 51 and a second focus in the vicinity of the focus of the projection lens 53.

The projection lens 53 can be a convex lens located on the optical axis X of the vehicle light 50 which passes through the filament. When light rays reflected by the major reflecting surface 52 or directly come from the filament pass through the projection lens 53, the light rays are refracted by the projection lens 53 in a converging manner to the forward of the vehicle light 50 by a predetermined degree. Light rays that have passed through the projection lens 53 in such a manner further travel to the forward of the vehicle light 50.

The shutter 54 can be formed of a shading material. The shutter 54 is located in a light passageway from the light bulb 51 to the projection lens 53, preferably in the vicinity of a focus of the projection lens 53. Image of light in the vicinity of the focus of the projection lens 53 is projected upside-down and a left side to be a right side at the forward of projection lens 53. The shutter 54 prohibits a portion of light rays converged in the vicinity of the focus of the projection lens 53 which is unnecessary for the formation of a light distribution pattern. The prohibited portion of light rays by the shutter 54 can be called as a cut-off portion of the light distribution pattern. By adjusting the shape of the shutter 54, shape of the cut-off line of the light distribution pattern can be adjusted. The focused image of light in the vicinity of the focus of the projection lens 53 is constituted by light rays directly come from the filament and light rays reflected by the major reflecting surface 52.

The shutter 54 includes a fixed portion 55 and a movable portion 56. The fixed portion 55 is concave when viewed in a direction facing to the projection lens 53. The fixed portion 55 has a substantially cylindrical surface with a vertical axis 56*a* which passes through a center of its circular cross section. The substantially cylindrical surface can include an aspherical surface corresponding to an aspherical focus of the projection lens 53, if a convex aspherical lens is used as the projection lens 53.

The movable portion 56 is concave when viewed in a direction facing to the projection lens 53 and located inside of the concave surface of the fixed portion 55. The movable portion 56 has a substantially cylindrical surface with a vertical axis 56*a* which passes through a center of its circular cross section. The substantially cylindrical surface can include an aspherical surface corresponding to an aspherical focus of the projection lens 53, if a convex aspherical lens is used as the projection lens 53. The movable portion 56 is movable in a rotating manner around the vertical axis 56*a* from its fully inserted position indicated by solid lines to its removed position indicated by dotted lines in FIG. 18.

The movable portion 56 is rotated around the vertical axis 56*a* by a driving mechanism 57 as shown by FIG. 19. The shutter 54 includes a return spring 56*b* which pulls the movable portion 56 to its fully inserted position, and a stopper 56*c* which retains the movable position 56 in its fully inserted position.

The driving mechanism 57 can include a driving motor 57*a*, and a reduction gear 57*b*. Driving force of the driving motor 57*a* for rotation is transmitted through the reduction gear 57*b* to the vertical axis 56*a* such that the movable portion 56 of the shutter 54 is rotated around the vertical axis 56*a*.

It is preferable that operation of the driving motor 57*a* is controlled depending on steering angle of the vehicle.

Although not shown, the driving mechanism 57 can have other configuration.

The fixed portion 55 of the shutter 54 includes a lower horizontal upper edge 55U, an inclined upper edge 55N2, and a higher horizontal upper edge 55H2. The movable portion 56 of the shutter 54 includes an inclined upper edge 56N1 and a horizontal upper edge 56H1. A cross point of the inclined upper edge 56N1 and the horizontal upper edge 56H1 corresponds to a center of the cut-off line located on a vertical axis on a screen, when the movable portion 56 is located in its fully inserted position.

Figure 20:
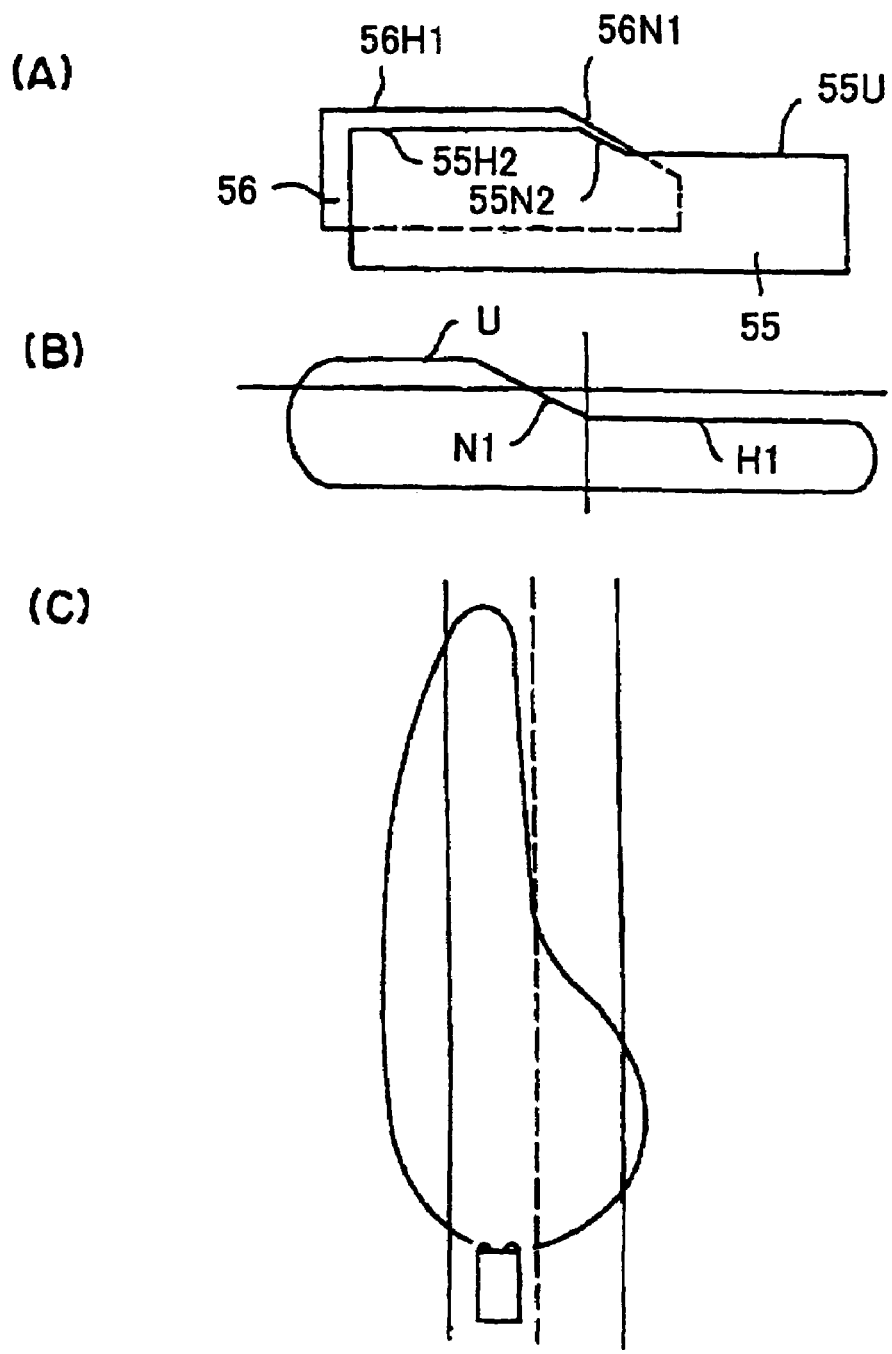
FIG. 20(A) illustrates a schematic view of a shutter of the vehicle light when a movable portion of the shutter is fully inserted in the light passageway from a major reflecting surface to a projection lens as seen from a light source position, according to the fourth preferred embodiment of the present invention.
FIG. 20(B) illustrates a light distribution pattern on a screen when the movable portion of the shutter is fully inserted in the light passage way from the major reflecting surface to the projection lens for the vehicle light according to the fourth preferred embodiment of the present invention.
FIG. 20(C) illustrates a light distribution pattern on a road when the movable portion of the shutter is fully inserted in the light passageway from the major reflecting surface to the projection lens for the vehicle light according to the fourth preferred embodiment of the present invention.
Figure 21:
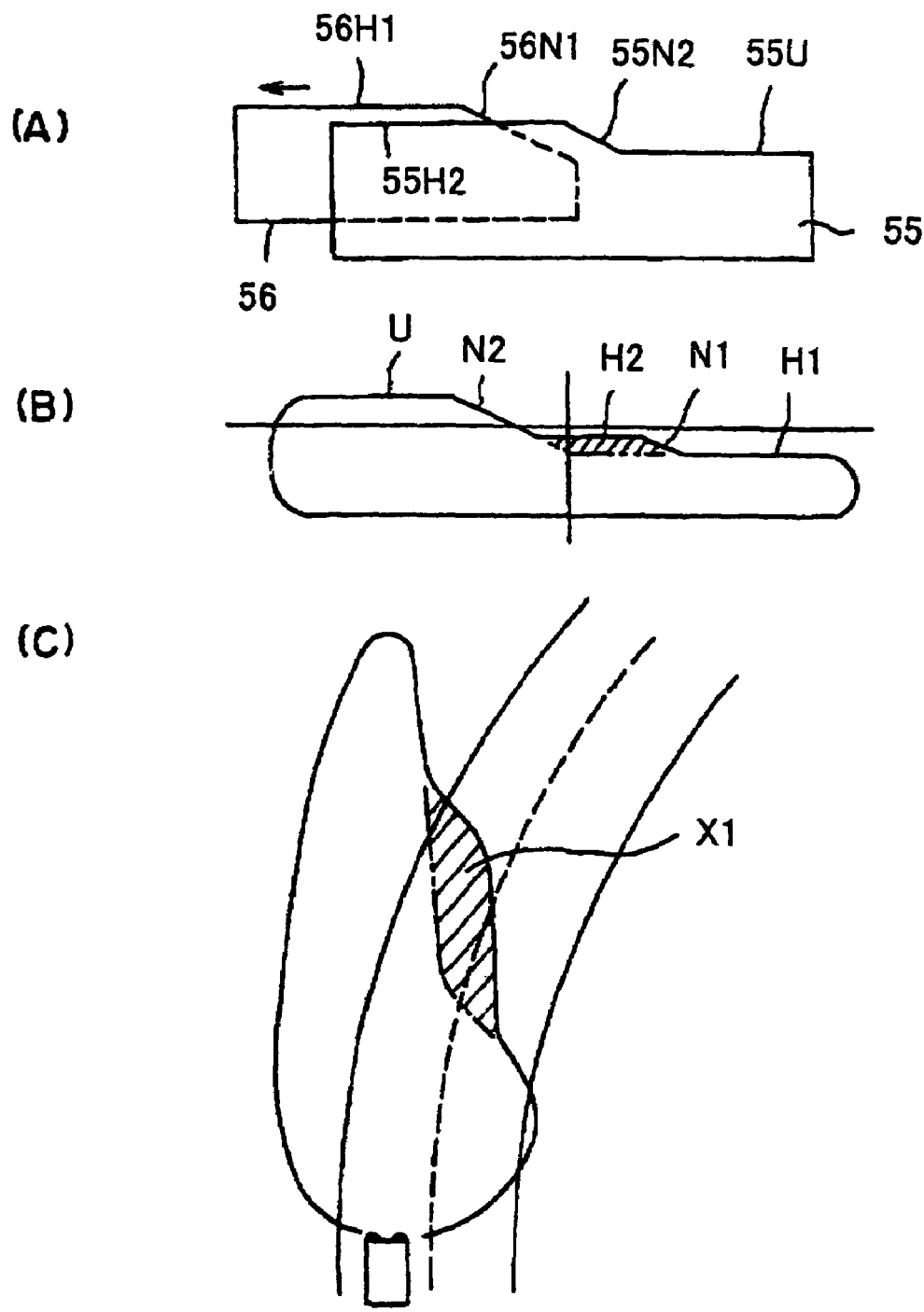
FIG. 21(A) illustrates a schematic view of a shutter of the vehicle light when the movable portion of the shutter is laterally moved from its fully inserted portion to an extent that the movable portion is partly inserted in the light passage way from a major reflecting surface to a projection lens as seen from a light source position, according to the fourth preferred embodiment of the present invention.
FIG. 21(B) illustrates a light distribution pattern on a screen when the movable portion of the shutter is laterally moved from its fully inserted position to an extent that the movable portion is partly inserted in the light passage way from the major reflecting surface to the projection lens for the vehicle light according to the fourth preferred embodiment of the present invention.
FIG. 21(C) illustrates a light distribution pattern on a road when the movable portion of the shutter is laterally moved from its fully inserted position to an extent that the movable portion is partly inserted in the light passageway from the major reflecting surface to the projection lens for the vehicle light according to the fourth preferred embodiment of the present invention.
Figure 22:
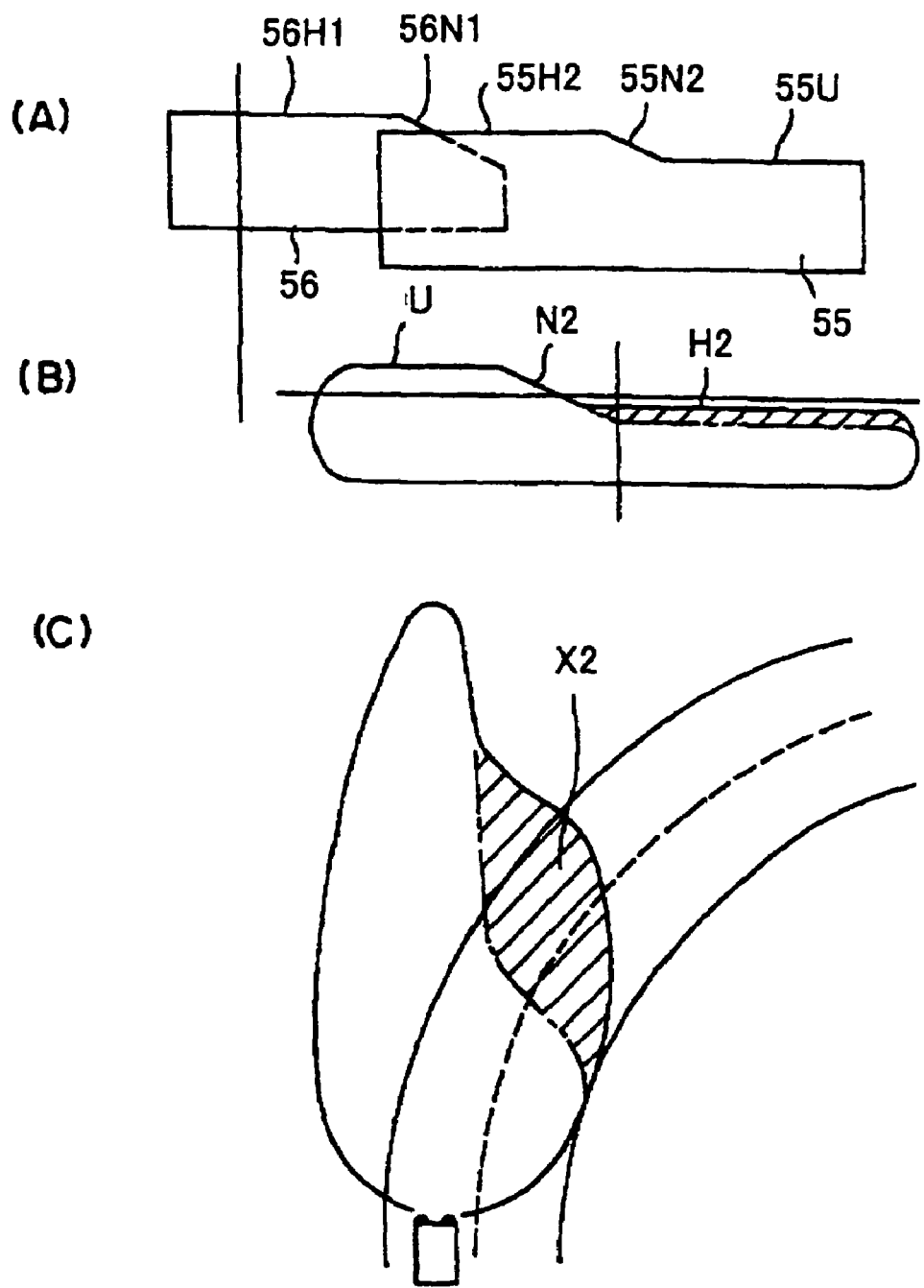
FIG. 22(A) illustrates a schematic view of the shutter of the vehicle light when the movable portion of the shutter is removed from the light passage way from the major reflecting surface to the projection lens as seen from a light source position, according to the fourth preferred embodiment of the present invention.
FIG. 22(B) illustrates a light distribution pattern on a screen when the movable portion of the shutter is removed from the light passage way from the major reflecting surface to the projection lens for the vehicle light, according to the fourth preferred embodiment of the present invention.
FIG. 22(C) illustrates a light distribution pattern on a road when the movable portion of the shutter is removed from the light passageway from the major reflecting surface to the projection lens for the vehicle light according to the fourth preferred embodiment of the present invention.

FIGS. 20–22 illustrate light distribution patterns on the screen and on the road when the movable portion 56 of the shutter 54 is fully inserted in, partly inserted in, and removed from the light passageway from the light source to the projection lens 53, respectively.

The lower horizontal upper edge 55U of the fixed portion 55 of the shutter 54 forms an upper horizontal cut-off line element U of a cut-off line of the light distribution pattern in FIGS. 20–22.

In FIG. 20 (B), a cut-off line of the light distribution pattern includes an upper horizontal cut-off line element U located at a predetermined distance above a horizontal axis on a screen, an inclined cut-off line element N1, and a lower horizontal cut-off line element H1 located at a predetermined distance below a horizontal axis on a screen. The inclined cut-off line element N1 connects the lower horizontal cut-off line element H1 and the upper horizontal cut-off line element U, and may incline to the left upward from a cross point of the lower horizontal cut-off line element H1 and a vertical axis on the screen with an angle between an extension of the lower horizontal cut-off line element H1 to the left side of the vertical axis on the screen and the inclined cut-off line element N1 of 15 degrees. When a high intensity discharge lamp is used as a light source 51, the angle between an extension of the lower horizontal cut-off line element H1 to the left side of the vertical axis on the screen and the inclined cut-off line element N1 can be 45 degrees in accordance with regulations, as shown by FIG. 25(B). In this case, locations of the lower horizontal upper edge 55U, the inclined upper edge 55N2, the inclined upper edge 56N1 are respectively adjusted for the 45 degrees type light distribution pattern. When the movable portion 56 of the shutter 54 is located in its fully inserted position in the light passageway from the light source 51 to the projection lens 53, as shown in FIGS. 20(A)–(B), the inclined cut-off line element N1 of the light distribution pattern is formed by the inclined upper edge 56N1 of the movable portion 56 of the shutter 54. At that time, the lower horizontal cut-off line element H1 of the light distribution pattern is formed by the higher horizontal upper edge 56H1 of the movable portion 56 of the shutter 54.

When the movable portion 56 of the shutter 54 is laterally moved from its fully inserted position in a direction to remove from the light passageway from the light source 51 to the projection lens 53, as shown in FIGS. 21(A)–(B), the inclined upper edge 56N1 of the movable portion 56 of the shutter 54 is laterally moved to be remote from the inclined upper edge 55N2 of the fixed portion 55 of the shutter 54. Then, in the vicinity of a portion of an upper edge of the shutter 54 where the movable portion 56 of the shutter 54 is removed, the inclined upper edge 55N2 and the higher horizontal upper edge 55H2 of the fixed portion 55 appear from a back side of the movable portion 56 of the shutter 54 when viewed from the front of the vehicle light 50. The inclined upper edge 55N2 forms another inclined cut-off line element N2 of the cut-off line U-N2-H2-N1-H1 of the light distribution pattern in FIG. 21(B) The higher horizontal upper edge 55H2 forms a middle horizontal cut-off line element H2 of the cut-off line U-N2-H2-N1-H1 of the light distribution pattern in FIG. 21(B).

In the light distribution pattern of FIG. 21(B), an area shown by slanted lines indicates a variable element of the light distribution pattern whose shape is varied corresponding to lateral movement of the movable portion 56 of the shutter 54 such that the lower horizontal cut-off line element is partly lifted toward the horizontal axis on the screen. When the movable portion 56 of the shutter 54 is removed from the light passageway from the light source 51 to the projection lens 53, the lower horizontal line element is entirely lifted toward the horizontal axis on the screen as shown by FIG. 22(B).

Operation of the vehicle light 50 will now be described. Electric power is supplied to the socket 51*a* to produce light emitted from the light bulb 51. Light rays emitted from the light bulb 51 are reflected by the major reflecting surface 52 to the forward, or directly travel to the forward, and preferably converge in the vicinity of the focus of the projection lens 53. A portion of such light rays are prohibited by the shutter 54, and the other portion of light rays become incident to the projection lens 53. When light rays pass through the projection lens 53, the projection lens 53 refracts the light rays in a converging manner by a predetermined degree such that the light rays illuminates a predetermined front area on the road.

When the movable portion 56 of the shutter 54 is located in its fully inserted position, as shown in FIG. 20(A), the movable portion 56 covers the inclined upper edge 55N2 and the higher horizontal upper edge 55H2 of the fixed portion 55 of the shutter 54. At this time, the upper edge 56H1 and the inclined edge 56N1 of the movable portion 56 are preferably parallel to the upper horizontal upper edge 55H2 and the inclined upper edge 55N2 of the fixed portion 55 of the shutter 54.

When the movable portion 56 of the shutter 54 is located in its removed position from the light passageway from the light source 51 to the projection lens 53, as shown in FIGS. 22(A)–(B), an inclined cut-off line element N2 of the light distribution pattern is formed by the inclined upper edge 55N2 of the fixed portion 55 of the shutter 54, and a lower horizontal cut-off line element H2 of the light distribution pattern is formed by the higher horizontal upper edge 55H2 of the fixed portion 55 of the shutter 54. The lower horizontal cut-off line element H2 of the light distribution pattern is located slightly above the lower horizontal cut-off line element H1 of the light distribution pattern in FIG. 20(B). However, the lower horizontal cut-off line element H2 of the light distribution pattern is still under the horizontal axis on the screen.

When the movable portion 56 of the shutter 54 is partly inserted in the light passageway from the light source 51 to the projection lens 53 as shown in FIG. 21(A), the light distribution pattern is formed as in FIG. 21(B). At the left side of the vertical axis on the screen, a higher horizontal cut-off line element U which is a horizontal line located at a predetermined distance above the horizontal axis is formed by the lower horizontal upper edge 55U of the fixed portion 55, and another inclined cut-off line element N2 is formed by the inclined upper edge 55N2 of the fixed portion 55. In an area from the vicinity of the center to the right side of the light distribution pattern, a middle horizontal cut-off line H2 located slightly under the horizontal axis on the screen is formed by the horizontal upper edge 55H2 of the fixed portion 55 which appeared by removal of the movable portion 56. In addition, an inclined cut-off line element N1 formed by the inclined edge 56N1 of the movable portion 56 moves from the vicinity of the center to the right side of the light distribution pattern in accordance with movement of the movable portion 56. At the right side of the vertical axis on the screen, a lower horizontal cut-off line element H1 which is a horizontal line located at a predetermined distance lower than the horizontal axis on the screen is formed by the upper edge 56H1 of the movable portion 56.

FIG. 21(C) illustrates light distribution characteristics on a road for the light distribution pattern on the screen in FIG. 21(B). As shown by FIG. 21(C), in the left lane of the road, a far distant area in front of the vehicle is illuminated. On the other hand, in the right lane of the road, i.e., at the side of an on-coming lane, an illuminated distance to the front of the vehicle is relatively short for preventing glare light to a driver of a car running on the on-coming lane. Further, at a slightly left side of the center line on the road, light distribution pattern is cut-off to be an inclined line by the inclined edge 56 N1 of the movable portion 56 of the shutter 54 for preventing glare light to a driver of a car running ahead of the vehicle.

When the vehicle enters into a curve whose curving direction is to the side of an on-coming lane, e.g., right, having a large radius of curvature, the driver steers slightly toward the side of the on-coming lane, e.g., to the right. Depending on a steering angle detected, the driving mechanism 57 is operated to rotate the movable portion 56 of the shutter 54 such that the movable portion 56 of the shutter 54 is laterally moved in a direction to be away from the on-coming lane, i.e., to the left in this case, relative to the fixed portion 55 of the shutter 54. At this time, the movable portion 56 of the shutter 54 is located to be partly inserted in the light passageway from the light source 51 to the projection lens 53 as shown in FIG. 21(A) such that a light distribution pattern is formed on the screen as shown in FIG. 21(B).

At the left side of the vertical axis on the screen, a higher horizontal cut-off line element U which is a horizontal line located at a predetermined distance above the horizontal axis on the screen is formed by the lower horizontal upper edge 55U of the fixed portion 55 of the shutter 54, and a second inclined cut-off line element N2 is formed by the inclined edge 55N2 of the fixed portion 55 of the shutter 54. In an area from the vicinity of the center of the light distribution pattern to the right side of the vertical axis on the screen, a middle horizontal cut-off line element H2 is formed by the higher horizontal upper edge 55H2 of the fixed portion 55. The middle horizontal cut-off line element H2 is located slightly below the horizontal axis on the screen and still above a lower horizontal cut-off line element H1. A width of the middle horizontal cut-off line element H2 is determined corresponding to a moved distance, i.e., an angle of the rotational movement, of the movable portion 56 of the shutter 54. In FIG. 21(B), the middle horizontal cut-off line element H2 appears in an area having a relatively small horizontal angle relative to the light source 51. However, width of the middle horizontal cut-off line element H2 increases as the moved distance of the movable portion 56 increases. In the further right side area of the middle horizontal cut-off line element H2, a first inclined cut-off line element N1 is formed by the inclined edge 56N1 of the movable portion 56 of the shutter 54. And a lower horizontal cut-off line element H1 which is a horizontal line located below the horizontal axis on the screen is formed by the upper edge 56H1 of the movable portion 56 of the shutter 54.

The moving direction of the movable portion 56 of the shutter 54 is to the left in a case that the vehicle light 50 is designed for a vehicle normally driving on a left lane. In a case that the vehicle light 50 is designed for a vehicle normally driving on a right lane, a shutter configuration and light distribution characteristics of such a vehicle light is symmetrical with those in FIG. 20(A)–22(C), relative to a center line of the width, or a vertical axis, a center line on the road. Accordingly, a moving direction of the movable portion of the shutter for a vehicle designed to drive normally on the left lane is to the right.

FIG. 21(C) illustrates a light distribution characteristics on a road for the light distribution pattern in FIG. 21(B). In the left side of the center line on the road, similarly to the light distribution pattern in FIG. 20(C), a far distant area in front of the vehicle is illuminated. In an area from the vicinity of the center line on the road to the right side of the center line on the road, i.e., at the side of the on-coming lane, an illuminated area X1 indicated by slanted lines has a relatively long illuminated distance in front of the vehicle light 50. Other illuminated area except the illuminated area X1 at the side of on-coming lane has a relatively short illuminated distance. Therefore, the increased illuminated area X1 at the side of an on-coming lane is adjusted to be within a predetermined horizontal angle range relative to the light source position 51 of the vehicle light 50 such an extent that the increased illuminated light does not become glare light to a driver of a vehicle running on the on-coming lane. Accordingly, when the vehicle drives on a curve whose curving direction to the side of on-coming lane, e.g., to the right, with a large radius of curvature, since the illuminated distance to the forward of the curve is increased by the increased illuminated area X1, the driver can obtain sufficient visibility to the traveling direction of the curve, while preventing glare light to a driver of a car running on the on-coming lane by the first inclined cut-off line element N1 of the light distribution pattern formed by the inclined edge 56N1 of the movable portion 56 of the shutter 54. The first inclined cut-off line element N1 can be located around the center line on the road. Further, in an area located at slightly left side of the center of the light distribution pattern, since the light distribution pattern is cut-off to form an inclined cut-off line element N2 by the inclined edge 55N2 of the fixed portion 55 of the shutter 54, glare light to a car traveling ahead of the vehicle is prevented.

Figure 25:
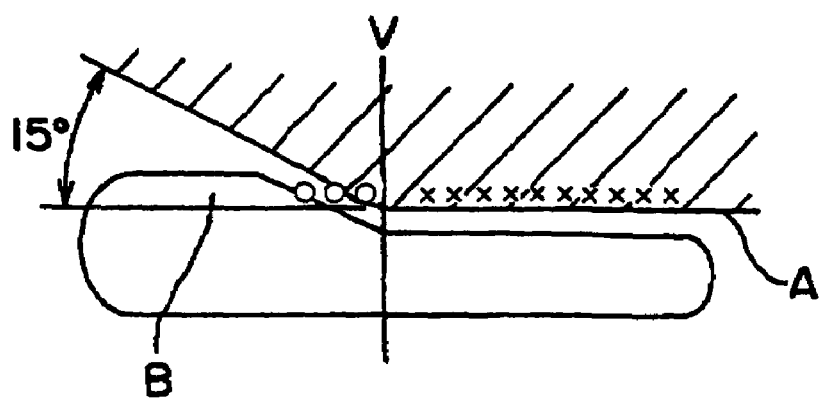
FIG. 25(A) illustrates a standard low beam mode light distribution pattern, i.e., low-beam mode, on a screen defined by regulations, and a cut-off portion of a light distribution pattern for a vehicle designed to drive on a left lane at a normal state of driving.
FIG. 25(B) illustrates another standard low beam mode light distribution pattern, i.e., low-beam mode, on a screen defined by regulations, and a cut-off portion of a light distribution pattern for a vehicle designed to drive on a left lane at a normal state of driving.
Figure 25:
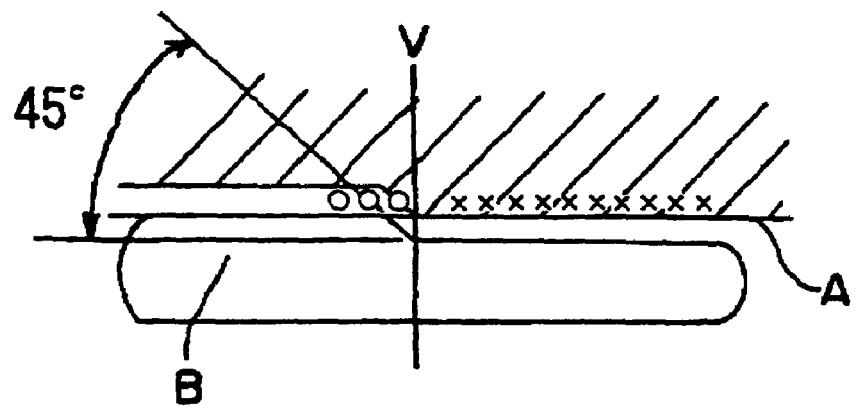

An illuminated distance of the increased illuminated area from the center to the right side portion of the light distribution pattern, is determined in a predetermined range not to provide glare light to a driver of a vehicle traveling ahead of the vehicle on the same lane by adjusting a height of a gap between the higher horizontal upper edge 55H2 of the fixed portion 55 and the upper edge 56H1 of the movable portion 56 of the shutter 54. The gap may be smaller than 1 mm, and preferably 0.5 mm. It is significant that in an area of light distribution pattern from the vicinity of the center to the side of on-coming lane, cut-off line element H2, N1, and H1 do not exceed the horizontal axis on the screen, because the vehicle running ahead of the vehicle is located in an area, which area is located in the vicinity of the center of the light distribution pattern, and also in a close vicinity to the horizontal axis at the upper side thereof, as shown by "o" FIG. 25. A width of the increased illuminated area X1 at the side of on-coming lane is determined in a predetermined horizontal angle range not to provide glare light to a driver of a vehicle running on the on-coming lane by adjusting location of the inclined edge 56N1 of the movable portion 56. i.e., a moved distance of the movable portion 56 of the shutter 54. Location of the vehicle running on an on-coming lane is indicated by "x" in FIG. 25. The locations of a vehicle traveling ahead of the vehicle and a vehicle traveling on the on-coming lane may shift to the left side or the right side depending on road conditions such as when the vehicle drives on a curve. The marks "o" and "x" in FIG. 25 show typical positions of other vehicles traveling ahead of a vehicle on the same lane and traveling on the on-coming lane on the screen.

When the vehicle enters into a curve whose curving direction is to the side of an on-coming lane, e.g., to the right, having a small radius of curvature, a driver of the vehicle steers to the right by a large angle. Based upon the steering angle detected, the driving mechanism 57 can be operated to rotate the movable portion 56 of the shutter 54 such that the movable portion 56 is laterally moved to the other side of the on-coming lane, i.e., to the left, by a relatively large distance with regard to the fixed portion 55 of the shutter 54 as shown by FIG. 22(A). FIG. 22(B) illustrates a light distribution pattern on a screen when the movable portion 56 of the shutter 54 is removed from the light passageway from the light source 51 to the projection lens 53. In an area from the vicinity of the center to the other side of the on-coming lane side, e.g., left side, of the vertical axis on the screen, an upper horizontal cut-off line element U located at a predetermined distance above the horizontal axis on the screen is formed by the lower horizontal upper edge 55U of the fixed portion 55 of the shutter 54. An inclined cut-off line element N2 is formed by the inclined upper edge 55N2 of the fixed portion 55 of the shutter 54. In an area from the vicinity of the center to the on-coming lane side, e.g., right side, of the vertical axis on the screen, a lower horizontal cut-off line element H2 located at a predetermined distance below, i.e., slightly below, the horizontal axis on the screen is formed by the higher horizontal upper edge 55H2 of the fixed portion 55 of the shutter 54 over a relatively large horizontal angle range relative to the light source 51 of the vehicle light 50.

FIG. 22(C) illustrates a light distribution characteristics on the road for the light distribution pattern on the screen of FIG. 22(B). In the left side of the center of the light distribution pattern, similarly to FIG. 21(C), a far distant area in front of the vehicle is illuminated. In an area from the center to the right side portion of the light distribution pattern, i.e., at the side of the on-coming lane, the light distribution pattern includes an illuminated area X2 having a relatively large horizontal angle range for illuminating toward the on-coming lane such that an illuminated distance is further increased in comparison with when the movable portion 56 of the shutter is located in its partly inserted position in the light passageway in FIG. 21(C). Accordingly, when the vehicle drives on a curve to the side of on-coming lane, e.g., to the right, with a small radius of curvature, since the illuminated distance to the forward of the curve is increased by the light distribution pattern element X2, the driver of the vehicle can obtain appropriate visibility to the forward of the curve. In addition, in an area from slightly left to the center of the light distribution pattern, the light distribution pattern is cut-off by the inclined upper edge 55N2 of the fixed portion 55 of the shutter 54. Therefore, glare light to a driver of a car running a distant ahead of the vehicle is prevented.

It is preferable for the vehicle light 50 to provide a light distribution pattern in FIG. 22(C) only in a case that there is no car running on the same lane ahead of the vehicle and also no car running on the on-coming lane. In case that there exists any car running ahead of the vehicle on the same lane or an on-coming lane while the vehicle drives on a curved road, it is preferable to design that the movable portion 56 of the shutter 54 can take its any appropriate position between the fully inserted position and the removed position capable of balancing increased illuminated area and prevention of glare light to the driver of the cars running ahead of the vehicle on the same lane or an on-coming lane.

In case that a driving mechanism 57 malfunctions, or a detection system of a car running ahead of the vehicle and/or running on the on-coming lane malfunctions, the movable portion 56 of the shutter 54 is returned to its fully inserted position in the light passageway from the light source 51 to the projection lens 53 by pulling force of the return spring 56b, and retained at the fully inserted position by the stopper 56c. Accordingly, since the movable portion 56 of the shutter 54 is returned and retained in the fully inserted position when the driving mechanism 57 malfunctions, it is prevented that an illuminated distance at the side of on-coming lane on the road is inadvertently increased.

As described in the above, the vehicle light 50 can vary its light distribution pattern by rotational lateral movement of the movable portion 56 of the shutter 54 around the vertical axis 56a such that an illuminated distance at the side of the on-coming lane can be varied. If the vehicle light 50 is designed for a vehicle driving normally on the left lane, when the vehicle drives on a curve to the right, the illuminated distance to the side of the on-coming lane, i.e., to the right, can be increased in comparison with when the vehicle drives on a straight road for providing improved visibility to the forward of the curve.

The movable portion 56 of the shutter 54 can be laterally moved by the driving mechanism having a simple structure. Therefore, production cost increase is suppressed.

On mode change of the light distribution pattern for traveling from a straight road to a curve, since the movable portion 56 of the shutter 54 is laterally moved, vertical movement of the variable element of the light distribution pattern on the screen is limited in a predetermined range. Accordingly, the cut-off line of the light distribution pattern can be highly precisely adjusted. In an area from the vicinity of the center of the width of the light distribution pattern to the left thereof at any mode of the light distribution pattern, since the fixed portion 55 of the shutter 54 forms the cut-off line element, it is prevented from providing glare light to a driver of a car running ahead of the vehicle at any time of operation of the vehicle light 50. It is preferable that the movable portion 56 of the shutter 54 gradually moves around the vertical axis 56a such that the light distribution pattern of the vehicle light 50 gradually varies.

Further, in case that the driving mechanism 57 malfunctions, since the movable portion 56 of the shutter 54 is retained in its fully inserted position in the light passageway from the light source 51 to the projection lens 53, it is prevented that the light distribution pattern has a relatively long illuminated distance at the side of the on-coming lane in any undesired situation. Accordingly, it is prevented that glare light is inadvertently provided to a car running on the on-coming lane.

Figure 23:
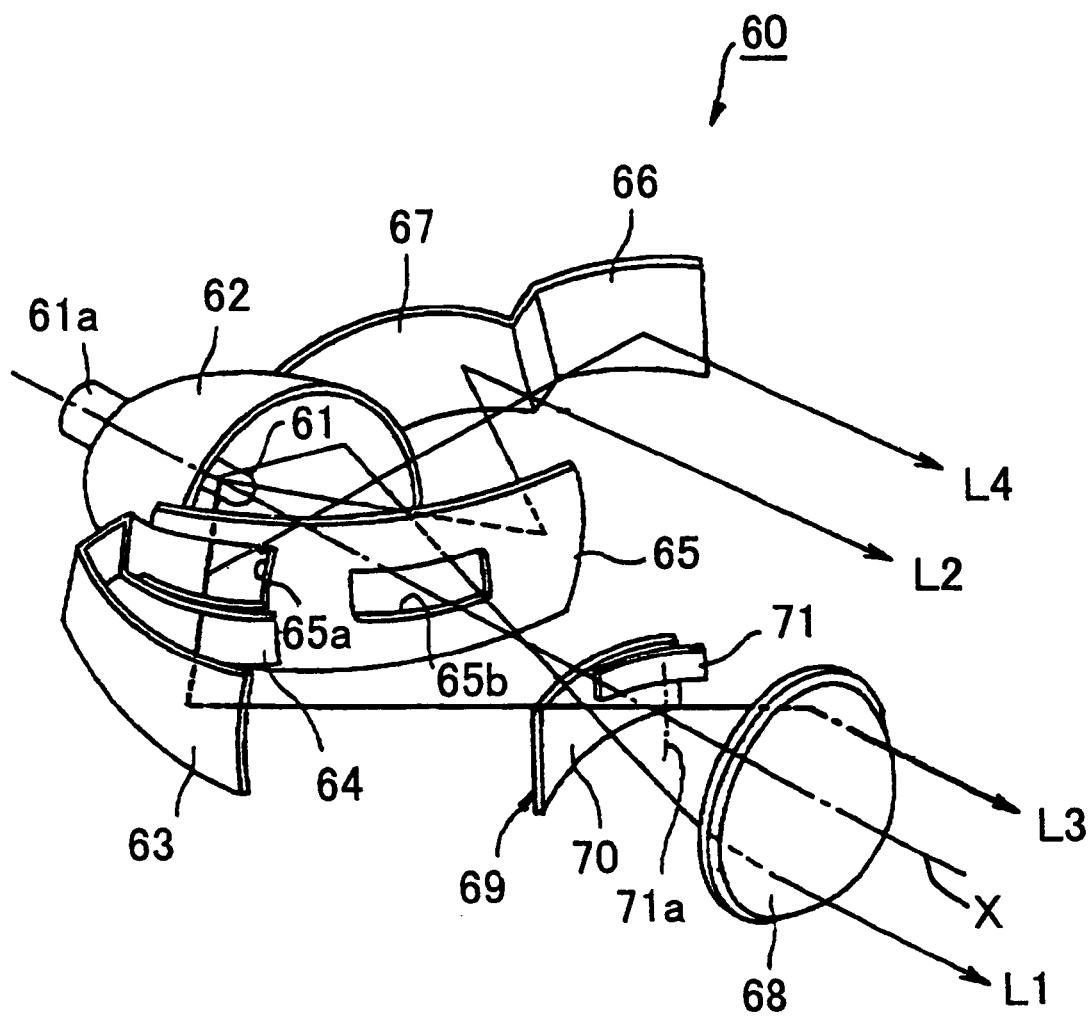
FIG. 23 illustrates a schematic perspective view of a vehicle light according to a fifth preferred embodiment of the present invention.

FIG. 23 illustrates a vehicle light 60 according to a fifth preferred embodiment of the present invention. The vehicle light 60 has a similar structure to the vehicle light 40 according to the third preferred embodiment of the present invention. Location and shape of the variable element of the light distribution pattern are different between the vehicle light 60 and the vehicle light 40. Corresponding to the difference, the shutter configuration and the configuration of each reflecting surface are different between the vehicle light 60 and the vehicle light 40.

The vehicle light 60 preferably includes a light bulb 61 as a light source, a major reflecting surface 62 located to surround the light bulb 61, a first reflecting surface 63, a second reflecting surface 64, a third reflecting surface 65, a fourth reflecting surface 66, a fifth reflecting surface 67, a projection lens 68, and a shutter 69 comprising a fixed portion 70 and a movable portion 71. Among the above-described elements of the vehicle light 60, the second reflecting surface 64 and the movable portion 71 of the shutter 69 are movable, preferably in a rotating manner, and other elements are fixed.

The light bulb 61 can be one of those generally available as a light source of an automobile headlight or a supplementary headlight. The light bulb 61 is retained in a socket 61a through which electric power is supplied.

The major reflecting surface 62 is concave when viewed in a direction facing to the forward of the vehicle light 60 to reflect light rays emitted from the light bulb 61 to the projection lens 68. The major reflecting surface 62 is preferably an ellipse group reflecting surface having a first focus in the vicinity of the light source 61 and a second focus in the vicinity of the focus of the projection lens 63.

The first reflecting surface 63 located at a predetermined side, e.g., the right in FIG. 23, of the major reflecting surface 62 is preferably an ellipse group reflecting surface having a first focus in the vicinity of the light emitting portion of the light bulb 61 and a second focus in the vicinity of the focus of the projection lens 68. The first reflecting surface 63 is concave when viewed in a direction facing to the optical axis X of the vehicle light 60. The first reflecting surface 63 can be preferably a rotated elliptic surface, an ellipsoidal surface, an elliptic cylindrical surface, or an elliptic free-curved surface.

The second reflecting surface 64 is preferably a rotated elliptic surface having a first focus in the vicinity of the light emitting portion of the light bulb 61 and a longitudinal axis which intersects with an optical axis of the vehicle light 60. The second reflecting surface 64 is concave when viewed in a direction facing to the light bulb 61. The second reflecting surface 64 is capable of being inserted in or removed from the light passageway from the light source 61 to the first reflecting surface 63 by rotating around its longitudinal axis. The second reflecting surface 64 is moved by a driving mechanism, not shown, between its removed position and its fully inserted portion. When the second reflecting surface 64 is located at its removed position, the second reflecting surface 64 is located in a shadow region, i.e., backside, of the third reflecting surface 65 when viewed from the light source 61, and does not cover a first aperture 65a of the third reflecting surface 65. When the second reflecting surface is located is its inserted position, the second reflecting surface 64 is located to cover at least partly the first aperture 65a of the third reflecting surface 65. The first aperture 65a of the third reflecting surface 65 is located on the light passageway from the light source 61 to the first reflecting surface 63 to pass the light emitted from the light bulb 61 through itself to the first reflecting surface 63.

The third reflecting surface 65 is preferably an ellipse group reflecting surface having a first focus in the vicinity of the light emitting portion of the light bulb 61, and a longitudinal axis which is across the optical axis X of the vehicle light 60. The third reflecting surface 65 is concave when viewed in a direction facing to the light bulb 61, and has the first aperture 65a located in an area corresponding to the light passageway from the light bulb 61 to the first reflecting surface 63, and a second aperture 65b located in an area corresponding to the light passageway from the light bulb 61 to the projection lens 68.

The longitudinal axis, the first focus, and the second focus of the second reflecting surface 64 and the third reflecting surface 65 are substantially common in FIG. 23. The crossing angle of the substantially common longitudinal axes of the second reflecting surface 64 and the third reflecting surface 65 and optical axis X of the vehicle light 60 can be adjusted considering the entire width determined by design requirements. Further, locations of respective second foci, and longitudinal directions of the second reflecting surface 64 and the third reflecting surface 65 can be different to each other, provided that light rays reflected by the second reflecting surface 64 are sure to incident to the focus of the fourth reflecting surface 66 at any time of rotational movement of the second reflecting surface 64.

The fourth reflecting surface 66 is a parabolic group reflecting surface having a focus in the vicinity of the second focus of the ellipse group second reflecting surface 64 and an optical axis which is substantially parallel to the optical axis X of the vehicle light 60, whereas the optical axis of the fourth reflecting surface 16 of the vehicle light 40 is inclined to the outside relative to the optical axis X of the vehicle light 40. The fourth reflecting surface 66 is concave when viewed in a direction facing to the forward of the vehicle light 60. The fourth reflecting surface 66 is preferably a rotated parabolic surface, a paraboloidal surface, a parabolic cylindrical surface, or a parabolic free curved surface.

The fifth reflecting surface 67 is preferably a parabolic group reflecting surface having a focus in the vicinity of the second focus of the ellipse group third reflecting surface 65. The fifth reflecting surface 67 is concave when viewed in a direction facing to the forward of the vehicle light 60.

The projection lens 68 can be a convex lens located on the optical axis X of the vehicle light 60. The optical axis X of the vehicle light 60 passes through the center of the light emitting portion of the light bulb 61, and extends to the forward of the vehicle light 60. Light rays emitted from the light bulb 61 to the forward and those reflected by the major reflecting surface 62 pass through the second aperture 65*b* and become incident to the projection lens 68. When the light rays pass through the projection lens 68, the light rays are refracted in a converging manner by a predetermined degree, and further travel to the forward of the vehicle light 60 such that a predetermined area is illuminated on the road.

The shutter 69 can be formed of a shading material. The shutter 69 is located in a light passageway from the light bulb 61 to the projection lens 68, preferably in the vicinity of a focus of the projection lens 68. The focus of the projection lens 68 is located between the second aperture 65*b* and the projection lens 68. Image of light in the vicinity of the focus of the projection lens 68 is projected upside-down and left side to be right side at the forward of projection lens 68. The shutter 69 prohibits or cuts-off a portion of light rays converged in the vicinity of the focus of the projection lens 68 which is unnecessary for the formation of a light distribution pattern. The cut-off portion of light rays forms a cut-off portion of the light distribution pattern. By adjusting the shape of the shutter 69, location of a cut-off line of the light distribution pattern can be adjusted. The focused image of light in the vicinity of the projection lens 68 is constituted by light rays directly come from the light emitting portion of the light bulb 61 and that have passed though the second aperture 65*b*, and light rays reflected by the major reflecting surface 62 and that have passed through the second aperture 65*b*.

The shutter 69 can include a fixed portion 70 and a movable portion 71. The fixed portion 70 is concave when viewed in a direction facing to the projection lens 68. The fixed portion 70 has a substantially cylindrical surface with a vertical axis 71*a*, which passes through a center of its circular cross section. The substantially cylindrical surface can include an aspherical surface corresponding to an aspherical focus of the projection lens 68, if a convex aspherical lens is used as the projection lens 68.

The movable portion 71 is concave when viewed in a direction facing to the projection lens 68 and located inside of the concave surface of the fixed portion 70. The movable portion 71 has a substantially cylindrical surface with the vertical axis 71*a*, which passes through a center of its circular cross section. The substantially cylindrical surface can include an aspherical surface corresponding to an aspherical focus of the projection lens 68, if a convex aspherical lens is used as the projection lens 68. The movable portion 71 is movable in a rotating manner around the vertical axis 71*a* from its fully inserted position to its removed position, similarly to the movable portion 56 of the shutter 54 in FIG. 18.

The movable portion 71 is rotated around the vertical axis 71*a* by a driving mechanism, not shown, which has a similar structure as shown by FIG. 19. The shutter 69 includes a return spring, not shown, which pulls the movable portion 71 to its fully inserted position, and a stopper, not shown, which retains the movable position 71 in its fully inserted position.

Although detailed configuration of the shutter 69 is not shown in FIG. 23, the fixed portion 70 of the shutter 69 includes a lower horizontal upper edge 70U, an inclined upper edge 70N2, and a higher horizontal upper edge 70H2, similarly to the fixed portion 55 of the shutter 54 of the vehicle light 50. The movable portion 71 of the shutter 69 includes an inclined edge 71N1 and an upper edge 71H1, similarly to the movable portion 56 of the shutter 54 of the vehicle light 50.

An illuminating direction of light reflected by each reflecting surface, i.e., location and shape of each light distribution pattern element, is different between the vehicle lights 40 and the vehicle light 60.

In the vehicle light 60, light rays emitted from the light source 61 are reflected by the major reflecting surface 62, or directly travel, to the third reflecting surface 65. Among the light rays incident on the third reflecting surface 65, light rays L1 that have passed through the second aperture 65*b* travel to the forward to be incident to the projection lens 68. On the way from the second aperture 65*b* to the projection lens 68, the shutter 69 prohibits a portion of light rays L1 which is unnecessary for formation of the light distribution pattern. A cut-off line of the light distribution pattern is formed by the lower horizontal upper edge 70U of the fixed portion 70 of the shutter 69, the inclined edge 71N1 and the upper edge 71H1 of the movable portion 71 of the shutter 69, when the movable portion 71 of the shutter 69 is located in its fully inserted portion in the light passageway from the light source 61 to the projection lens 68, i.e., when the vehicle drives on a straight way. Light rays L1 incident to the projection lens 68 are refracted in a converging manner when passing through the projection lens 68, and travel further forward to illuminate a rather wide area including an elbow portion as shown by the light distribution pattern element L1 in FIG. 24(A). From the center to the right side of the vertical axis on the screen, the light distribution pattern element L1 illuminates a rather wide area under the horizontal axis on the screen. In the left side of the vertical axis on the screen, the light distribution pattern element L1 illuminates a rather wide area both above and below the horizontal axis on the screen including the elbow portion.

Figure 24:
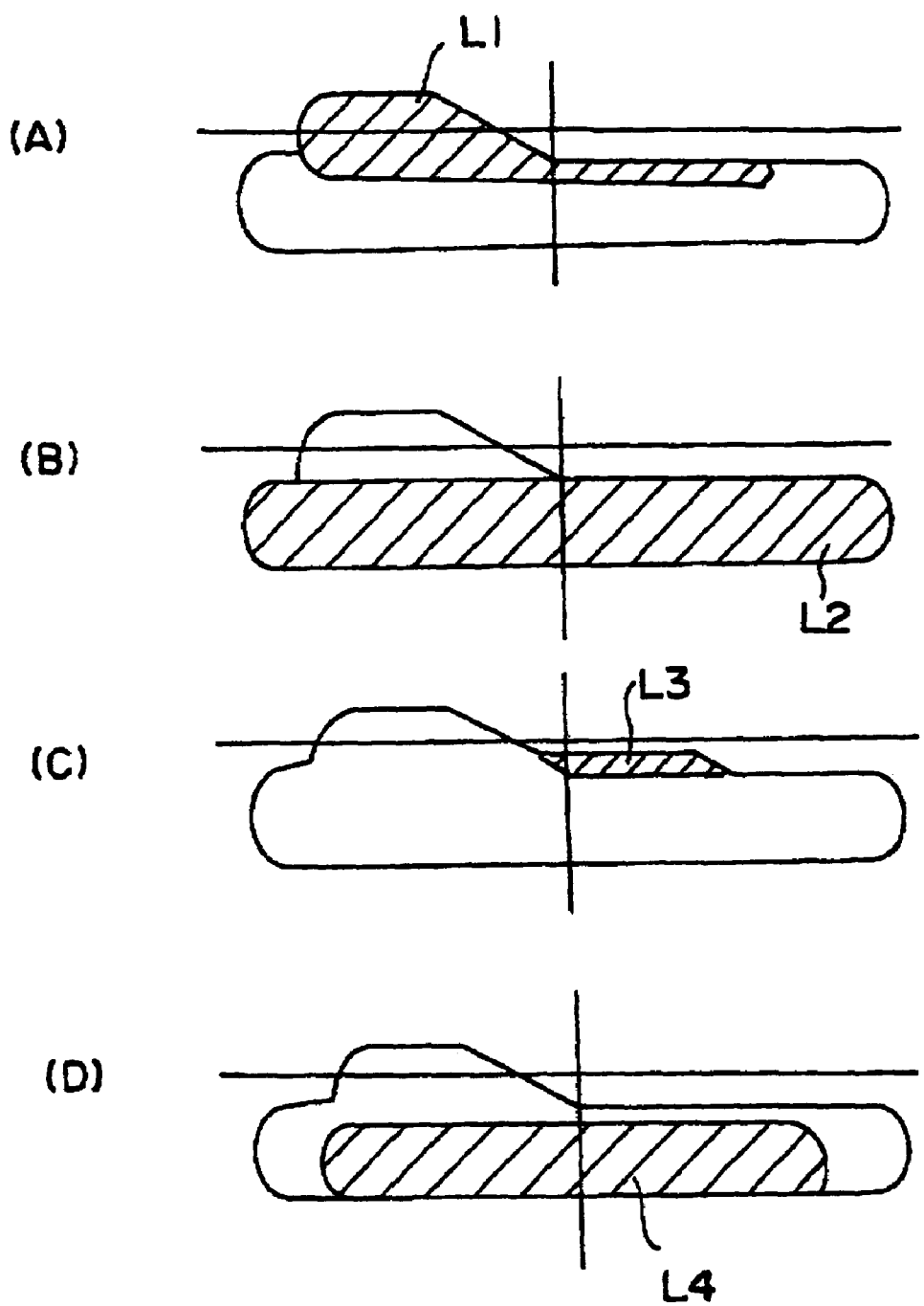
FIG. 24(A) illustrates a light distribution on a screen, and a light distribution pattern element L1 formed by light rays that have passed through an aperture on a third reflecting surface and a projection lens, according to the fifth preferred embodiment of the present invention.
FIG. 24(B) illustrates a light distribution on a screen, and a light distribution pattern element L2 formed by light rays reflected by a fifth reflecting surface, according to the fifth preferred embodiment of the present invention.
FIG. 24(C) illustrates a light distribution on a screen, and a light distribution pattern element L3 formed by light rays reflected by a first reflecting surface, when a movable portion of a shutter and a second reflecting surface are respectively removed at least partly from their corresponding light passageways, according to the fifth preferred embodiment of the present invention.
FIG. 24(D) illustrates a light distribution on a screen, and a light distribution pattern element L4 formed by light rays reflected by a fourth reflecting surface, when the second reflecting surface is located in its fully inserted position, according to the fifth preferred embodiment of the present invention.

Light rays L2 incident on the third reflecting surface 65 other than the first aperture 65*a* and the second aperture 65*b* are reflected by the third reflecting surface 65 to its second focus. Since the second focus of the third reflecting surface 65 is also the focus of the fifth reflecting surface 67 and the axis of the fifth reflecting surface 67 is substantially parallel to the optical axis X of the vehicle light 60, light rays L2 reflected by the fifth reflecting surface 67 travel to the forward, pass through a front lens, not shown, and illuminate a wide front area of the vehicle light 60 as shown by FIG. 24(B). The light distribution pattern element L2 illuminates a wide area under the horizontal axis on the screen, while providing sufficient amount of light to the front downward of the vehicle light 60.

Traveling direction of light rays incident to the first aperture 65*a* of the third reflecting surface 65 differs depending on whether the second reflecting surface 64 is located in its inserted position or removed position relative to the light passageway from the light bulb 61 to the first reflecting surface 63.

When the second reflecting surface 64 is removed from the light passageway, light rays L3 incident on the first aperture 65a pass through the first aperture 65a, and are reflected by the first reflecting surface 63 to the second focus of the first reflecting surface 63. After an unnecessary portion of the light rays on formation of the light distribution pattern is prohibited by the shutter 69 similarly to the light rays L1 which passed through the second aperture 65b and travel to the projection lens 68, the light rays L3 are incident to the projection lens 68. Since the second focus of the first reflecting surface 63 is also the focus of the projection lens 68, light rays L3 incident to the projection lens 68 are refracted by the projection lens 68 when passing through the projection lens 68 in a converging manner to the front focus of the projection lens 68 by a predetermined degree. Light rays L3 that have passed through the projection lens 68 become parallel to each other and travel to the forward of the vehicle light 60.

FIG. 24(C) illustrates light distribution characteristics on the screen of the light rays L3 which are reflected by the first reflecting surface 63 and that have passed through the projection lens 68, when the second reflecting surface 64 and the movable portion 71 of the shutter 69 are located in their respective removed positions. The light distribution pattern element L3 illuminates an area in the vicinity of the center of the light distribution pattern under the horizontal axis on the screen.

When the light rays L3 travel from the first reflecting surface 63 to the projection lens 68, light rays L3 pass through an area between the third reflecting surface 65 and the shutter 69. Radius of curvature of each element of the first reflecting surface 63 which collectively constitute the first reflecting surface 63, is preferably adjusted such that the light distribution element L3 can illuminate an increased illuminated area under the horizontal axis on the screen in a concentrated manner. The light distribution pattern element L1 forms the cut-off line of the light distribution pattern when the light distribution pattern element L3 does not exist in the light distribution pattern.

When the vehicle drives on a straight road, the second reflecting surface 64 and the movable portion 71 of the shutter 69 are located in their respective fully inserted position relative to the light passageways from the light source 61 to the first reflecting surface 63 or to the projection lens 68, respectively. When the vehicle drives on a curve or turn around a corner, the second reflecting surface 64 and the movable portion 71 of the shutter respectively move to their removed positions relative to their respective light passageways. Depending on moved distance from their respective fully inserted positions to the removed positions, a length of the middle cut-off line element corresponding to an uppermost periphery of the light distribution pattern element L3 varies in a direction along the horizontal axis on the screen, while the height of the light distribution pattern element L3 is maintained. When the length of the uppermost periphery of the light distribution pattern element L3 varies in the direction along the horizontal axis, an inclined side of the light distribution pattern element L3 located on the inclined cut-off line formed by the light distribution pattern element L1 is fixed, and the other inclined side of the light distribution pattern element L3 varies its location. The area shown by slanted lines in FIG. 24(C) illustrates an illuminated area of the light distribution pattern element L3 when the movable portion 71 of the shutter 69 is located in its partially inserted position in the light passageway from light source 61 to the projection lens 68 while the first aperture 65a is partly released. When the movable portion 71 of the shutter 69 is located in its removed position from the light passageway, it is preferable that the an outer vertical edge of the light distribution pattern element L3 is located in the vicinity of the right end of the light distribution pattern, similarly to FIG. 22(B). The light distribution pattern element L3 illuminates an area slightly under the horizontal axis on the screen in a vertical direction, and from the center to the right side of the light distribution pattern in a horizontal direction, with appropriate width depending on state of driving. In the area shown by slanted lines in FIG. 24(C) of the light distribution pattern, a light amount is varied corresponding to a varying shape of the light distribution pattern element L3.

When the second reflecting surface 64 is located in its full inserted position relative to the light passageway from the light source 61 to the first reflecting surface 63, light rays L4 incident on the first aperture 65a pass through the first aperture 65a, and are reflected by the second reflecting surface 64 to the second focus of the second reflecting surface 64. Since the second focus of the second reflecting surface 64 is also the focus of the fourth reflecting surface 66 and the fourth reflecting surface 66 is a parabolic group reflecting surface having an axis substantially parallel to the optical X of the vehicle light 60, light rays L4 reflected by the fourth reflecting surface 66 illuminate a wide area in front of the vehicle light 60.

FIG. 24(D) illustrates a light distribution pattern on a screen and a light distribution pattern element L4 of the light rays L4 reflected by the fourth reflecting surface 66. The light distribution pattern element L4 illuminates a wide area under the horizontal axis on the screen, and provides a sufficient amount of light to the downward. It is preferable that a lower horizontal periphery of the light distribution pattern element L1 is adjacent to the upper horizontal periphery of the light distribution pattern element L4 for emphasizing effect of switching of the light distribution pattern element between L3 and L4.

Accordingly, in the above-described structure, the vehicle light 60 can switch illumination direction of light rays incident to the first aperture 65a between the light distribution pattern element L3 and the light distribution pattern element L4, depending on whether the second reflecting surface 64 is located in, or removed from, the light passageway from the light source 61 to the first reflecting surface 63, while other light distribution elements L1 and L2 are fixed. When the second reflecting surface 64 is located in its fully inserted position, similarly to the vehicle light 50 in FIG. 20, the vehicle light 60 can illuminate a relatively wide area in front of the vehicle light 60 under the horizontal axis on the screen by the light distribution pattern element L4. When the second reflecting surface 64 is removed at least partly from the light passageway from the light source 61 to the first reflecting surface 63, the vehicle light 60 illuminates a predetermined area from the vicinity of the center to the right side of the light distribution pattern at a far distance in a concentrated manner by the light distribution pattern element L3 depending on moved distance of the second reflecting surface 64. The light rays L3 can be concentrated to the predetermined area from the vicinity of the center to the right side of the light distribution pattern on the screen, i.e., a far distant area in the vicinity of the center line of the road, by passing through the projection lens 68. If allowed, the light distribution pattern elements L3 may extend to the outer side periphery of the light distribution pattern element L1, which side is on the on-coming lane side.

Herein, when the movable portion 71 of the shutter 69 is moved from its fully inserted position to its removed position relative to the light passageway from the light source 61 to the projection lens 68, together with the movement of the second reflecting surface 64 from its fully inserted position to the its removed position relative to the light passageway from the light source 61 to the first reflecting surface 63, shape of the cut-off portion of the light distribution pattern of the vehicle light 60 is varied corresponding to the movements of the movable portion 71 of the shutter 69 and the second reflecting surface 64. By removal of the movable portion 71 of the shutter 69 from the corresponding light passageway, the shape of the cut-off portion of the light distribution pattern is varied such that a portion of a lower horizontal cut-off line element is lifted in an area from the center to the right side of the light distribution pattern to illuminate an area slightly under the horizontal axis on the screen. Therefore, the light distribution pattern can expand its illuminated area by the light distribution pattern element L3 by the removal of the movable portion 71 of the shutter 69. Herein, together with the removal of the movable portion 71, the second reflecting surface 64 intensively provide light rays to the increased illuminated area L3. The light amount of the light distribution pattern L3 is substantially the same as the light distribution pattern element L4, while area-of the light distribution pattern L3 is narrower than that of the light distribution pattern element L4. Accordingly, an illuminated distance at the side of the on-coming lane on the road is increased, while sufficiently improved visibility to the on-coming lane side is obtained. If only the movable portion 71 of the shutter 69 is moved from the light passageway from the light source 61 to the projection lens 68, and the second reflecting surface 64 is remained in its fully inserted position relative to the light passageway from the light source to the first reflecting surface 63, it may happen that light intensity of the increased illuminated area corresponding to the light distribution pattern element L3 is not sufficient to significantly improve visibility to the on-coming lane. Therefore, it is preferable that the movable, portion 71 and the second reflecting surface 64 are moved together. In this case, it is preferable that, in a state that the motor 57a of driving mechanism 57 is turned-off, the second reflecting surface 64 is located in its fully inserted position, and that the motor 57a is turned on when the second reflecting surface 64 is moved to its removed position.

Further, it is also preferable that the light distribution pattern element L3 and the light distribution pattern element L1 does not overlap to each other, for emphasizing effect of increased illuminated area by the light distribution pattern element L3.

Regarding locations to be taken by the second reflecting surface 64 and the movable portion 71 of the shutter 69 relative to their respective light passageways, it is possible that the second reflecting surface 64 and the movable portion 71 of the shutter 69 instantly switch among several predetermined positions including the fully inserted position and the removed position. However, it is preferable that the second reflecting surface 64 and the movable portion 71 of the shutter 69 can be gradually moved together between their respective fully inserted positions and removed positions relative to their respective light passageways in order to correspond to the varying steering angle. Since precise adjustment of the length of the light distribution pattern element L3 can be achieved, when the vehicle drives on a curve, the vehicle light 60 can illuminate the forward of the curve with more appropriate pattern and brightness, thereby visibility to the forward of the curve is improved.

The movable portion 71 of the shutter 69 and the second reflecting surface 64 can be driven by a separate driving mechanism, or the same driving mechanism.

The vehicle light 60 in FIG. 23 is directed for being disposed at the left front end of the vehicle body. In case the fifth preferred embodiment of the present invention is used for being disposed at the right front end of the vehicle body, such a vehicle light has a substantially symmetrical structure to the vehicle light 60, except the shutter 69, relative to a line which is located between the two vehicle lights disposed on either side of the vehicle and is parallel to the optical axis X of the vehicle light 60.

Operational advantages of the fourth and fifth preferred embodiments of the present invention will now be described. In the vehicle lights 50 and 60 according to the fourth and fifth preferred embodiments of the present invention, the shape of cut-off line of the light distribution pattern can be varied by lateral movement of the movable portion 56, 71 of the shutter 54, 69. Therefore, it can be achieved to increase illuminated distance in an area from the vicinity of the center line to the side of the on-coming lane such that visibility to the forward of the curve is improved without glaring a driver of other vehicles running ahead of the vehicle and running on the on-coming lane, when the vehicle drives on a curve or turns around a corner. Since the movement of the movable portion 56, 71 of the shutter 54, 69 is performed laterally on change of the cut-off line of the light distribution pattern, movement of cut-off line element in vertical direction can be limited in a predetermined range, enabling highly precise adjustment of the cut-off line. Further, in the vehicle lights 50 and 60, means for increasing an illuminated distance in a front area from the center to the side of the on-coming lane has a simple structure.

Figure 26:
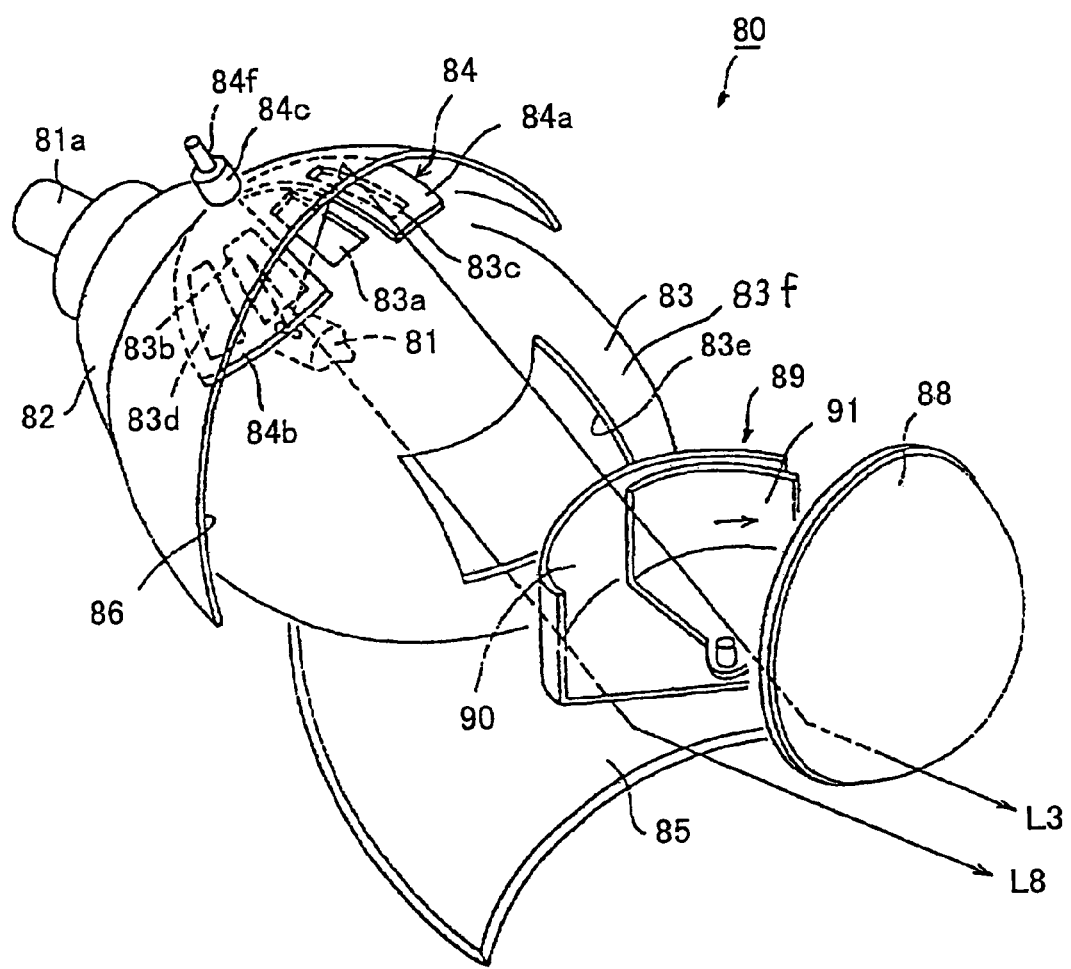
FIG. 26 illustrates a schematic perspective view of a vehicle light according to a sixth preferred embodiment of the present invention.
Figure 27:
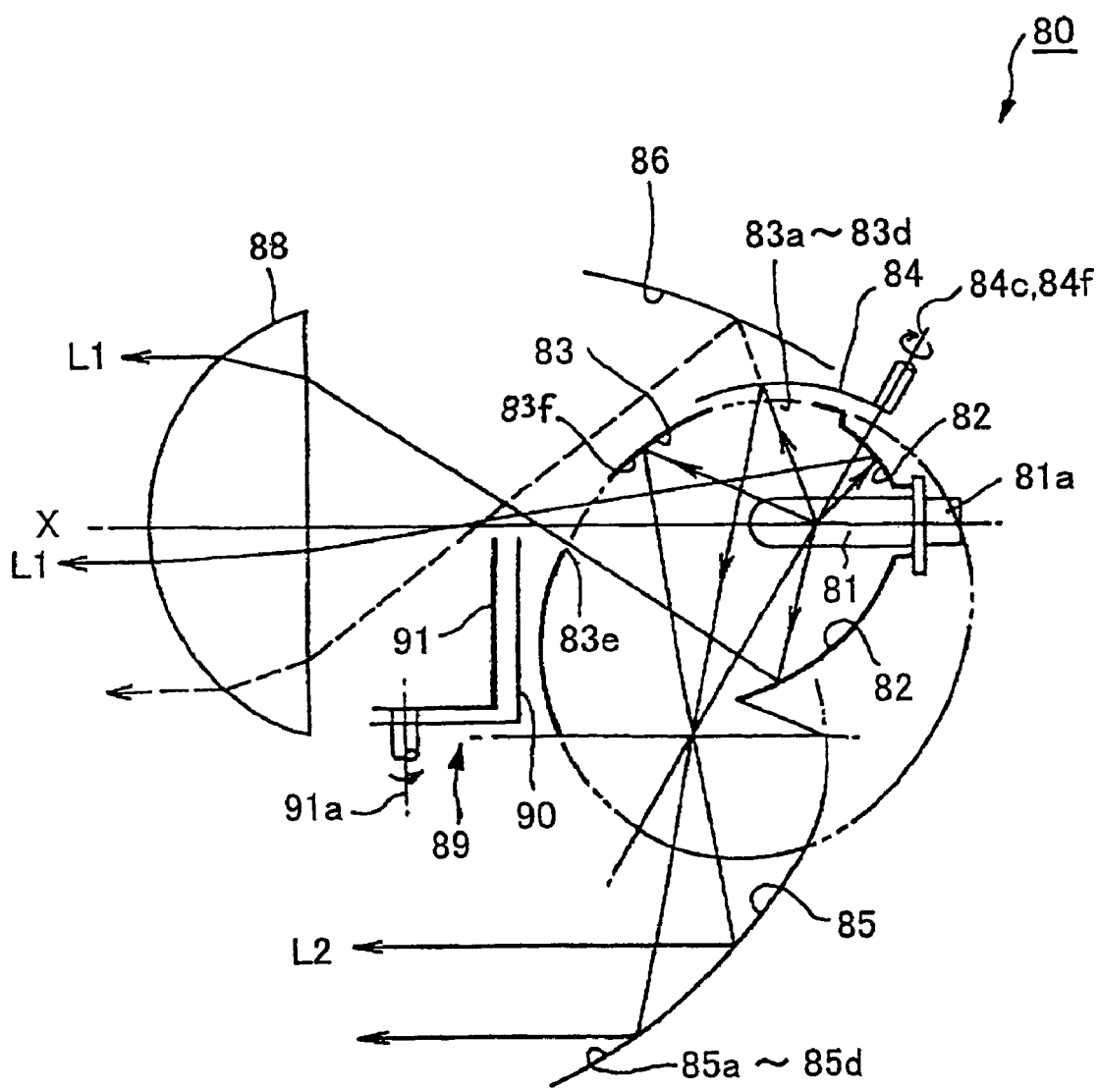
FIG. 27 illustrates a cross-sectional view along an optical axis of the vehicle light according to the sixth preferred embodiment of the present invention.

FIGS. 26–27 illustrate a vehicle light 80 according to a sixth preferred embodiment of the present invention. The vehicle light 80 includes a light bulb 81, a major reflecting surface 82 located to surround the light bulb 81, a first fixed reflecting surface 83 comprising a sixth reflecting surface element 83f, a movable reflecting surface as a first reflecting surface 84 comprising first reflecting surface elements 84a, 84b, a second fixed reflecting surface 85 comprising second reflecting surface elements 85a, 85b and fourth reflecting surface elements 85c, 85d, a third fixed reflecting surface 86 comprising third reflecting surface elements 86a, 86b and fifth reflecting surface elements 86c, 86d, a projection lens 88, and a shutter 89. The first fixed reflecting surface 83, the movable reflecting surface 84, the second fixed reflecting surface 85, the third fixed reflecting surface 86 are respectively located outside the major reflecting surface 82. An optical axis direction of the second reflecting surface elements 85a, 85b is preferably substantially parallel to the an optical axis X of the vehicle light 80. Each optical axis direction of the fourth reflecting surface element 85c, 85d is preferably inclined to inward relative to the optical axis X of the vehicle light 80. The vehicle light 80 includes a shutter 89 comprising a fixed portion 90 and a movable portion 91 capable of rotational movement around the vertical axis 91a, similarly to the shutter 69 according to the fourth and fifth preferred embodiments of the present invention.

In the vehicle light 80, elements except the first reflecting surface 84 and the movable portion 91 of the shutter 89 are all fixedly located. The first reflecting surface 84 can be disposed allowing for rotational movement.

Although the first reflecting surface 84 includes the two first reflecting surface elements 84a and 84b, the first reflecting surface 84 may include only one first reflecting surface element.

Although the vehicle light 80 includes the two second reflecting surface elements 85a and 85b, the second reflecting surface 85 can include only one second reflecting surface element. Similarly, the number of third reflecting surface elements 86a and 86b is not limited to two, but the vehicle light 80 can include only one third reflecting surface element. Further, although the vehicle light 80 includes the two fourth reflecting surface elements 85c and 85d and two fifth reflecting surface elements 86c, 86d, the vehicle light 80 can include only one fourth and fifth reflecting surface elements, respectively. Alternatively, neither fourth reflecting surface element nor fifth reflecting surface element can be included in the vehicle light 80.

The light bulb 81 is the one which is generally used for an automobile headlight or a supplementary headlight such as a fog light. The filament 81b can be a discharge arc 81b when a discharge lamp is adopted as a light bulb 81.

The major reflecting surface 82 can be formed to be concave when viewed in a direction facing to the front of the vehicle light 80 such that the major reflecting surface 82 reflects light emitted from the light bulb 81 to the projection lens 88. The major reflecting surface 82 can be preferably an ellipse group reflecting surface such as a rotated elliptic surface or an elliptic free-curved surface having a first focus on the filament 81b and a second focus in the vicinity of the focus of the projection lens 88.

The first fixed reflecting surface 83 is an ellipse group reflecting surface located in front of the major reflecting surface 82, having a first focus in the vicinity of the light emitting portion of the light bulb 81, and a second focus located in a front downward position of the first focus. The first fixed reflecting surface 83 includes a center aperture 83e in an area around an optical axis X of the vehicle light 80 passing through the first fixed reflecting surface 83. The first fixed reflecting surface 83 further includes four apertures laterally located in the vicinity of its upper edge, i.e., a first aperture 83a, a second aperture 83b, a third aperture 83c, and a fourth aperture 83d. The first aperture 83a and the third aperture 83c are symmetrical to the second aperture 83b and the fourth aperture 83d relative to a vertical cross section passing through the optical axis X of the vehicle light 80. If the fifth reflecting surface element 86c and/or 86d is not included in the vehicle light 80, a corresponding aperture 86c, and/or 86d is not included, either. The apertures 83a, 83b, 83c, and 83d can be replaced by window portions. Alternatively, the apertures 83a, 83b, 83c and 83d can be a single continuous aperture.

The first reflecting surface 84 is preferably an ellipse group reflecting surface located slightly outside the first fixed reflecting surface 83, having a first focus in the vicinity of the light emitting portion 81b of the light bulb 81, and a second focus located at a front downward position of the first focus. It is preferable that the second focus of the first reflecting surface 84 is located in the vicinity of the focus of the second fixed reflecting surface 85. The first reflecting surface 84 is divided into two elements, a first element 84a, e.g., left element 84a, and a second element 84b, e.g., right element 84b, along a vertical cross-section passing through the optical axis X of the vehicle light 80. The first element 84a of the first reflecting surface 84 is located to cover the first aperture 83a and the third aperture 83c in its fully inserted position. The second element 84b of the first reflecting surface 84 is located to cover the second aperture 83b and the fourth aperture 83d in its fully inserted position. The first element 84a, and the second element 84b are disposed allowing separate rotational movements around a longitudinal axis of the first reflecting surface 84.

Figure 29:
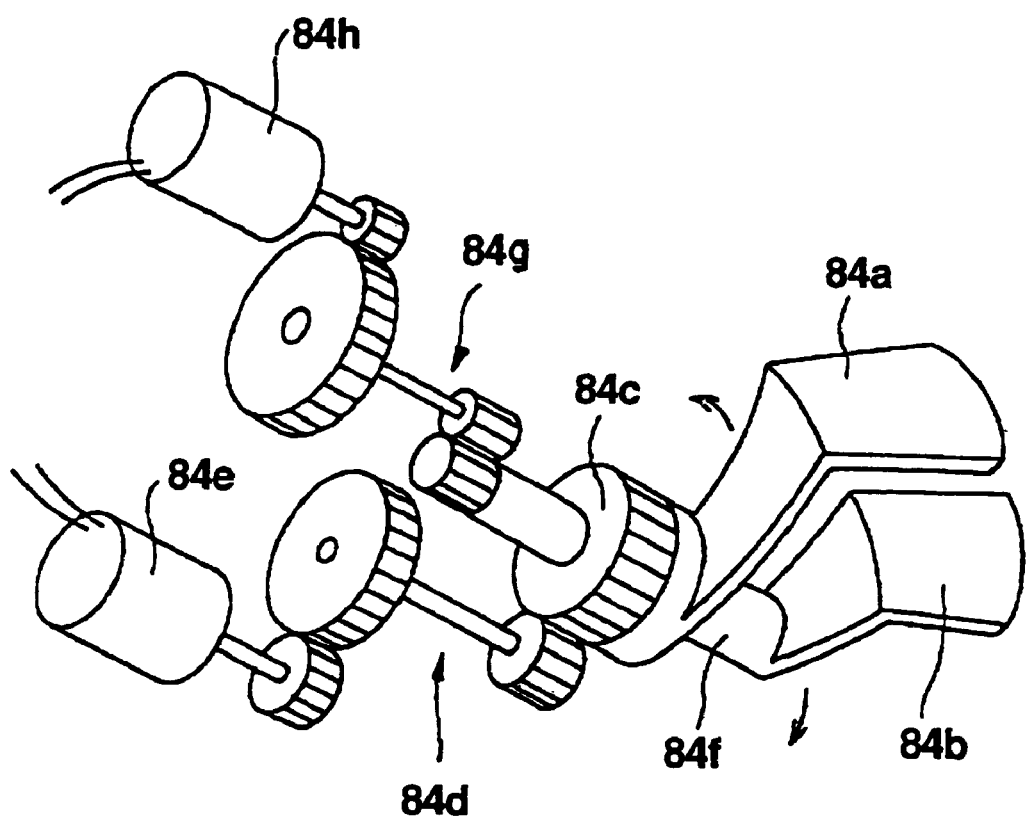
FIG. 29 illustrates a schematic perspective view of a driving mechanism of a movable reflecting surface or a movable reflecting surface element(s) of the vehicle light according to the sixth preferred embodiment of the present invention.

FIG. 29 illustrates a driving mechanism of the first element 84a and the second element 84b. A basic structure of the driving mechanism in FIG. 29 is similar to that of FIG. 4(A)–(B). The driving mechanism in FIG. 29 includes a first rotational axis 84c, a first reduction gear 84d, a first motor 84e, a second rotational axis 84f, a second reduction gear 84g, and a second motor 84h. The first rotational axis 84c and the second rotational axis 84f are located on the longitudinal axis of the first reflecting surface 84. Electrical power supplied to the first motor 84e is transformed to mechanical power and transmitted through the first reduction gear 84d to the first rotational axis 84c. The first element 84a is rotated around the first rotational axis 84c in accordance with rotation of the first rotational axis 84c such that the first element 84a is laterally moved to take a predetermined position between its fully inserted position which covers the first aperture 83a and the third aperture 83c and its removed position which releases the first aperture 83a and the third aperture 83c. Electrical power supplied to the second motor 84h is transformed to mechanical power and transmitted through the second reduction gear 84g to the second rotational axis 84f. The second element 84b is rotated around the second rotational axis 84f in accordance with rotation of the second rotational axis 84f such that the second element 84b is laterally moved to take a predetermined position between its fully inserted position which covers the second aperture 83b and the fourth aperture 83d and its removed position which releases the second aperture 83b and the fourth aperture 83d.

The first motor 84e and the second motor 84h can be preferably driven corresponding to a traveling direction of a vehicle based on a detected steering angle and/or information on road conditions obtained by a car navigation system. For example, in a case that the vehicle drives at a middle speed, e.g. in a range between more than 40 km/h and equal to or smaller than 80 km/h, when the vehicle travels to the left, the right element 84b solely moves to the right in a rotating manner, while the left element 84a remains in its fully inserted position. When the vehicle travels to the right, the left element 84a solely moves to the left in a rotating manner, while the right element 84b remains in its fully inserted position. Further, in case that the vehicle drives at a low speed, e.g. in a range equal to or smaller than 40 km/h, the first element 84a and the second element 84b may be respectively located in their fully inserted position. In a case that the vehicle drives at a high speed, e.g. in a range larger than 80 km/h, the first element 84a and the second element 84b may be respectively located in their removed positions.

Figure 28:
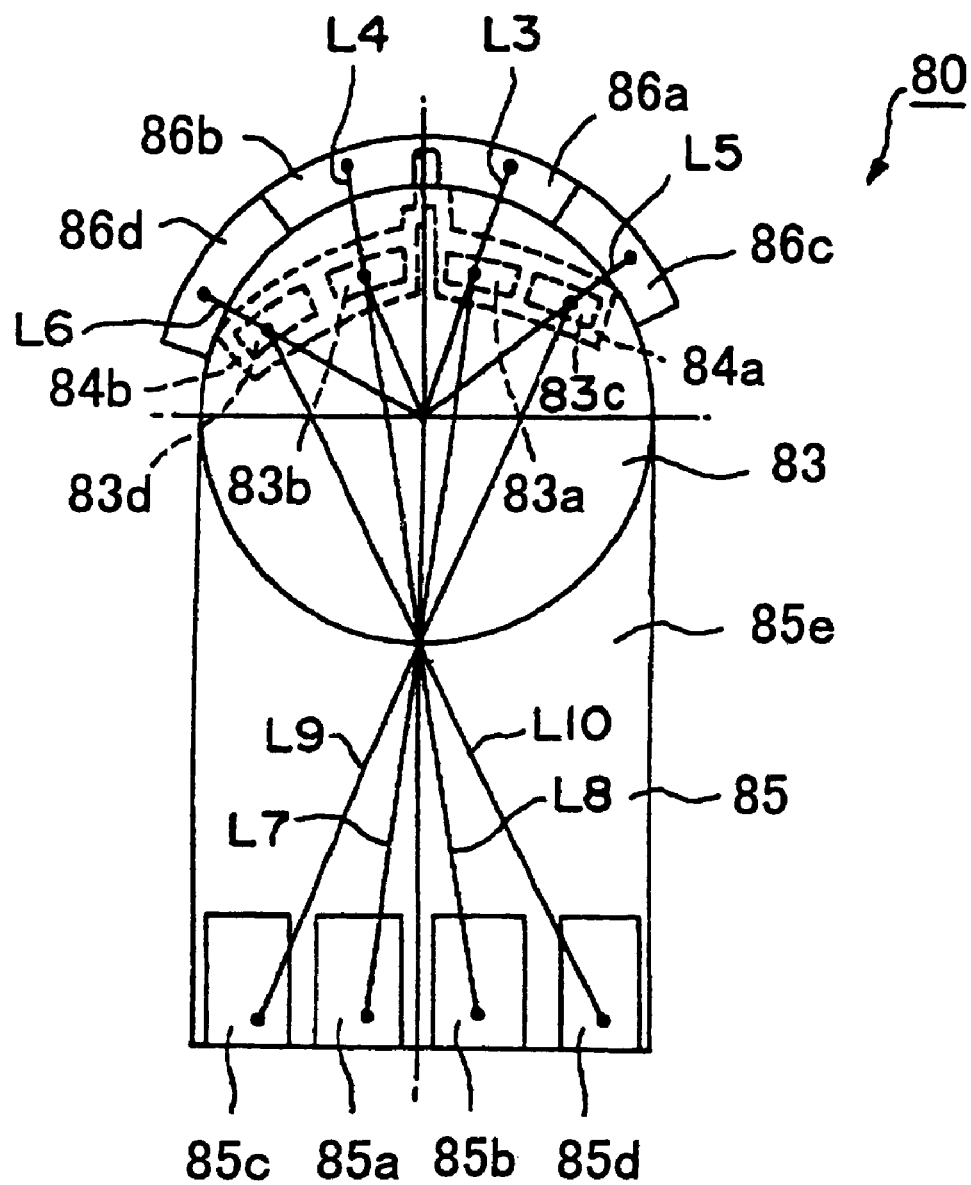
FIG. 28 illustrates a front diagrammatic view showing essential parts of the vehicle light according to the sixth preferred embodiment of the present invention.

The second fixed reflecting surface 85, e.g., the second reflecting surface elements 85a, 85b and the fourth reflecting surface elements 85c, 85d, can be a parabolic group reflecting surface which is concave when viewed in a direction facing to the forward of the vehicle light 80, having a focus in the vicinity of the second focus of the first fixed reflecting surface 83. As shown by FIG. 28, when the first reflecting surface elements 84a and 84b are located in their respective fully inserted positions, light rays incident to the first aperture 83a are reflected by the left element 84a of the first reflecting surface 84 to the second focus of the first reflecting surface 84. Since the second focus of the first reflecting surface 84 is also a focus of the second fixed reflecting surface 85, the light rays travel to, and are further reflected by, the corresponding second reflecting surface element 85a.

Similarly, light rays incident to the second aperture 83*b* are reflected by the right element 84*b* of the first reflecting surface 84 and further by the corresponding second reflecting surface element 85*b*. Light rays incident to the third aperture 83*c* are reflected by the left element 84*a* of the first reflecting surface 84 and further by the corresponding fourth reflecting surface element 85*c*. Light rays incident to the fourth aperture 83*d* are reflected by the right element 84*b* of the first reflecting surface 84 and further by the corresponding fourth reflecting surface element 85*d*.

The fourth reflecting surface element 85*c* located at a right side of the optical axis X of the vehicle light 80 reflects light rays from the third aperture 83*c* and the left element 84*a* to a left front area of the vehicle light 80 in a concentrated manner. Optical axis direction of the fourth reflecting surface element 85*c* is preferably inclined inward relative to the optical axis X of the vehicle light 80. The fourth reflecting surface element 85*d* located at a left side of the optical axis X of the vehicle light 80 reflects light rays from the fourth aperture 83*d* and the right element 84*b* to a right front area of the vehicle light 80 in a concentrated manner. Optical axis direction of the fourth reflecting surface element 85*d* is preferably inclined inward relative to the optical axis X of the vehicle light 80.

The third fixed reflecting surface 86, e.g., the third reflecting surface elements 86*a*, 86*b* and the fifth reflecting surface elements 86*c*, 86*d*, is an ellipse group reflecting surface having a first focus in the vicinity of the light emitting portion of the light bulb 81, and a second focus at a predetermined position between the light bulb 81 and the projection lens 88 on the optical axis X of the vehicle light 80. The second focus of the third fixed reflecting surface 86 is preferably located in the vicinity of the focus of the projection lens 88. When the left element 84*a* of the first reflecting surface 84 is located in its removed position, light rays that have passed through the first aperture 83*a* are incident on the corresponding third reflecting surface element 86*a*, and light rays that have passed through the third aperture 83*c* are incident on the corresponding fifth reflecting surface 86*c*. When the right element 84*b* of the first reflecting surface 84 is located in its removed position, light rays that have passed through the second aperture 83*b* are incident on the corresponding third reflecting surface element 86*b*, and light rays that have passed through the fourth aperture 83*d* are incident on the corresponding fifth reflecting surface 86*d*.

The projection lens 88 is a convex lens located on the optical axis X of the vehicle light 80. The optical axis X passes through the light emitting portion and extends to the front of light bulb 81. Light rays directly come from the light bulb 81 or being reflected by the major reflecting surface 82 pass through the center aperture 83*e* of the first fixed reflecting surface 83. Light rays that have passed through the center aperture 83*e* are incident to the projection lens 88. When passing through the projection lens 88, the light rays are converged by the projection lens 88 by a predetermined degree, and illuminate a predetermined area in front of the vehicle light 80.

The shutter 89 has a similar structure to the shutters 54 and 69 in the fourth and fifth preferred embodiments of the present invention. The shutter 89 is made of a shading material. The shutter 89 is located at a predetermined position between the light bulb 81 and the projection lent 88, for prohibiting an unnecessary portion of image of light rays constituted by light rays directly come from the light bulb 81 and being reflected by the major reflecting surface 82 on formation of a light distribution pattern. The shutter 89 forms a cut-off portion of the light distribution pattern to adjust light distribution characteristics of light rays projected by the projection lens 88.

The shutter 89 can include a fixed portion 90 and a movable portion 91. As shown by FIG. 26, the fixed portion 90 is a substantially cylindrical surface with a center on a vertical axis 91*a*. The fixed portion 90 is concave when viewed in a direction facing to the projection lens 88, and located in the vicinity of the focus of the projection lens 88. The movable portion 91 is located inside the fixed portion 90, and is a substantially cylindrical surface with a center on the vertical axis 91*a*. The movable portion 91 is concave when viewed in a direction facing to the projection lens 88. The movable portion 91 can be rotated around the vertical axis 91*a* by a driving mechanism, not shown. The driving mechanism can be controlled depending on a traveling direction of the vehicle based on a detected steering angle and/or information on road conditions obtained by a car navigation system. The fixed portion 90 and the movable portion 91 can be an aspherical surface.

The fixed portion 90 and the movable portion 91 of the shutter 89 respectively have an appropriate shape for formation of a predetermined cut-off portion of the light distribution pattern. The cut-off portion of the light distribution pattern can be varied in accordance with lateral movement of the movable portion 91 of the shutter 89 corresponding to a traveling direction of the vehicle. By lateral movement of the movable portion 91, a predetermined illuminated area at the side of traveling direction of the vehicle relative to the vertical axis on the screen, which is slightly under the horizontal axis on the screen, can be adjusted such that an illuminated distance at the side of the traveling direction of the vehicle can be increased or decreased.

Figure 30:
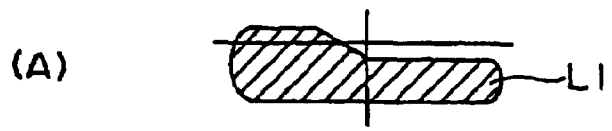
FIG. 30(A) illustrates a fixed light distribution pattern element L1 formed by light rays that have passed through a projection lens located on the optical axis of the vehicle light according to the sixth preferred embodiment of the present invention.
FIG. 30(B) illustrates a fixed light distribution pattern element L2 formed by light rays reflected by first and second fixed reflecting surfaces of the vehicle light according to the sixth preferred embodiment of the present invention.
Figure 30:
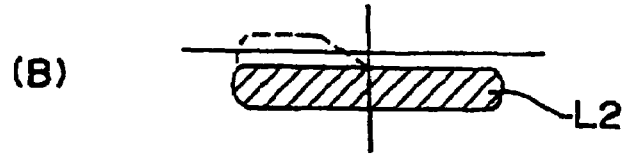

Light is emitted from the light bulb 81 by electric power supplied to the socket 81*a*. Among light rays emitted from the light bulb 81, light rays L1 directly come from the light bulb 81 or reflected by the major reflecting surface 82 pass through the center aperture 83*e* of the first fixed reflecting surface 83. A portion of light rays L1 is prohibited by the shutter 89, and then incident to the projection lens 88. When passing through the projection lens 88, the light rays L1 are refracted in a converging manner by a predetermined degree. Light rays L1 that have passed through the projection lens 88 illuminate a predetermined area in front of the vehicle light 80 to form a light distribution pattern element L1 as shown by FIG. 30(A). The light distribution pattern element L1 has a rather smaller illuminated distance at the side of oncoming lane. The light distribution pattern element L1 is a fixed element at any time of operation of the vehicle light 80.

Light rays emitted from the light bulb 81 and reflected by the first fixed reflecting surface 83 are directed to a predetermined portion 85*e* of the second fixed reflecting surface 85 except the second and fourth reflecting surface elements 85*a*, 85*b*, 85*c*, 85*d*. The predetermined portion 85*e* of the second fixed reflecting surface 85 reflects the light rays in a converging manner by a predetermined degree to illuminate a predetermined front area in a rather downward direction such that a light distribution pattern element L2 is formed on a screen as shown in FIG. 30(B). The light distribution pattern element L2 is also a fixed light distribution pattern element at any time of operation of the vehicle light 80.

Figure 31:
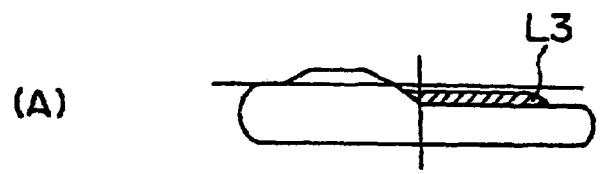
FIG. 31(A) illustrates a variable light distribution pattern element L3 formed by light rays reflected by a first element of a third reflecting surface of the vehicle light according to the sixth preferred embodiment of the present invention.
FIG. 31(B) illustrates a variable light distribution pattern element L4 formed by light rays reflected by a second element of a fourth reflecting surface of the vehicle light according to the sixth preferred embodiment of the present invention.
FIG. 31(C) illustrates a variable light distribution pattern element L5 formed by light rays reflected by a first element of a fifth reflecting surface of the vehicle light according to the sixth preferred embodiment of the present invention.
FIG. 31(D) illustrates a variable light distribution pattern element L6 formed by light rays reflected by a second element of the fifth reflecting surface of the vehicle light according to the sixth preferred embodiment of the present invention.
Figure 31:
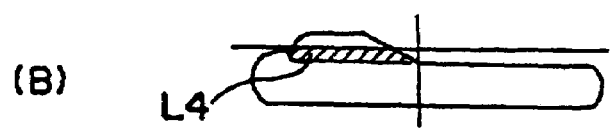
Figure 31:
Figure 31:

When the left element 84*a* of the first reflecting surface 84 is located at a position to release the first aperture 83*a* and the movable portion 91 of the shutter 89 is located in its removed position relative to the light passageway from the center aperture 83*e* to the projection lens 88, light rays L3 that have passed through the first aperture 83*a* are incident to the corresponding third reflecting surface element 86*a*. The third reflecting surface element 86*a* reflects the light rays L3 to the vicinity of the focus of the projection lens 88. Light rays L3 incident from the third reflecting surface element 86*a* to the projection lens 88 are refracted in a converging manner by a predetermined degree when passing through the projection lens 88. After passing through the projection lens 88, the light rays further travel to the forward, then illuminate a predetermined front area slightly under the horizontal axis on the screen to form a light distribution pattern element L3 as shown by FIG. 31(A). The light distribution pattern element L3 illuminates an area from the center to the right side of the vertical axis on the screen.

When the right element 84*b* of the first reflecting surface 84 is located at a position to release the second aperture 83*b* and the movable portion 91 of the shutter 89 is located in its fully inserted position relative to the light passageway from the center aperture 83*e* to the projection lens 88, light rays L4 that have passed through the second aperture 83*b* are incident to the corresponding third reflecting surface element 86*b*. The third reflecting surface element 86*b* reflects the light rays L4 to the vicinity of the focus of the projection lens 88. Light rays L4 incident from the third reflecting surface element 86*b* to the projection lens 88 are refracted in a converging manner by a predetermined degree when passing through the projection lens 88. After passing through the projection lens 88, the light rays further travel to the forward, then illuminate a predetermined front area under the horizontal axis on the screen to form a light distribution pattern element L4 as shown by FIG. 31(B). The light distribution pattern element L4 illuminates an area from the center to the left of the vertical axis on the screen.

On the other hand, when the left element 84*b* of the first reflecting surface 84 is located at a position to release the third aperture 83*c*, light rays L5 that have passed through the third aperture 83*c* are incident to the corresponding fifth reflecting surface element 86*c*. The fifth reflecting surface element 86*c* reflects the light rays L5 to the vicinity of the focus of the projection lens 88. Light rays L5 incident from the fifth reflecting surface element 86*c* to the projection lens 88 are refracted in a converging manner by a predetermined degree when passing through the projection lens 88. After passing through the projection lens 88, the light rays illuminate a predetermined center front area under the horizontal axis on the screen to form a light distribution pattern element L5 as shown by FIG. 31(C). Alternatively, radius of curvature of the fifth reflecting surface element 86*c* can be adjusted such that a center of the width of the light distribution pattern element L5 is located at slightly right side of the vertical axis on the screen.

When the right element 84*a* of the first reflecting surface 84 is located at a position to release the fourth aperture 83*d*, light rays L6 that have passed through the fourth aperture 83*d* are incident to the corresponding fifth reflecting surface element 86*d*. The fifth reflecting surface element 86*d* reflects the light rays L6 to the vicinity of the focus of the projection lens 88. Light rays L6 incident from the fifth reflecting surface element 86*d* to the projection lens 88 are refracted in a converging manner by a predetermined degree when passing through the projection lens 88. After passing through the projection lens 88, the light rays illuminate a predetermined center front area under the horizontal axis on the screen to form a light distribution pattern element L6 as shown by FIG. 31(D). Alternatively, radius of curvature of the fifth reflecting surface element 86*d* can be adjusted such that a center of the width of the light distribution pattern element L6 is located at slightly left side of the vertical axis on the screen.

Figure 32:
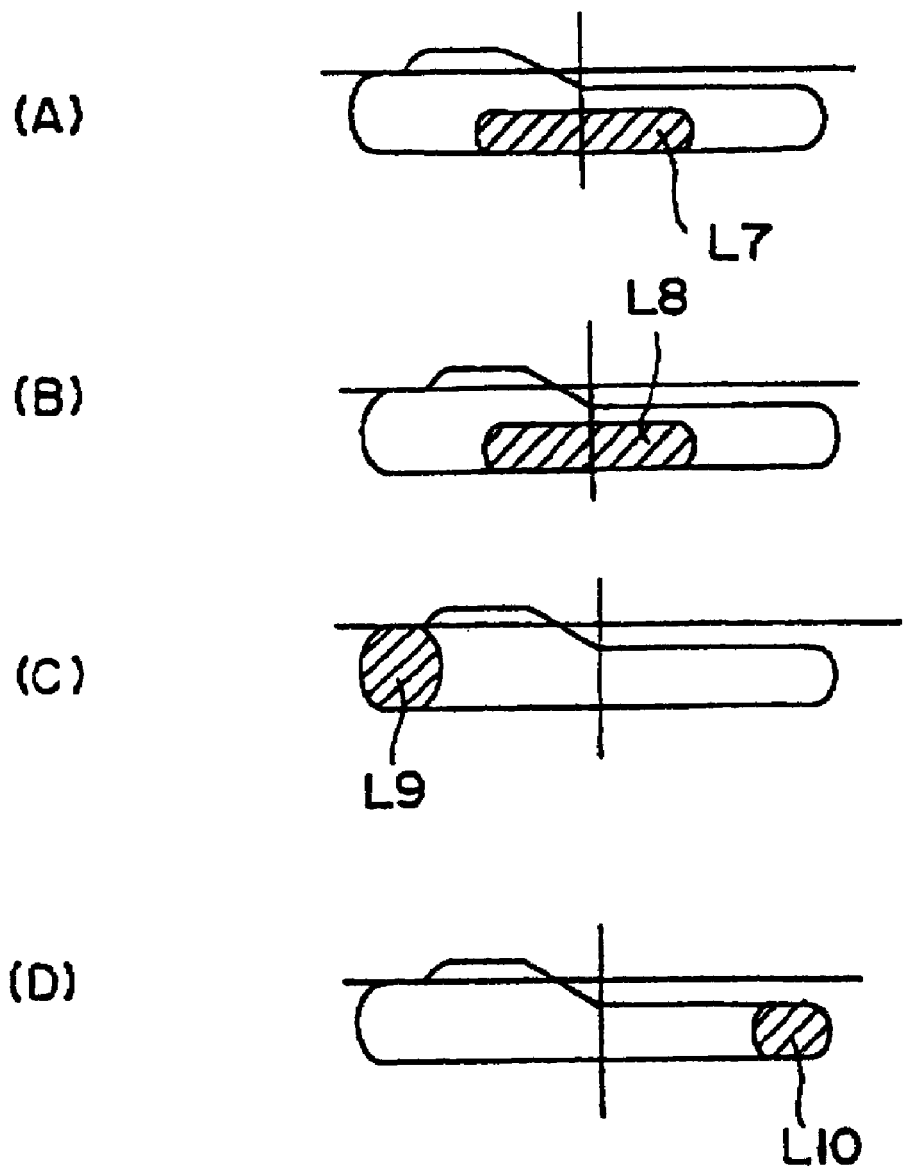
FIG. 32(A) illustrates a variable light distribution pattern element L7 formed by light rays reflected by a first element of a second reflecting surface of the vehicle light according to the sixth preferred embodiment of the present invention.
FIG. 32(B) illustrates a variable light distribution pattern element L8 formed by light rays reflected by a second element of a second reflecting surface of the vehicle light according to the sixth preferred embodiment of the present invention.
FIG. 32(C) illustrates a variable light distribution pattern element L9 formed by light rays reflected by a first element of a fourth reflecting surface of the vehicle light according to the sixth preferred embodiment of the present invention.
FIG. 32(D) illustrates a variable light distribution pattern element L10 formed by light rays reflected by a second element of the fourth reflecting surface of the vehicle light according to the sixth preferred embodiment of the present invention.

When the left element 84*a* of the first reflecting surface 84 is located in its fully inserted position to completely cover the first aperture 83*a*, light rays L7 incident to the first aperture 83*a* are reflected by the left element 84*a*, and travel to the corresponding second reflecting surface element 85*a*. The second reflecting surface element 85*a* reflects the light rays L7 to illuminate a predetermined front downward area under the horizontal axis on the screen to form the light distribution pattern element L7 as shown in FIG. 32(A). The light distribution pattern element L7 illuminates a rather wide downward area under the horizontal axis on the screen. In FIG. 32(A), a center of the width of the light distribution pattern element L7 is located at slightly left side of the vertical axis on the screen. However, the light distribution pattern element L7 can be located at any portion of the light distribution pattern element L2 by adjusting radius of curvature of the second reflecting surface element 85*a*. For example, a center of the width of the light distribution pattern element L7 in FIG. 32(A) can be located on the vertical axis on the screen. Further, the light distribution pattern element L7 can be located at substantially the same area as the light distribution pattern element L2.

When the right element 84*b* of the first reflecting surface 84 is located in its fully inserted position to completely cover the second aperture 83*b*, light rays L8 incident to the second aperture 83*b* are reflected by the right element 84*b*, and travel to the corresponding second reflecting surface element 85*b*. The second reflecting surface element 85*b* reflects the light rays L8 to illuminate a predetermined front downward area under the horizontal axis on the screen to form the light distribution pattern element L8 as shown in FIG. 32(B). The light distribution pattern element L8 illuminates a rather wide downward area under the horizontal axis on the screen. In FIG. 32(B), a center of the width of the light distribution pattern element L8 is located at slightly right side of the vertical axis on the screen. However, the light distribution pattern element L8 can be located at any portion of the light distribution pattern element L2 by adjusting radius of curvature of the second reflecting surface element 85*b*. For example, a center of the width of the light distribution pattern element L8 in FIG. 32(B) can be located on the vertical axis on the screen. Further, the light distribution pattern element L8 can be located substantially the same area as the light distribution pattern element L2.

When the left element 84*a* of the first reflecting surface 84 is located in its inserted position to cover the third aperture 83*c*, light rays L9 incident to the third aperture 83*c* are reflected by the left element 84*a*, and travel to the corresponding fourth reflecting surface element 85*c*. The fourth reflecting surface element 85*c* reflects the light rays L9 to illuminate a predetermined side front area, i.e., a left side front area, under the horizontal axis on the screen to form the light distribution pattern element L9 as shown in FIG. 32(C). Since optical axis direction of the parabolic group fourth reflecting surface element 85*c* is inclined to inward relative to the optical axis X of the vehicle light 80, light rays reflected by the fourth reflecting surface element 85*c* can illuminate the left side front area of the vehicle light 80.

When the right element 84*b* of the first reflecting surface 84 is located in its inserted position to cover the fourth aperture 83*d*, light rays L10 incident to the fourth aperture 83*d* are reflected by the right element 84*b*, and travel to the corresponding fourth reflecting surface element 85*d*. The fourth reflecting surface element 85*d* reflects the light rays L10 to illuminate a predetermined side front area, i.e., a right side front area, at a predetermined distance under the horizontal axis on the screen to form the light distribution pattern element L10 as shown in FIG. 32(D). Since optical axis direction of the parabolic group fourth reflecting surface element 85d is inclined to inward relative to the optical axis X of the vehicle light 80, light rays reflected by the fourth reflecting surface element 85d can illuminate the right side front area of the vehicle light 80.

Figure 33:
FIG. 33(A) illustrates the location of first reflecting surface elements relative to window portions located around an upper edge of the first fixed reflecting surface when the vehicle drives at a low or middle speed on a straight road, according to the sixth preferred embodiment of the present invention.
FIG. 33(B) illustrates a light distribution pattern for a vehicle light on a screen when the vehicle drives at a low or middle speed on a straight road, according to the sixth preferred embodiment of the present invention.
Figure 33:
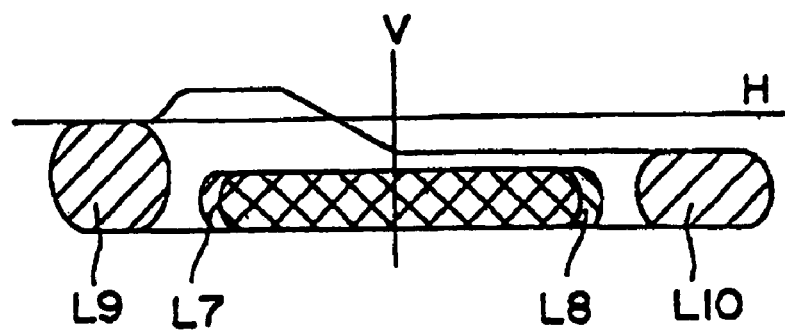

Preferred operation of the vehicle light 80 will now be described. In the case when the vehicle drives at a low speed, and in the case when the vehicle drives at a middle speed on a straight road, both the left element 84a and the right element 84b of the first reflecting surface 84 are located in their fully inserted positions as shown in FIG. 33(A). Light rays emitted from the light bulb 81 to the first through fourth apertures 83a, 83b, 83c, 83d are reflected by either the left element 84a or the right element 84b and corresponding second or fourth reflecting surface elements 85a, 85b, 85c, 85d, then form light distribution pattern elements L7, L8, L9, L10. In an illuminated area by the light distribution pattern element L1, which forms an entire shape of the light distribution pattern, the light distribution pattern elements L7, L8 are located to increase illuminance especially at a lower portion under the center area of the light distribution pattern, and the light distribution pattern elements L9, L10 are located to increase light intensity especially at either side portion of the light distribution pattern.

Figure 34:
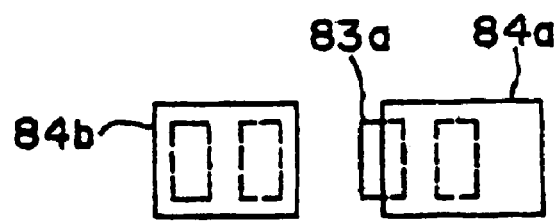
FIG. 34(A) illustrates the locations of the first reflecting surface elements relative to window portions located around the upper edge of the first fixed reflecting surface when the vehicle drives at a middle speed on a curve to the right with a large radius of curvature, according to the sixth preferred embodiment of the present invention.
FIG. 34(B) illustrates a light distribution pattern on a screen for a vehicle light when the vehicle drives at a middle speed on a large radius curve to the right, according to the sixth preferred embodiment of the present invention.
Figure 34:
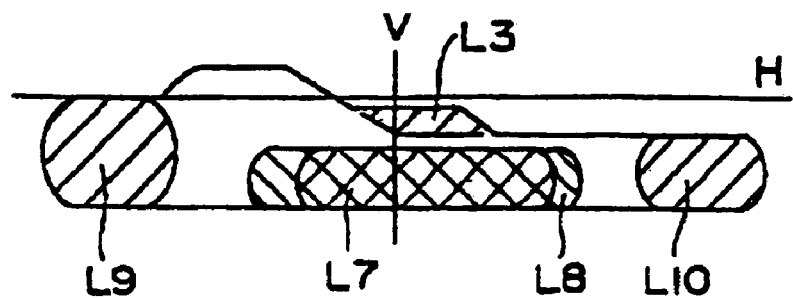

In the case when the vehicle drives on a curve to the right with a large radius of curvature, the driver slightly steers to the right, then based on the steering angle and/or information on road condition obtained by a car navigation system, the left element 84a of the first reflecting surface 84 is moved to the left in a rotating manner by operation of the first motor 84e corresponding to the traveling direction of the vehicle, thereby the first aperture 83a is released at least partly as shown by FIG. 34(A). At this time, the movable portion 91 of the shutter 89 is also moved laterally to the left. Accordingly, a cut-off line of the light distribution pattern is varied such that, at the right side of the vertical axis on the screen, a portion of the cut-off line is lifted to a location slightly under the horizontal axis on the screen. The width of the increased illuminated area, i.e., horizontal angle of the light distribution pattern element L3 can be varied depending on a moved distance of the movable portion 91 of the shutter 89. Among light rays incident to the first aperture 83a, a portion of light rays which passed through the first aperture 83a and reflected by the third reflecting surface element 86a are then incident to the projection lens 88, and illuminate the vicinity of the increased illuminated area of the light distribution pattern, i.e., the light distribution pattern element L3, in a concentrated manner. The other portion of light rays incident to the first aperture 83a which are reflected by the left element 84a remains to be the light distribution pattern element L7. The light distribution pattern when the vehicle slightly steers to the right is shown in FIG. 34(B). The light distribution pattern in FIG. 34(B) provides an appropriately increased illuminated distance on the right side of the vertical axis on the screen due to the variable light distribution pattern element L3. Thereby, visibility to the traveling direction of the vehicle is improved.

Figure 35:
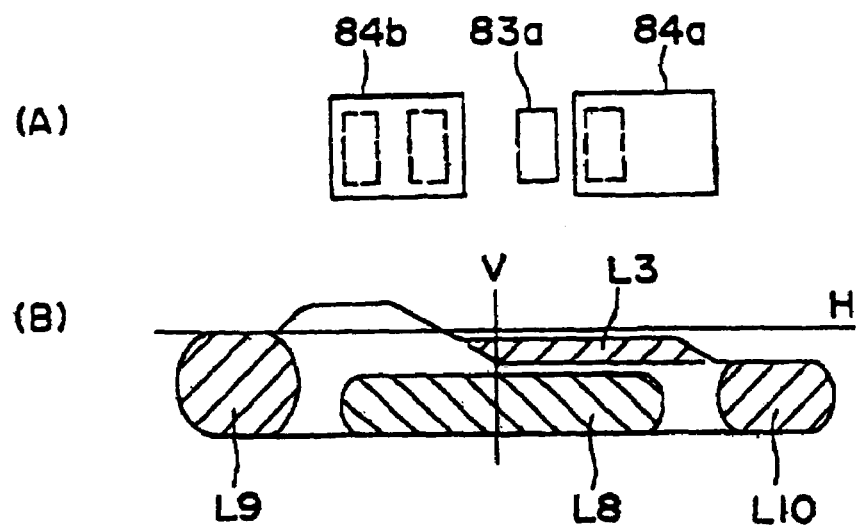
FIG. 35(A) illustrates locations of the first reflecting surface elements relative to window portions around the upper edge of the first fixed reflecting surface when the vehicle drives at a middle speed on a small radius curve to the right, according to the sixth preferred embodiment of the present invention.
FIG. 35(B) illustrates a light distribution pattern on a screen for a vehicle light when the vehicle drives at a middle speed on a small radius curve to the right, according to the sixth preferred embodiment of the present invention.

In the case when the vehicle drives on a curve to the right with a small radius of curvature, the driver greatly steers to the right, then based on the steering angle and/or information on road condition obtained by a car navigation system, the left element 84a of the first reflecting surface 84 is moved to the left in a rotating manner by operation of the first motor 84e corresponding to the traveling direction of the vehicle, thereby most portion of the first aperture 83a is released, or is fully released as shown by FIG. 35(A). At this time, the movable portion 91 of the shutter 89 is also moved laterally to the left by a large horizontal angle. Accordingly, a cut-off line of the light distribution pattern is varied such that, at the right side of the vertical axis on the screen, a relatively large portion of the cut-off line is lifted to a location slightly under the horizontal axis on the screen. The width of the increased illuminated area, i.e., horizontal angle of the light distribution pattern element L3 can be varied depending on a moved distance of the movable portion 91 of the shutter 89. When the movable portion 91 of the shutter 89 is located in its partially inserted position, in which a removed distance of the movable portion 91 is larger than the length of a portion of an upper edge of the fixed portion 90 covered by the movable portion 91, and the first aperture 83a is fully released, substantially all light rays L3 which passed through the first aperture 83a and reflected by the third reflecting surface element 86a are then incident to the projection lens 88. Such light rays L3 illuminate the vicinity of the increased illuminated area of the light distribution pattern, i.e., the light distribution pattern element L3 with a relatively large width, in a concentrated manner. The light distribution pattern when the vehicle steers to the right by a relatively large horizontal angle is shown in FIG. 35(B). The light distribution pattern in FIG. 35(B) provides an appropriately increased illuminated distance at the right side of the vertical axis on the screen due to the variable light distribution pattern element L3. Thereby, visibility to the traveling direction of the vehicle is improved. In case that the fifth reflecting surface element 86c is not incorporated in the vehicle light 80, the light distribution pattern element L3 in FIG. 35(B) has its maximum width.

Figure 36:
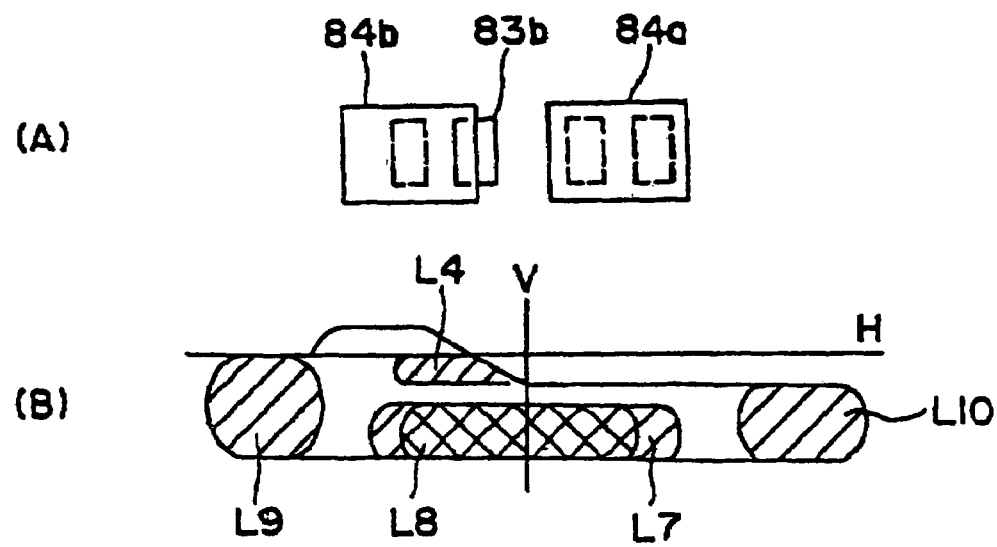
FIG. 36(A) illustrates locations of the first reflecting surface elements relative to window portions around the upper edge of the first fixed reflecting surface when the vehicle drives at a middle speed on a large radius curve to the left, according to the sixth preferred embodiment of the present invention.
FIG. 36(B) illustrates a light distribution pattern on a screen for a vehicle light when the vehicle drives at a middle speed on a large radius curve to the left, according to the sixth preferred embodiment of the present invention.

In the case when the vehicle drives on a curve to the left with a large radius of curvature, the driver slightly steers to the left, then based on the steering angle and/or information on road condition obtained by a car navigation system, the right element 84b of the first reflecting surface 84 is moved to the right in a rotating manner by operation of the second motor 84h corresponding to the traveling direction of the vehicle, thereby the second aperture 83b is released at least partly as shown by FIG. 36(A). At this time, the movable portion 91 of the shutter 89 is remained in its fully inserted position, because it is not required to change a cut-off portion of the light distribution pattern at the left side of the vertical axis on the screen. Among light rays incident to the second aperture 83b, a portion of light rays which passed through the second aperture 83b and reflected by the third reflecting surface element 86b are then incident to the projection lens 88, and illuminate a predetermined area at the left side of the vertical axis on the screen under the horizontal axis in a concentrated manner to form a light distribution pattern element L4. The other portion of light rays incident to the second aperture 83b which are reflected by the right element 84b remains to be the light distribution pattern element L8. The light distribution pattern when the vehicle slightly steers to the left is shown in FIG. 36(B). The light distribution pattern in FIG. 36(B) provides a predetermined area having an appropriately increased light intensity at the left side of the vertical axis on the screen due to the variable light distribution pattern element L4. Thereby, visibility to the traveling direction of the vehicle is improved. The width of the increased light intensity area, i.e., horizontal angle of the light distribution pattern element L8 can be varied depending on a moved distance of the right element 84b relative to the second aperture 83b.

Figure 37:
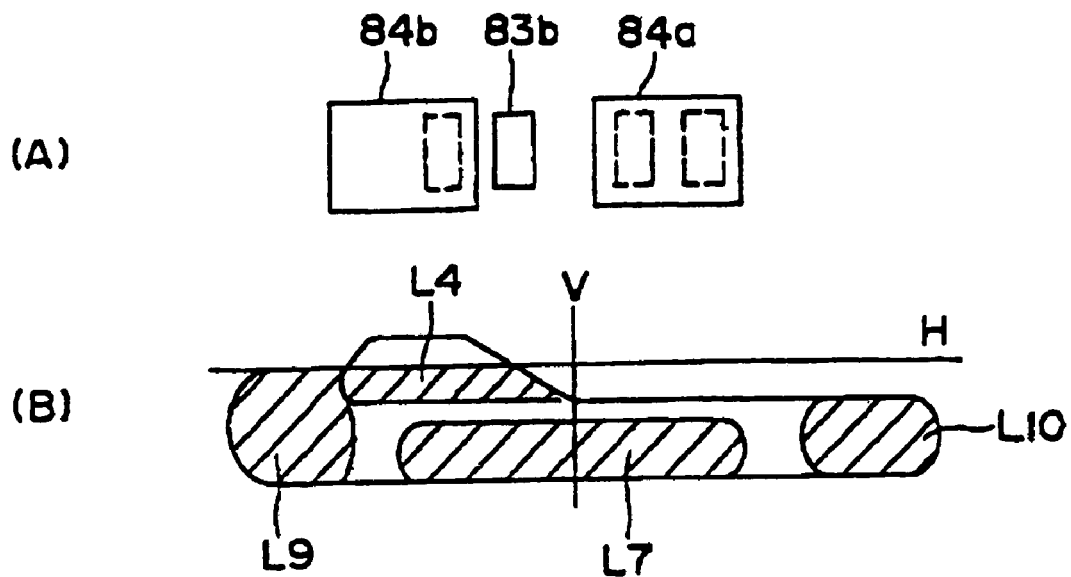
FIG. 37(A) illustrates locations of the first reflecting surface elements relative to window portions around the upper edge of the first fixed reflecting surface when the vehicle drives at a middle speed on a small radius curve to the left, according to the sixth preferred embodiment of the present invention.
FIG. 37(B) illustrates a light distribution pattern on a screen for a vehicle light when the vehicle drives at a middle speed on the curve to the left with the small radius of curvature, according to the sixth preferred embodiment of the present invention.

In the case when the vehicle drives on a curve to the left with a small radius of curvature, the driver greatly steers to the left, then based on the steering angle and/or information on road condition obtained by a car navigation system, the right element 84*b* of the first reflecting surface 84 is moved to the left in a rotating manner by operation of the second motor 84*h* corresponding to the traveling direction of the vehicle, thereby most portion of the second aperture 83*b* is released, or is fully released as shown by FIG. 37(A). At this time, the movable portion 91 of the shutter 89 is remained in its fully inserted position, because it is not required to form a cut-off portion of the light distribution pattern on the left side of the vertical axis on the screen. The width of the increased light intensity area, i.e., horizontal angle of the light distribution pattern element L4 can be varied depending on a moved distance of the right element 84*b* relative to the second aperture 83*b*. When the second aperture 83*b* is fully released, substantially all light rays L4 which passed through the second aperture 83*b* and reflected by the third reflecting surface element 86*b* are then incident to the projection lens 88. Such light rays L4 illuminate a predetermined area with a relatively large width, in a concentrated manner, having an appropriately increased light intensity at the left side of the vertical axis on the screen due to the variable light distribution pattern element L4. The light distribution pattern when the vehicle steers to the left by a relatively small horizontal angle is shown in FIG. 37(B). The light distribution pattern in FIG. 37(B) provides an appropriately increased illuminated distance at the left side of the vertical axis on the screen due to the variable light distribution pattern element L4. Thereby, visibility to the traveling direction of the vehicle is improved. In case that the fifth reflecting surface element 86*d* is not incorporated in the vehicle light 80, the light distribution pattern element L4 in FIG. 37(B) has its maximum width.

Figure 38:
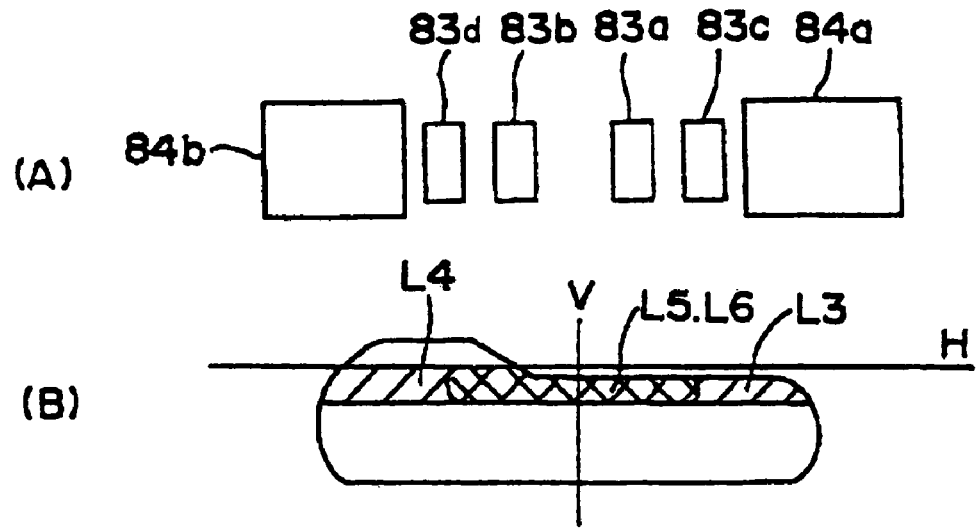
FIG. 38(A) illustrates locations of the first reflecting surface elements relative to window portions around the upper edge of the first fixed reflecting surface when the vehicle drives at a high speed, according to the sixth preferred embodiment of the present invention.
FIG. 38(B) illustrates a light distribution pattern on a screen for a vehicle light when the vehicle drives at the high speed, according to the sixth preferred embodiment of the present invention.

In the case when the vehicle drives at a high speed, both the left element 84*a* and the right element 84*b* are respectively located in their removed positions such that the first through fourth apertures 83*a*, 83*b*, 83*c*, 83*d* are fully released as shown by FIG. 38(A). At this time, the movable portion 91 of the shutter 89 is also moved in a rotating manner by a large horizontal angle to be located in its removed position relative to the light passageway from the center aperture 83*e* to the projection lens 88. Light rays respectively passed through the first to fourth apertures 83*a*, 83*b*, 84*c*, 83*d* are reflected by their respective corresponding third and fifth reflecting surface elements 86*a*, 86*b*, 86*c* or 86*d* toward the projection lens 88. When passing through the projection lens 88, the light rays are converged by a predetermined degree. Since the movable portion 91 of the shutter 89 is located in its removed position, the light distribution pattern of the vehicle light 80 includes light distribution pattern elements L3, L4, L5, L6, which are respectively switched from the light distribution pattern elements L7, L8, L9, L10, as shown by FIG. 38(B). In the light distribution pattern in FIG. 38(B), light intensity is increased in a wide area under the horizontal axis on the screen. Specifically, a center portion of the light distribution pattern in FIG. 38(B) is illuminated with high light intensity. Accordingly, visibility to a far distant front of the vehicle is improved. The light distribution pattern in FIG. 38(B) is appropriate when the vehicle drives at a high speed with a relatively large interval to a car running ahead of the vehicle on the same lane.

When the vehicle light 80 is disposed at either front end of an automobile body, it may happen that a fourth reflecting surface element 85*c* located at an inner side of the automobile body, e.g., in a vehicle light 80 designed to be disposed at the left front end of the vehicle body, a fourth reflecting surface element 85*c*, is not able to sufficiently provide light rays into the predetermined side front direction to form the light distribution pattern element L9 or L10 in such a case that the vehicle light 90 further includes an extension for ornamental purpose. In such a case, the fourth reflecting surface element 85*c* can be designed to reflect light rays to center front direction to form a similar light distribution pattern element L7 or L8. In other words, the space of the fourth reflecting surface element 85*c* can be replaced by another second reflecting surface element. In this structure, when the first reflecting surface 84 or the left element 84*a* and the right element 84*b* is(are) located in its(their) fully inserted position(s), a light distribution pattern of the vehicle light 80 disposed on the left front end of the vehicle body is constituted by light distribution pattern elements L1, L2, L7, L8, and L10. Similarly, in the vehicle light 80 designed for being disposed at a right front end of an automobile body, the fourth reflecting surface element 85*d* can be designed to reflect light rays to a center front direction to form a similar light distribution pattern element L7 or L8, i.e., the space of the fourth reflecting surface element 85*d* can be replaced by another second reflecting surface element. In this structure, when the first reflecting surface 84 or the left element 84*a* and the right element 84*b* is (are) located in its (their) fully inserted position(s), a light distribution pattern of the vehicle light 80 disposed on the right front end of the vehicle body is constituted by light distribution pattern elements L1, L2, L7, L8, and L9.

Figure 39:
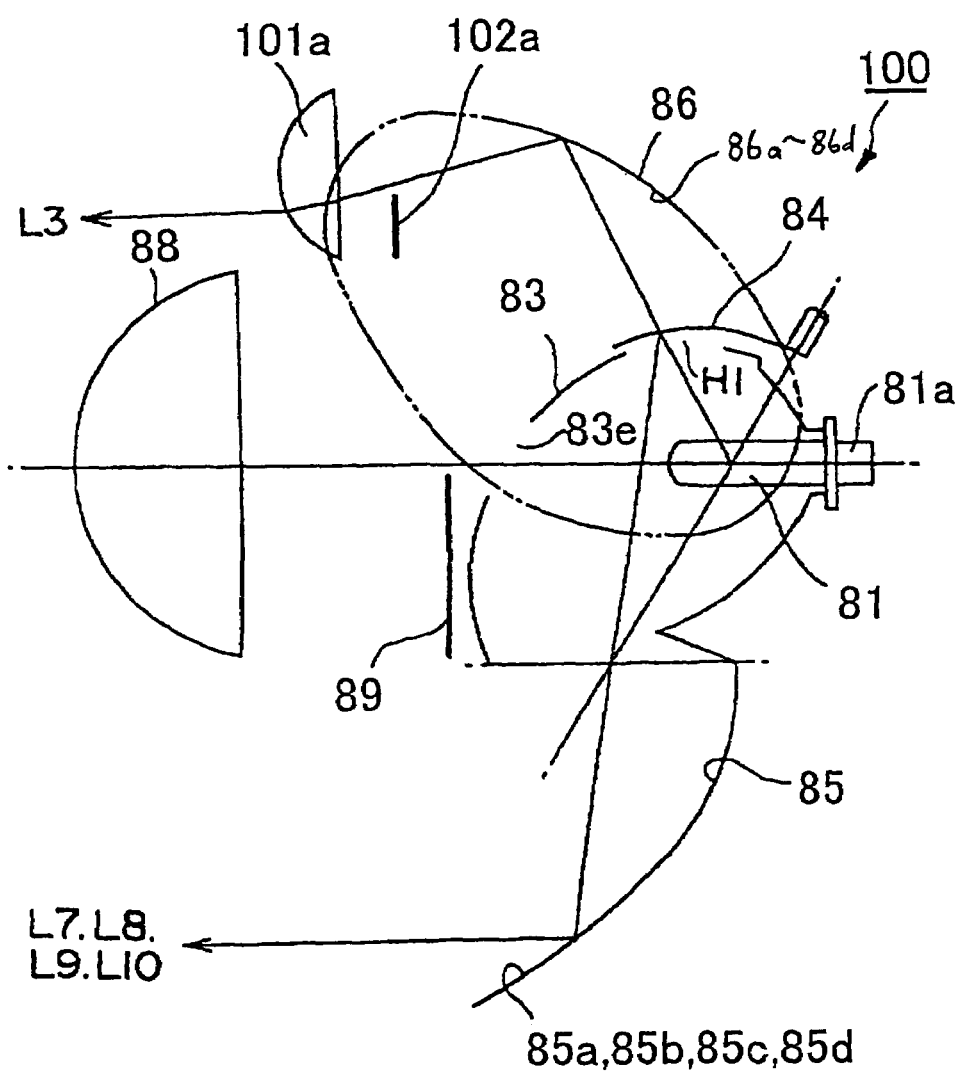
FIG. 39 illustrates a schematic cross-sectional view along an optical axis X of a vehicle light according to a seventh preferred embodiment of the present invention.
Figure 40:
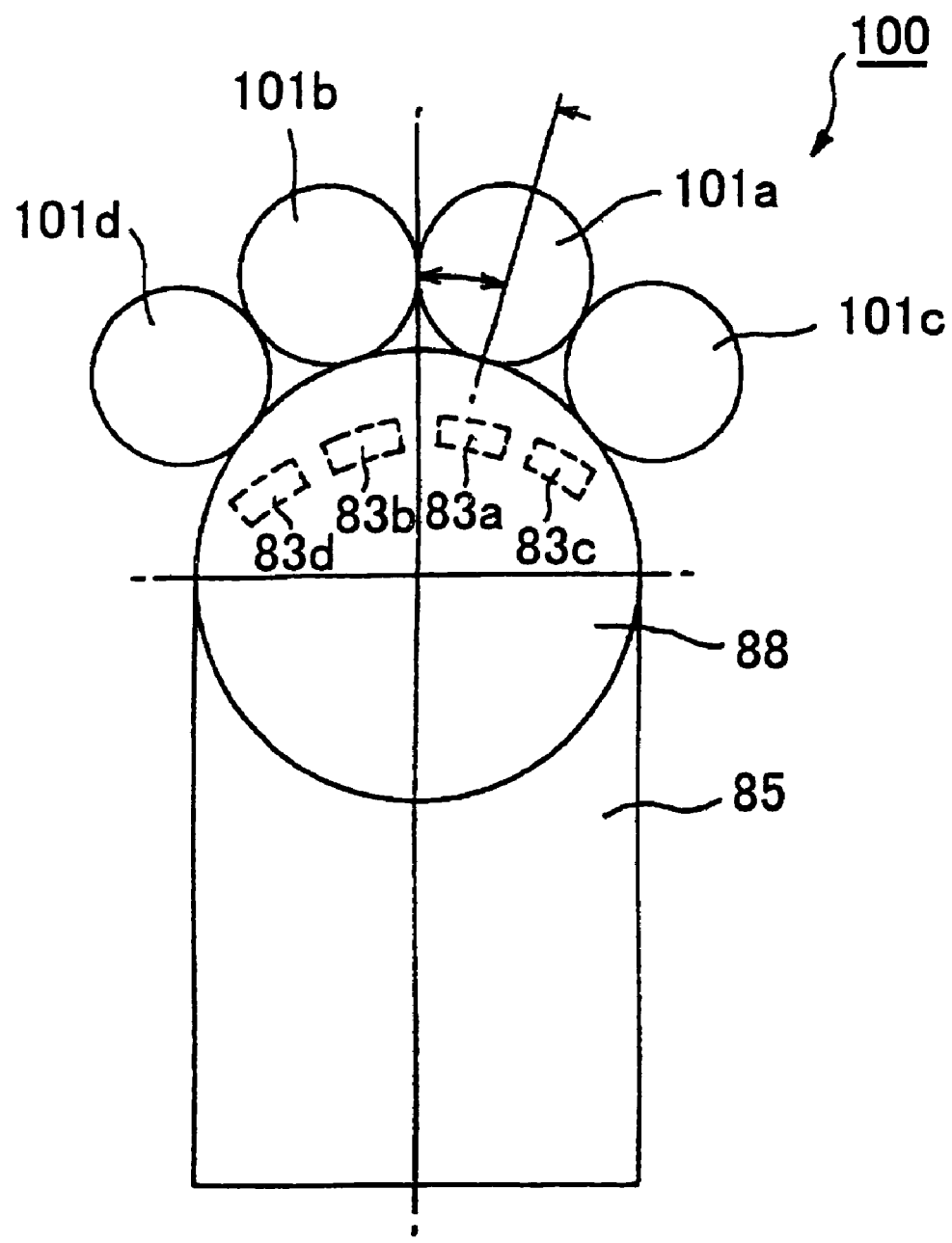
FIG. 40 illustrates a schematic front view of the vehicle light according to the seventh preferred embodiment of the present invention.

FIGS. 39–40 schematically illustrate an essential part of a vehicle light 100 according to a seventh preferred embodiment of the present invention. The vehicle light 100 is also an automobile headlight and has a similar structure to the vehicle light 80. The same numerals are used in FIGS. 39–40 for the same parts as in the vehicle light 80. Detailed descriptions regarding the same parts as in the vehicle light 80 are therefore omitted. In FIG. 39, a movable portion 91 of the shutter 89 is not shown.

The vehicle light 100 can include a first fixed reflecting surface 83 with a center aperture 83*e*, a first aperture 83*a*, a second aperture 83*b*, a third aperture 83*c*, and a fourth aperture 83*d*. A third fixed reflecting surface 86 includes a third reflecting surface element 86*a* corresponding the first aperture 83*a*, a third reflecting surface element 86*b* corresponding to the second aperture 83*b*, and a fifth reflecting surface element 86*c* corresponding to the third aperture 83*c*, and a fifth reflecting surface element 86*d* corresponding to the fourth aperture 83*d*. Similarly to the vehicle light 80, the fifth reflecting surface elements 86*c*, 86*d*, corresponding apertures 83*c*, 83*d* and corresponding fourth reflecting surface elements 85*c*, 85*d* may not be included in the vehicle light 100. Or alternatively, only one fifth reflecting surface element 86*c* or 86*d*, and a corresponding single fourth reflecting surface element 85*c* or 85*d* can be included in the vehicle light 100, while both apertures 83*c* and 83*d* are included in the vehicle light 100. Or otherwise, the first through fourth apertures 83*a*, 83*b*, 83*c*, 83*d* can be a continuous single aperture.

The vehicle light 100 includes a corresponding number of projection lenses 101*a*, 101*b*, 101*c*, 101*d* to the number of elements 86*a*, 86*b*, 86*c*, 86*d* of the third fixed reflecting surface 86, in addition to the projection lens 88. The vehicle light 100 further includes a corresponding number of shutters 102*a*, 102*b*, 102*c*, 102*d* to the number of projection lenses 101*a*, 101*b*, 101*c*, 101*d*, in addition to the shutter 89. Although structures of the shutters 102*a*, 102*b*, 102*c*, 102*d* are not shown in FIG. 39, the shutters 102*a*, 102*b*, 102*c*, 102*d* can respectively include a fixed portion 90 and a movable portion 91, similarly to the shutter 89. Alternatively, each of the shutters 102*a*, 102*b*, 102*c*, 102*d*, 89 can respectively include only a fixed portion. In case that all of the shutters 102*a*, 102*b*, 102*c*, 102*d*, 89 includes only fixed portions, the shutter 89 is configured to prohibit an unnecessary portion of light rays traveling from the center aperture 83*e* to the corresponding projection lens 88 on formation of the corresponding light distribution pattern element L1, similarly in FIG. 30(A). Each of the shutters 102*a*, 102*b*, 102*c*, 102*d* is configured to prohibit an unnecessary portion on formation of the corresponding light distribution pattern element L3, L4, L5, or L6, similarly in FIGS. 31(A)–(D). In the structure of the shutters 89, 102*a*, 102*b*, 102*c*, 102*d* consisting of fixed portions, since no movable portion is included, cost reduction and easy maintenance can be achieved. However, it may happen that, even though first reflecting surface 84 is moved to release the first aperture 83*a* and the third aperture 83*b*, the variable element of the cut-off line of the light distribution pattern is not sufficiently lifted, or the lifted cut-off line element is blurred, at the side of on-coming lane relative to the vertical axis on the screen. In such a case, it is preferable to design to locate light distribution pattern elements L3 and L5 on and below the upper edge of the light distribution pattern element L1 at the side of on-coming lane relative to the vertical axis on the screen.

Figure 41:
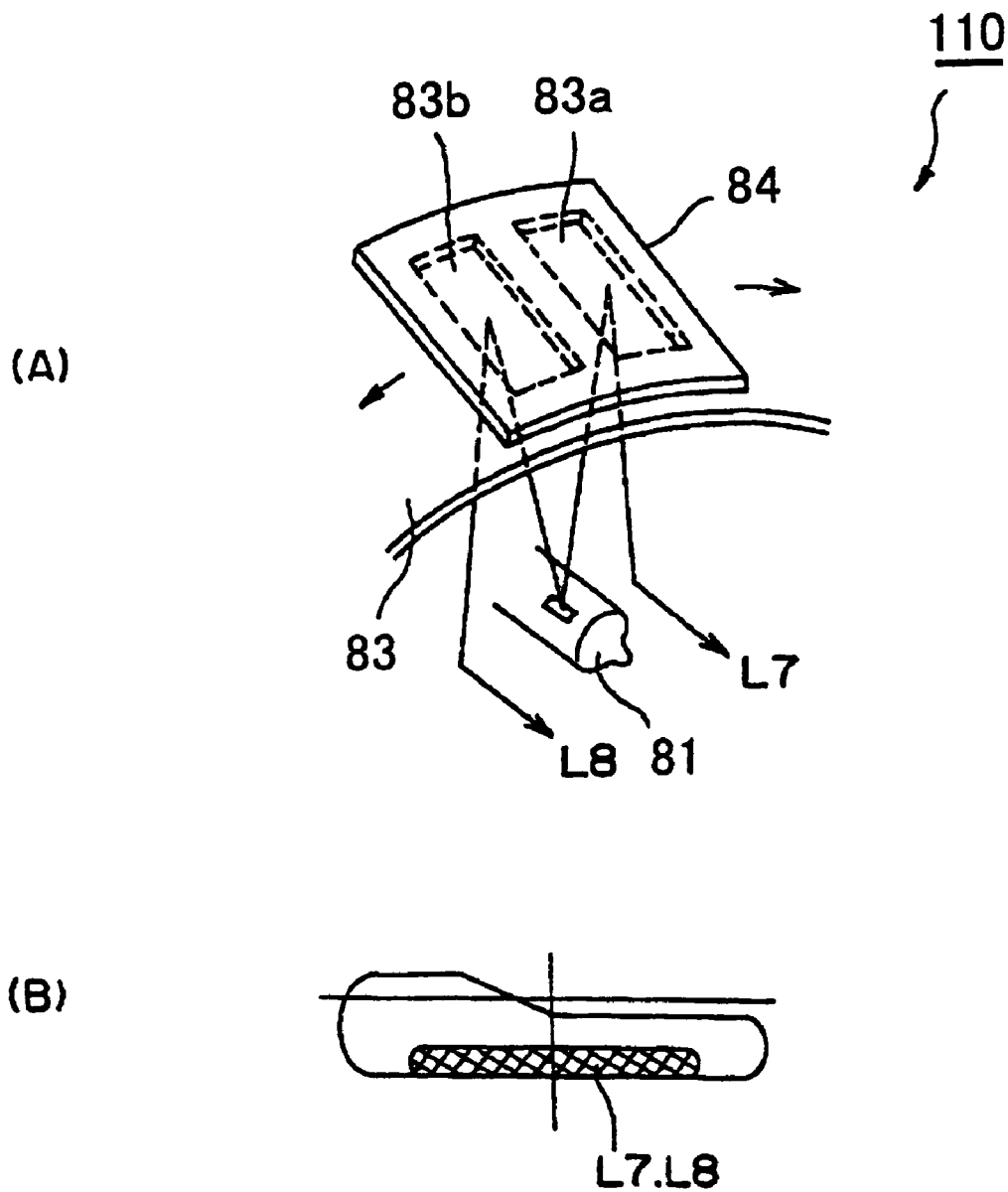
FIG. 41(A) illustrates a location for a first reflecting surface relative to window portions located around an upper edge of the first fixed reflecting surface when the vehicle drives on a straight road, according to an eighth preferred embodiment of the present invention.
FIG. 41(B) illustrates a light distribution pattern on a screen for a vehicle light when the vehicle drives on a straight road, according to the eighth preferred embodiment of the present invention.

FIGS. 41(A)–(B) schematically illustrate an essential part of the vehicle light 110 according to an eighth preferred embodiment of the present invention. The vehicle light 110 is also an automobile headlight and has a similar structure to the vehicle light 80. The same numerals are used in FIGS. 41(A) for the same parts as in the vehicle light 80. Detailed descriptions regarding the same parts as in the vehicle light 80 are therefore omitted.

In the vehicle light 110, a third fixed reflecting surface 86 includes only third reflecting surface elements 86*a*, 86*b* and does not include fifth reflecting surface elements 86*c*, 86*d*. Accordingly, a first fixed reflecting surface 83 includes a center aperture 83*e*, a first aperture 83*a*, a second aperture 83*b*, and does not include a third aperture 83*c*, or a fourth aperture 83*d*. A second fixed reflecting surface 85 includes second reflecting surface elements 85*a*, 85*b*, and does not included fourth reflecting surface elements 85*c*, 85*d*. Further, the first reflecting surface 84 is a continuous surface and not divided into a plurality of separately movable elements. Although not shown, the first reflecting surface 84 can be divided into a first element 84*a* and a second element 84*b*, similarly to the vehicle light 80.

FIG. 41(B) illustrates a light distribution pattern of the vehicle light 110 when the first reflecting surface 84 is located to cover both the first aperture 83*a* and the second aperture 83*b*. In FIG. 41(B), the light distribution pattern elements L7 and L8 have substantially the same light distribution characteristics. However, the light distribution pattern elements L7 and L8 have different light distribution characteristics as those in the vehicle light 80. Since any fourth reflecting surface element and its corresponding fifth reflecting surface element and aperture is not included in the vehicle light 110, light distribution pattern elements L9 and L10 do not exit in the light distribution in FIG. 41(B).

Figure 42:
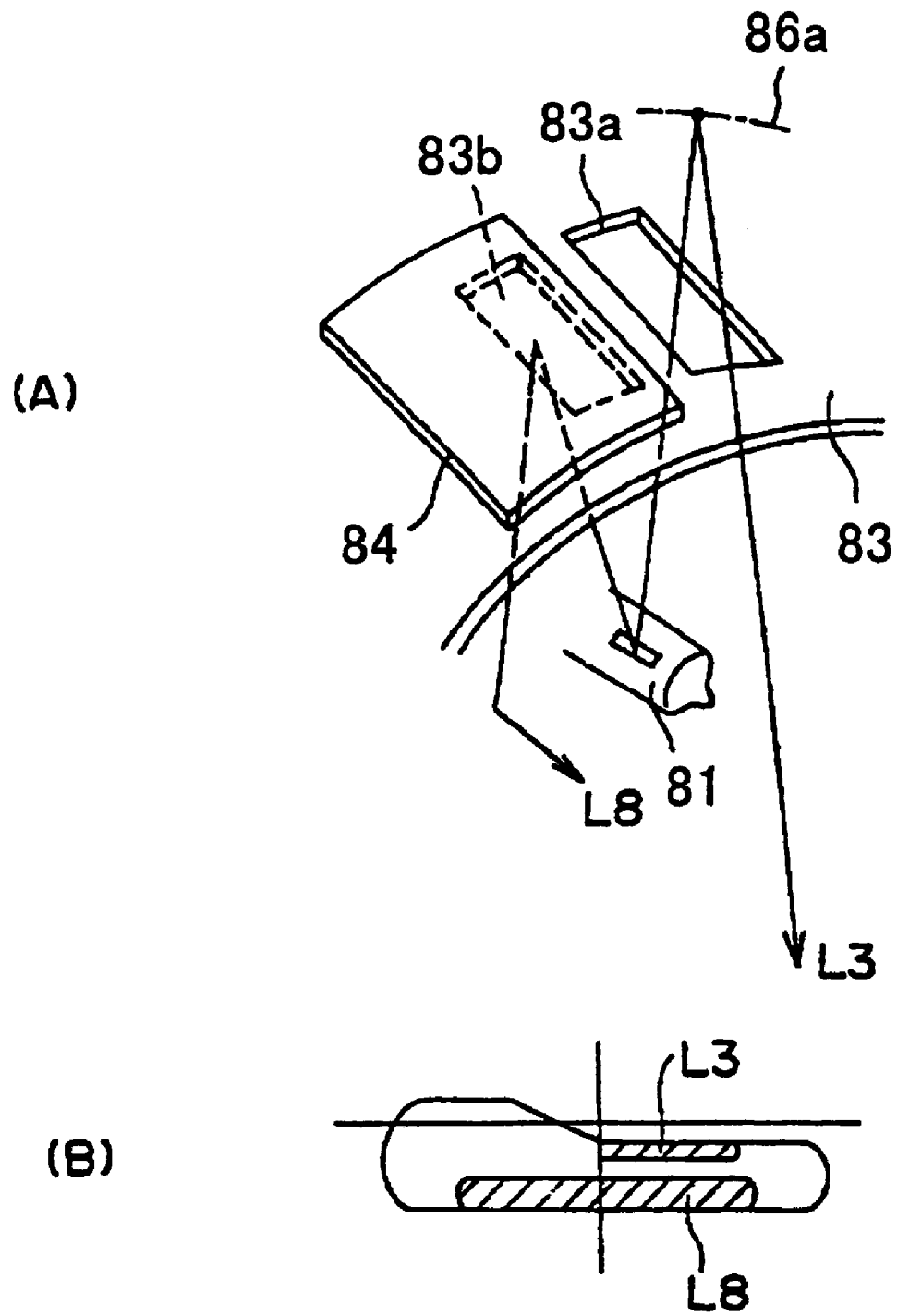
FIG. 42(A) illustrates a location of the first reflecting surface relative to the window portions located around the upper edge of the first fixed reflecting surface when the vehicle drives on a curve to the right, according to the eighth preferred embodiment of the present invention.
FIG. 42(B) illustrates a light distribution pattern on a screen for a vehicle light when the vehicle drives on a curve to the right, according to the eighth preferred embodiment of the present invention.

When the vehicle enters in a curve to the right, a driver steers to the right. Based on the steering detected or information on road conditions obtained by a car navigation system, the first reflecting surface 84 moves to the right to release the first aperture 83*a*. FIG. 42(A) illustrates a state when the first aperture 83*a* of the vehicle light 110 is fully released, while the second aperture 84*b* is covered by the first reflecting surface 84. Light rays incident to the second aperture 83*b* are reflected by the first reflecting surface 84 and the corresponding second reflecting surface element 85*b*, then provide a light distribution pattern element L8. In case that the shutter 89, (and the shutter 102*a* if any), includes a movable portion(s) 91 and the first aperture 83*a* is fully released, the vehicle light 110 provides a light distribution pattern element L3 which is substantially the same as in FIG. 31(A). Thereby, light distribution pattern of the vehicle light 110 provides an increased illuminated area at the right side of the vertical axis on the screen, and visibility to the right front area, i.e., a traveling direction of the vehicle, is significantly improved. In case that the shutters 89, 102*a* are consisted of the fixed portions, light distribution pattern of the vehicle light 110 can be designed as shown by FIG. 42(B). In the light distribution pattern in FIG. 42(B), a light distribution pattern element L3 is located adjacent to and below an upper edge of the light distribution pattern at the right side of the vertical axis on the screen. The light distribution pattern element L3 is constituted by light rays which passed through the first aperture 83*a*, were reflected by the third reflecting surface element 86*a* and passed through the projection lens 88 (or the projection lens 102*a*, if any). Accordingly, in this case, since the light distribution pattern in FIG. 42(B) has an increased light intensity area at the right side of the vertical axis on the screen such that visibility to the traveling direction on the curve is improved to an acceptable level. Further, the width of the variable light distribution pattern element L3 when the first aperture 83*a* is fully released can be increased to a right side periphery of the light distribution pattern by adjusting design of the first aperture 83*a* and the corresponding third reflecting surface element 86*a*.

Figure 43:
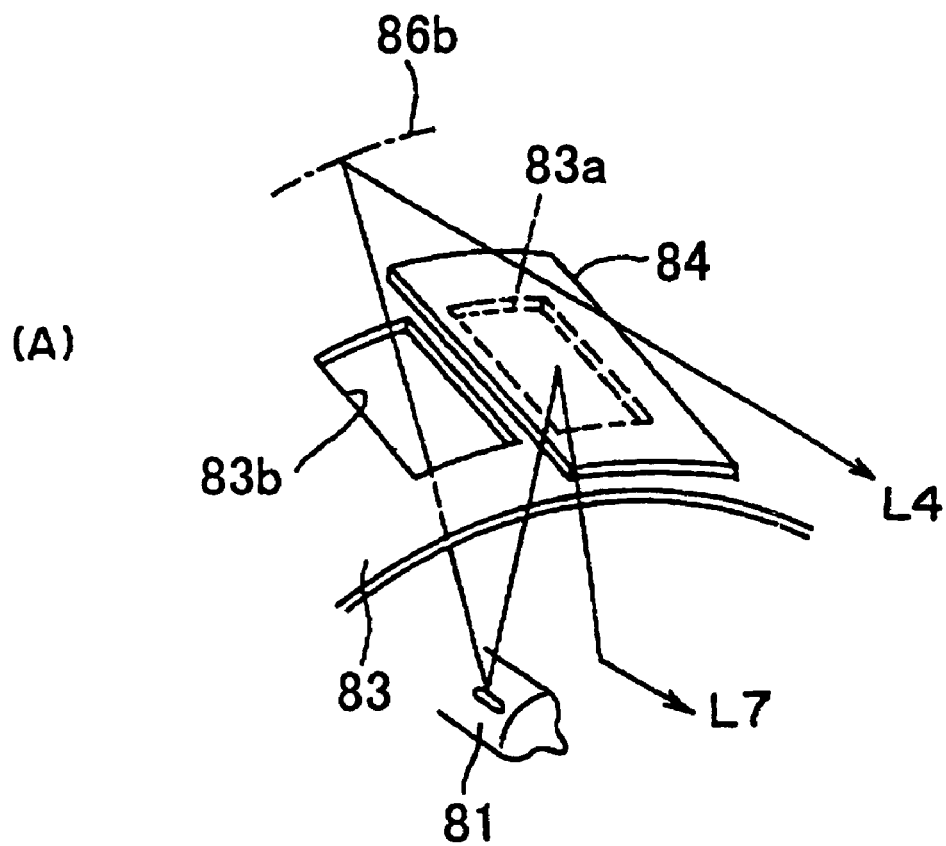
FIG. 43(A) illustrates a location of the first reflecting surface relative to the window portions of the sixth reflecting surface when the vehicle drives on a curve to the left, according to the eighth preferred embodiment of the present invention.
FIG. 43(B) illustrates a light distribution pattern on a screen for the vehicle light when the vehicle drives on a curve to the left, according to the eighth preferred embodiment of the present invention.
Figure 43:
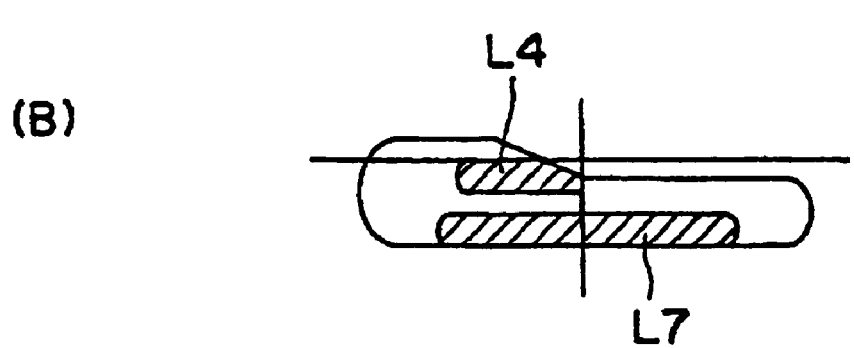

When the vehicle enters in a curve to the left, a driver steers to the left. Based on the steering angle detected or information on road conditions obtained by a car navigation system, the first reflecting surface 84 moves to the right to release the second aperture 83*b*. FIG. 43(A) illustrates a state when the second aperture 83*b* of the vehicle light 10 is fully released, while the first aperture 83*a* is covered by the first reflecting surface 84. Light rays incident to the first aperture 83*a* are reflected by the first reflecting surface 84 and the corresponding second reflecting surface element 85*a*, then provide a light distribution pattern element L7. In case that the shutter 89, (and the shutter 102*b* if any), includes a movable portion(s) 91 and the second aperture 83*b* is fully released, the vehicle light 10 provides a light distribution pattern element L4 which is substantially the same as in FIG. 31(B). Thereby, light distribution pattern of the vehicle light 10 provides an increased light intensity area at the left side of the vertical axis on the screen, and visibility to the left front, i.e., traveling direction of the vehicle, is significantly improved. In case that the shutters 89, 102*a* are consisted of the fixed portions, light distribution pattern of the vehicle light 110 can be designed as shown by FIG. 43(B). In the light distribution pattern in FIG. 43(B), a light distribution pattern element L4 has a smaller width than the light distribution pattern element L4 in FIG. 31(B), and illuminate a predetermined area located adjacent to and below a horizontal axis at the left side of the vertical axis on the screen. However, the width of the variable light distribution pattern element L3 when the second aperture 83*b* is fully released can be increased to a left side periphery of the light distribution pattern by adjusting design of the second aperture 83*b* and the corresponding third reflecting surface element 86*b*.

The light distribution pattern element L4 is constituted by light rays which passed through the second aperture 83b, were reflected by the third reflecting surface element 86b and passed through the projection lens 88 (or the projection lens 102b, if any). Accordingly, in this case, since the light distribution pattern in FIG. 43(B) has an increased light intensity area at the left side of the vertical axis on the screen such that visibility to the traveling direction on the curve is improved to an acceptable level.

Figure 44:
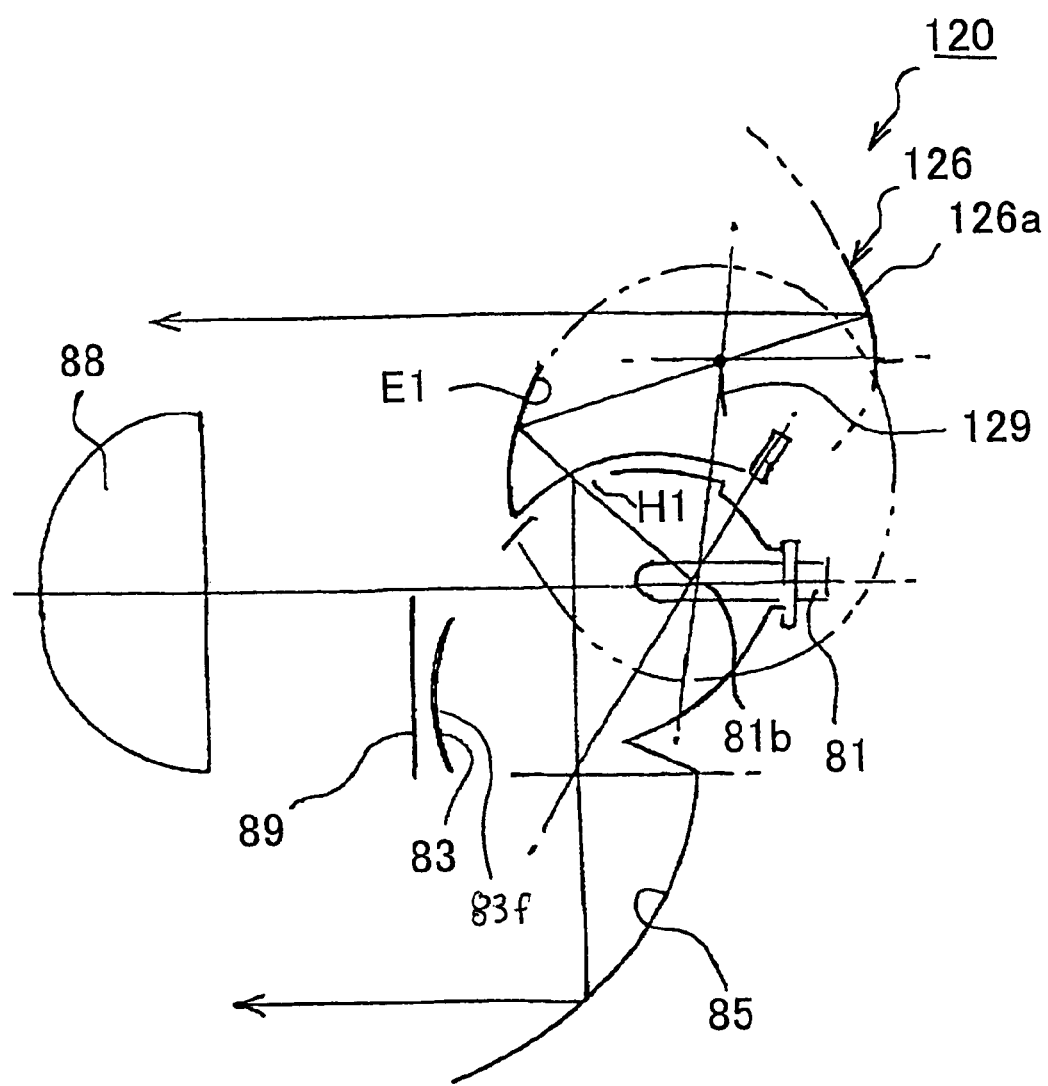
FIG. 44 illustrates a vehicle light according to a ninth preferred embodiment of the present invention.
Figure 45:
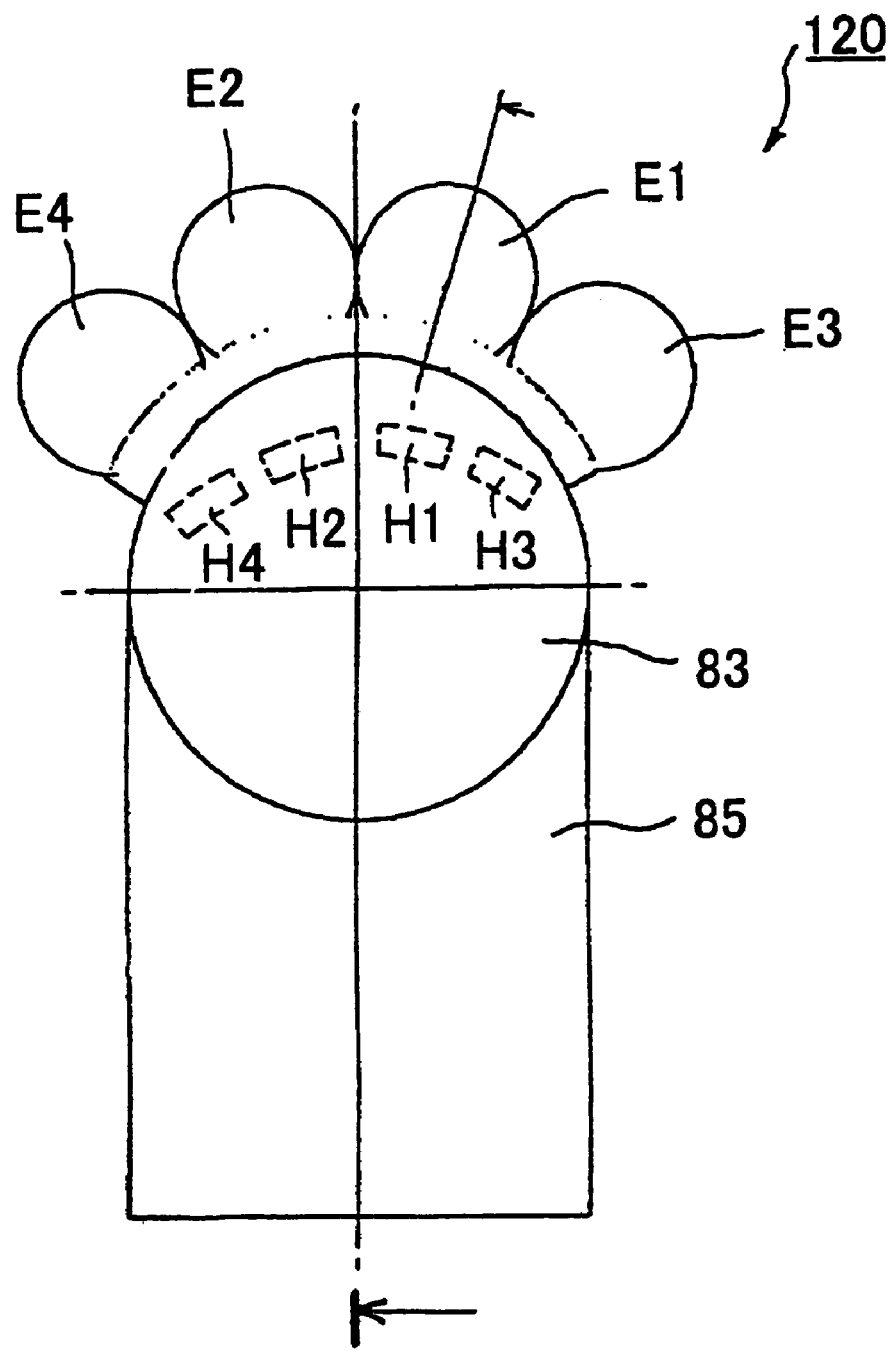
FIG. 45 illustrates a schematic front view of the vehicle light according to the ninth preferred embodiment of the present invention.

FIGS. 44–45 schematically illustrate a part of the vehicle light 120 according to the ninth preferred embodiment of the present invention. The vehicle light 120 is also an automobile headlight, having a similar structure to the vehicle light 80 in FIGS. 26–28. The same numerals are used in FIGS. 44–45 for the same parts as in the vehicle light 80. Detailed descriptions regarding the same parts as in the vehicle light 80 are therefore omitted.

In the vehicle light 120, the first fixed reflecting surface 83 can include a sixth reflecting surface element 83f and at least one seventh reflecting surface element E1, E2, E3, E4. The at least one seventh reflecting surface element E1, E2, E3, E4 is respectively an ellipse group reflecting surface having a first focus in the vicinity of a light emitting portion 81b of a light bulb 81 and a second focus in the above of the light source position. The second focus of the at least one seventh reflecting surface element E1, E2, E3, E4 is preferably located at the backward of the light emitting portion 81b. The sixth reflecting surface element 83f has at least one aperture H1, H2, H3, H4, which correspond to the first through fourth apertures 83a, 83b, 83c, 83d in the vehicle light 80. The vehicle light 120 further includes a third fixed reflecting surface 126 comprising a number of third and fifth reflecting surface elements 126a, 126b, 126c, 126d corresponding to the number of seventh reflecting surface elements E1, E2, E3, E4. Each of the third and fifth reflecting surface elements 126a, 126b, 126c, 126d is a parabolic group reflecting surface having a focus in the vicinity of the second focus of the corresponding seventh reflecting surface element E1, E2, E3, or E4. Optical axis direction of the parabolic group third and fifth reflecting surface elements 126a, 126b, 126c, 126d is determined corresponding to a predetermined illumination direction of light rays reflected thereby to form respective light distribution pattern element L3, L4, L5, L6.

A shutter 89 located on the light passageway from the center aperture 83b to the projection lens 88 is constituted by only a fixed portion 90. In addition to the shutter 89 located on the light passageway from the center aperture 83b to the projection lens 88, the vehicle light 120 further includes a number of shutters 129a, 129b, 129c, 129d corresponding to the number of second focus of the ellipse group seventh reflecting surface elements E1, E2, E3, E4. The shutters 89a, 89b, 89c, 89d respectively prohibits a portion of light rays which become upwardly directed light rays after being reflected by the corresponding parabolic group third or fifth reflecting surface elements 126a, 126b, 126c, 126d. In the vehicle light 120, it is not required to have at least one projection lens in addition to the projection lens 88, into which projection lens light rays reflected by the corresponding third or fifth reflecting surface element 126a, 126b, 126c, or 126d are incident.

When a first reflecting surface 84, or its element 84a and/or 84b is moved from its fully inserted position to release the corresponding aperture H1, H2, H3, H4, light rays that have passed through the corresponding aperture H1, H2, H3, H4 are reflected by the corresponding ellipse group seventh reflecting surface element E1, E2, E3, E4 toward each second focus. Since each second focus of the seventh reflecting surface element E1, E2, E3, E4 is also a focus of the corresponding third or fifth reflecting surface element 126a, 126b, 126c, 126d, light rays reflected by the corresponding third or fifth reflecting surface element 126a, 126b, 126c, 126d is illuminated into its predetermined illumination direction to form corresponding light distribution pattern element L3, L4, L5, L6. The light distribution pattern element L3 is located adjacent to and below the upper edge of the light distribution pattern element L1 at the right side of the vertical axis on the screen, similarly to FIG. 42(B). The light distribution pattern elements L1, L2, L4, L5, L6, L7, L8, L9, L10 are the same as in FIG. 30(A)–(B), 31(B)–(D), and 32(A)–(D).

In the vehicle lights 80, 100, 110, 120, corresponding to a traveling direction of the vehicle, the first reflecting surface 84, or at least one corresponding first reflecting surface element 84a, 84b can be moved from its fully inserted position to release at least one corresponding aperture 83a, 83b, at least in part. Thereby, light rays L3 and L4 are reflected by the corresponding third reflecting surface elements 86a, 86b and pass through the corresponding projection lens 88, 101a, or 101b. Such light rays L3 and L4 are converged by a predetermined degree when passing through the corresponding projection lens 88, 101a, or 101b, and illuminate a predetermined front area under the horizontal axis on the screen. Accordingly, an illuminated distance to the front at the side of traveling direction of the vehicle is increased, and visibility to the traveling direction of the vehicle is improved, especially when the vehicle drives on a curve or turns around a corner.

Each of the vehicle light 80, 100, 110, 120 preferably includes a major reflecting surface 82, a first fixed reflecting surface 83 comprising a sixth reflecting surface element 83, a first reflecting surface 84, a third fixed reflecting surface 86 comprising at least one third reflecting surface elements 86a, 86b and a second fixed reflecting surface 85 comprising a second reflecting surface elements 85a, 85b and a fourth reflecting surface elements 85c, 85d, and the other portion 85e. However, various modifications of the vehicle lights 80, 100, 110,120 are possible. For example, it is possible to remove the sixth reflecting surface element 83f and a portion 85e of the second fixed reflecting surface 85 except the second reflecting surface elements 85a, 85b and the fourth reflecting surface elements 85c, 85d from the vehicle lights 80, 100, 110, and 120. In another example, the fourth reflecting surface elements 85c, 85d, the fifth reflecting surface elements 86c, 86d, and corresponding apertures 83c, 83d also can be removed. In a still another example, the apertures 83a, 83b, 83c and 83d can be connected to form a single aperture. Alternatively, the apertures 83a, 83b, 83c, 83d can respectively be divided into other number of apertures. Further, the aperture can be a window portion. In another example, the second reflecting surface elements 85a, 85b, and fourth reflecting surface elements 85c, 85d are not required to be separate elements, and can be a continuous surface adopting a free-curved surface. Similarly, the third reflecting surface elements 86a, 86b, and the fifth reflecting surface elements 86c, 86d are not required to be separate elements, and can be a continuous surface adopting a free-curved surface. Further, the first reflecting surface 84 or its elements 84a, 84b can be gradually moved to gradually release at least corresponding apertures 83a, 83b, 83c, 83d such that light distribution pattern is gradually and smoothly changed. Alternatively, the position of the first reflecting surface 84 or its elements 84a, 84b can be instantly switched among its several positions such that at least one corresponding aperture including 83a, 83b, 83c, 83d is either fully released or fully covered by the first reflecting surface 84 or its corresponding element 84a, 84b, and the first reflecting surface 84 or its elements 84a, 84b do not stay in such a position that the corresponding aperture including 83a, 83b, 83c, 83d is partly released.

The above description is made with reference to vehicle lights 80, 100, 110 and 120 configured for traveling on a left lane during a normal state of driving. If the vehicle lights 80, 100, 110 and 120 are configured for traveling on a right lane during the normal state of driving, cut-off portion of the light distribution pattern, and a corresponding structure of the right lane driving vehicle light to form the cut-off portion can be symmetrical with that of the vehicle light 80, 100, 110 and 120 relative to the optical axis X of the vehicle lights 80, 100, 110 and 120.

Operational advantages of the vehicle lights 80, 100, 110 and 120 will now be described. When the first reflecting surface or its element starts to move in a rotating manner to release at least one corresponding aperture, at least a portion of light rays incident on the corresponding aperture from the light source pass through the released portion of the aperture, and travel to and are reflected by the corresponding third (and fifth, if any) reflecting surface element to be incident to the corresponding projection lens (if any), while the other portion of light rays incident on the corresponding aperture from the light source are reflected by the first reflecting surface or its corresponding element to corresponding at least one second (and fourth, if any) reflecting surface element. The light rays incident to the projection lens from the third (and fifth, if any) reflecting surface element illuminate a predetermined front area under the horizontal axis on the screen such that light intensity, i.e., an illuminated distance to the traveling direction of the vehicle when viewed laterally is increased, thereby visibility to the traveling direction of the vehicle is improved. This advantage is emphasized, if the shutter includes a movable portion capable of moving from its fully inserted position to its removed position relative to the light passageway from the light source to a corresponding projection lens, at the same time with the movable first reflecting surface or its at least one corresponding element. By movement of the movable portion of the shutter, a portion of cut-off line at the side of on-coming lane can be lifted at least partly depending on steering angle or road conditions.

The vehicle lights of the present invention can provide superior illumination to the traveling direction of the vehicle by a simple structure, especially when the vehicle drives on a curve or turns around a corner.

Although the foregoing description is directed to the preferred embodiments of the invention, it is noted that other variations and modifications will be apparent to those skilled in the art, and may be made without departing from the spirit or scope of the invention.

What is claimed is:

1. A vehicle light comprising:
    a light source;
    a major reflecting surface reflecting light rays from the light source forward;
    a projection lens for converging light rays incident thereto;
    a first shutter located in an optical path from the light source to the projection lens for cutting-off an unnecessary portion of light rays on formation of a light distribution pattern;
    a first reflecting surface including an ellipse group reflecting surface having a first focus approximately on the light source and a second focus, and capable of being inserted in or removed from an optical path from the light source to a second fixed reflecting surface by rotation;
    a first fixed reflecting surface of a parabolic group reflecting surface having a focus approximately on the second focus of the first reflecting surface for reflecting light rays from the first reflecting surface to a front area of the vehicle light, including at least two second reflecting surface elements;
    the second fixed reflecting surface including an ellipse group reflecting surface having a first focus approximately on the light source including at least two third reflecting surface elements for reflecting light rays to its corresponding second focus, which light rays have traveled a corresponding optical path from the light source to the third reflecting surface element without being reflected by the first reflecting surface;
    a third fixed reflecting surface including a parabolic group reflecting surface including at least two fourth reflecting surface elements, each having a focus approximately on the second focus of the corresponding third reflecting surface element, for reflecting light rays from the third reflecting surface element to a front area of the vehicle light; and
    at least one second shutter located in at least one optical path from the third reflecting surface element to the fourth reflecting surface element for prohibiting a portion of light rays directed to the corresponding fourth reflecting surface element.

2. The vehicle light according to claim 1, wherein the first reflecting surface includes at least a first element and a second element, each element can be separately inserted in or removed from each optical path from the light source to a corresponding portion of the third reflecting surface by separate rotational movement around a longitudinal axis.

3. The vehicle light according to claim 2, wherein when a vehicle having the vehicle light travels to the left, one of the first element and the second element is rotated in a first direction while the other one of the first and the second element remains in the fully inserted position, and when the vehicle travels to the right, the other one of the first element and the second element is rotated in a second direction while the one of the first element and the second element remains in the fully inserted position.

4. The vehicle light according to claim 2, wherein movement of the first element and the second element is dependent on one of a steering angle, and information on road conditions obtained by a car navigation system.

5. The vehicle light according to claim 3, wherein movement of the first element and the second element is dependent on one of steering angle, and information on road conditions obtained by a car navigation system.

6. The vehicle light according to claim 1, wherein the first shutter includes a fixed portion; and
    wherein by movement of the first reflecting surface relative to the optical path from the light source to the second fixed reflecting surface, illuminance at a front area under a horizontal axis can be varied to increase an illuminated distance into a traveling direction of a vehicle having the vehicle light.

7. The vehicle light according to claim 6, wherein the front area is a band-like area extending along a horizontal axis.

8. The vehicle light according to claim 1, wherein the second reflecting surface elements include a substantially continuous surface.

9. The vehicle light according to claim 1, wherein the third reflecting surface elements include a substantially continuous surface.

10. The vehicle light according to claim 1, further comprising:
at least one fifth reflecting surface element located at at least one side of the at least two second reflecting surface elements for reflecting light rays from a corresponding portion of the first reflecting surface to a side front of the vehicle light.

11. The vehicle light according to claim 10, wherein the at least two second reflecting surface elements and the at least one fifth reflecting surface include a substantially continuous surface.

12. The vehicle light according to claim 10, further comprising:
at least one sixth reflecting surface element located at at least one side of the at least one third reflecting surface element for reflecting light rays to its corresponding second focus, which light rays have traveled the optical path from the light source to the corresponding sixth reflecting surface element without being reflected by the first reflecting surface.

13. The vehicle light according to claim 12, further comprising:
at least one seventh reflecting surface element located at at least one side of the fourth reflecting surface elements for reflecting light rays forward, which light rays have traveled the optical path from the second focus of the corresponding sixth reflecting surface element without being reflected by the first reflecting surface.

14. The vehicle light according to claim 12, wherein the at least one third reflecting surface element and the at least one sixth reflecting surface element include a substantially continuous surface.

15. The vehicle light according to claim 13, wherein the at least two fourth reflecting surface elements and the at least one seventh reflecting surface elements include a substantially continuous surface.

16. The vehicle light according to claim 1, further comprising:
a number of shutters, corresponding to a number of elements, which include the second fixed reflecting surface.

17. The vehicle light according to claim 13, further comprising:
a number of shutters, corresponds to a number of elements, which comprise the second fixed reflecting surface.

18. The vehicle light according to claim 1, wherein the first shutter includes a fixed portion and a movable portion which overlaps at least partly with the fixed portion, and is capable of lateral movement between a fully inserted position and a removed position relative to the corresponding optical path from the light source to the projection lens;
wherein the movable portion of the shutter is moved relative to the fixed portion simultaneously with the first reflecting surface to be inserted in or removed from an optical path such that a cut-off portion of the light distribution pattern is varied.

19. The vehicle light according to claim 13, wherein the first shutter includes a fixed portion and a movable portion which overlaps at least partly with the fixed portion, and is capable of lateral movement between a fully inserted position and a removed position relative to the corresponding optical path from the light source to the projection lens;
wherein the movable portion of the shutter is moved relative to the fixed portion simultaneously with the first reflecting surface to be inserted in or removed from an optical path such that a cut-off portion of the light distribution pattern is varied.

20. The vehicle light according to claim 18, wherein the cut-off portion of the light distribution pattern is varied such that a cut-off line element at a side of an on-coming lane can be lifted at least partly, and still be under a horizontal axis.

21. The vehicle light according to claim 19, wherein the cut-off portion of the light distribution pattern is varied such that a cut-off line element at a side of an on-coming lane can be lifted at least partly, and still be under a horizontal axis.

22. The vehicle light according to claim 16, wherein the first shutter and the at least one second shutter respectively include a fixed portion, and wherein by movement of the first reflecting surface relative to the optical path from the light source to the second fixed reflecting surface, illuminance at a front area under a horizontal axis can be varied to increase an illuminated distance into a traveling direction of a vehicle having the vehicle light.

23. The vehicle light according to claim 17, wherein the first shutter and the at least one second shutter respectively include a fixed portion, and wherein by movement of the first reflecting surface relative to the optical path from the light source to the second fixed reflecting surface, illuminance at a front area under a horizontal axis can be varied to increase an illuminated distance into a traveling direction of a vehicle having the vehicle light.

24. The vehicle light according to claim 22, wherein the front area is a band-like area extending along a horizontal axis.

25. The vehicle light according to claim 23, wherein the front area is a band-like area extending along a horizontal axis.

26. The vehicle light according to claim 1, further comprising:
an eighth reflecting surface of an ellipse group reflecting surface located on a concave side of the first reflecting surface, having a first focus approximately on the light source and a second focus for reflecting light rays to its second focus;
wherein the first fixed reflecting surface includes a ninth reflecting surface element including a parabolic group reflecting surface having a focus approximately on the second focus of the eighth reflecting surface for reflecting light rays from the eighth reflecting surface to illuminate a front area of the vehicle light.

27. The vehicle light according to claim 26, wherein the ninth reflecting surface element and the at least two second reflecting surface elements are substantially a continuous surface.

28. The vehicle light according to claim 26, wherein the eighth reflecting surface includes at least two apertures in the vicinity of the optical path from the light source to the projection lens and the optical path from the light source to the second fixed reflecting surface.

29. The vehicle light according to claim 26, wherein the eighth reflecting surface and the second fixed reflecting surface are substantially a continuous surface.

30. The vehicle light according to claim 1, further comprising:
a driving mechanism to move the first reflecting surface including;
a rotational axis located approximately on the longitudinal axis of the first reflecting surface,
a reduction gear disposed on the rotational axis,
a pinion engageable with the reduction gear, a motor, and a driving axis connected to the motor for rotating the pinion;

wherein the first reflecting surface can be moved between at least two positions by operation of the motor.

31. The vehicle light according to claim 2, having a driving mechanism for separately moving the first element and the second element, including;

a first rotational axis of the first element located approximately on the longitudinal axis of the first element having a first gear located around the first rotational axis at a distance from the first element, a first motor having a driving axis on which a second gear is located, a first reduction mechanism including a first reduction gear engageable with the second gear disposed on the driving axis of the motor, a third gear located on the same rotational axis of the reduction gear and engageable with the first gear of the first rotational axis;

a second rotational axis of the second element located approximately on the longitudinal axis of the second element having a fourth gear located around the second rotational axis at a distance from the second element, a second motor having a driving axis on which a fifth gear is located, a second reduction mechanism including a second reduction gear engageable with the fifth gear disposed on the driving axis of the second motor, a sixth gear located on the same rotational axis as the second reduction gear and engageable with the fourth gear;

wherein each of the first element and the second element can be moved between a fully inserted position and a removed position by operation of the corresponding motor.

* * * * *